US009683300B2

(12) United States Patent
Noaki et al.

(10) Patent No.: US 9,683,300 B2
(45) Date of Patent: Jun. 20, 2017

(54) BIPOLAR ALKALINE WATER ELECTROLYSIS UNIT AND ELECTROLYTIC CELL

(71) Applicant: ASAHI KASEI KABUSHIKI KAISHA, Tokyo (JP)

(72) Inventors: Yasuhide Noaki, Kanagawa (JP); Yousuke Uchino, Tokyo (JP); Keiji Miyoshi, Miyazaki (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 12 days.

(21) Appl. No.: 14/408,834

(22) PCT Filed: Jun. 17, 2013

(86) PCT No.: PCT/JP2013/066615
§ 371 (c)(1),
(2) Date: Dec. 17, 2014

(87) PCT Pub. No.: WO2013/191140
PCT Pub. Date: Dec. 27, 2013

(65) Prior Publication Data
US 2015/0203976 A1   Jul. 23, 2015

(30) Foreign Application Priority Data

Jun. 18, 2012 (JP) .................................. 2012-137142
Jul. 9, 2012 (JP) .................................. 2012-153876
Jul. 12, 2012 (JP) .................................. 2012-156667

(51) Int. Cl.
C25B 11/03   (2006.01)
C25B 9/20    (2006.01)
(Continued)

(52) U.S. Cl.
CPC .............. *C25B 11/035* (2013.01); *C25B 1/10* (2013.01); *C25B 9/20* (2013.01); *C25B 11/0447* (2013.01); *Y02E 60/366* (2013.01)

(58) Field of Classification Search
None
See application file for complete search history.

(56) References Cited

U.S. PATENT DOCUMENTS 4,111,779 A * 9/1978 Seko ....................... C25B 9/206
                                                    204/255
4,358,475 A * 11/1982 Brown ................ C25B 11/0478
                                                    427/123
(Continued)

FOREIGN PATENT DOCUMENTS

CN         86107225        5/1987
CN         1685084        10/2005
(Continued)

OTHER PUBLICATIONS

Noaki et al, "Characteristics of Plasma-Sprayed NiO Cathode and Mechanism of the Hydrogen Evolution Reaction on it", Proceedings of 20th Soda Industry Technical Symposium, 1996 (no month available), pp. 57-60.*
(Continued)

*Primary Examiner* — Harry D Wilkins, III
(74) *Attorney, Agent, or Firm* — Greenblum & Bernstein P.L.C.

(57) ABSTRACT

A bipolar alkaline water electrolysis unit incorporated in an electrolytic cell for electrolyzing an electrolytic solution of alkaline water to obtain oxygen and hydrogen, the bipolar alkaline water electrolysis unit including an oxygen generating anode, a hydrogen generating cathode, a conductive partition wall that separates the anode and the cathode from each other, and an outer frame that surrounds the conductive partition wall, wherein a gas and electrolytic solution pas-
(Continued)

sage is provided at an upper portion of the conductive partition wall and/or the outer frame, and an electrolytic solution passage is provided at a lower part of the conductive partition wall and/or the outer frame.

24 Claims, 25 Drawing Sheets

(51) Int. Cl.
*C25B 1/10* (2006.01)
*C25B 11/04* (2006.01)

(56) References Cited

U.S. PATENT DOCUMENTS

| | | | |
|---|---|---|---|
| 4,537,674 A | 8/1985 | Ovshinsky et al. | |
| 4,734,180 A | 3/1988 | Sato et al. | |
| 5,225,060 A * | 7/1993 | Noaki | C25B 9/206 204/237 |
| 6,554,978 B1 * | 4/2003 | Vandenborre | C25B 15/08 204/258 |
| 6,773,561 B1 * | 8/2004 | Noaki | C25B 9/066 204/256 |
| 6,878,244 B2 * | 4/2005 | Sioli | C25B 9/206 204/258 |
| 7,323,090 B2 * | 1/2008 | Houda | C25B 11/03 204/254 |
| 7,332,063 B2 * | 2/2008 | Sioli | C25B 9/20 204/254 |
| 9,187,833 B2 * | 11/2015 | Wilson | C25B 9/206 |
| 2004/0040838 A1 | 3/2004 | Helmke et al. | |
| 2004/0216994 A1 * | 11/2004 | Oldani | C25B 9/203 204/229.4 |
| 2005/0077068 A1 | 4/2005 | Gestermann et al. | |
| 2006/0042935 A1 | 3/2006 | Houda et al. | |
| 2007/0193880 A1 | 8/2007 | Schick et al. | |
| 2007/0215492 A1 * | 9/2007 | Vandenborre | C25B 15/08 205/799 |
| 2007/0278108 A1 | 12/2007 | Rosenzweig et al. | |
| 2008/0029396 A1 | 2/2008 | Shirakura et al. | |
| 2008/0105540 A1 | 5/2008 | Federico et al. | |
| 2011/0089027 A1 * | 4/2011 | Sasaki | C25B 11/0494 204/242 |
| 2012/0241314 A1 * | 9/2012 | Madono | C25B 11/035 204/252 |

FOREIGN PATENT DOCUMENTS

| | | |
|---|---|---|
| CN | 1717507 | 1/2006 |
| CN | 2915887 | 6/2007 |
| CN | 101562255 A | 10/2009 |
| EP | 0067975 | 12/1982 |
| EP | 0407349 | 1/1991 |
| EP | 1464728 | 10/2004 |
| EP | 1577424 | 9/2005 |
| JP | 53-54174 | 5/1978 |
| JP | 57-57880 | 4/1982 |
| JP | 59-47390 | 3/1984 |
| JP | 59-69967 | 5/1984 |
| JP | 60-159184 | 8/1985 |
| JP | 03-166393 | 7/1991 |
| JP | 04-301062 | 10/1992 |
| JP | 2001-152379 | 6/2001 |
| JP | 2002-332586 | 11/2002 |
| JP | 2004-298807 A | 10/2004 |
| JP | 2005-330575 | 12/2005 |
| JP | 2007-84914 | 4/2007 |
| JP | 2007-508456 | 4/2007 |
| JP | 2008-520828 | 6/2008 |
| JP | 2008-274432 | 11/2008 |
| JP | 2009-149932 | 7/2009 |
| JP | 4453973 | 4/2010 |
| WO | 2004/048643 | 6/2004 |

OTHER PUBLICATIONS

Partial translation of Noaki et al, Jun. 6, 2016.*
Search Report issued by E.P.O. patent office in E.P.O. Patent Application No. 13806415.9, dated Jul. 29, 2015.
Morimoto et al., "Alkaline Type Ion-Exchange Membrane Water Electrolysis", Reports of the Research Laboratory, Asahi Glass Co., Ltd., 1985, pp. 57-66, vol. 35[1], and partial English translation.
"Abstract Ebara Engineering Review", pp. 74-80, No. 177, 1997-10, and English translation.
Stolten, "Hydrogen Energy (Hydrogen and Fuel Cells Fundamentals, Technologies and Applications"), Copyright 2010 Wiley-VCH Verlag GmbH & KGaA, Weinheim ISBN:978-527-32711-9, pp. 243-P270.
Search report from Japan, mail date is Aug. 6, 2013.
International Preliminary Report on Patentability for PCT/JP2013/066615, mailed Dec. 31, 2014.
Wang Peng et al., "Progress in Studies of Anodic Materials for Alkaline Water Electrolysis", State Key Laboratory of Corrosion and Protection, Institute of Corrosion and Protection of Metals, Chinese Academy of Sciences, 1999, pp. 254-255.

* cited by examiner

BIPOLAR ALKALINE WATER ELECTROLYSIS UNIT AND ELECTROLYTIC CELL

TECHNICAL FIELD

The present invention relates to a bipolar alkaline water electrolysis unit incorporated in an electrolytic cell for obtaining oxygen and hydrogen by electrolyzing an electrolytic solution of alkaline water, and the electrolytic cell. More specifically, the present invention relates to an inexpensive, energy-efficient bipolar alkaline water electrolysis unit for obtaining oxygen from an anode side and hydrogen from a cathode side using an electrolytic solution including NaOH or KOH and the like, and the electrolytic cell.

BACKGROUND ART

Examples of a water electrolysis method include "solid polymer water electrolysis" in which an anode catalyst and a cathode catalyst are coated on a solid polymer electrolyte, "high-temperature steam electrolysis" in which electrolysis is performed at high temperature and with high-temperature steam using a solid electrolyte of an oxygen ion conductor, and "alkaline water electrolysis" which uses a water solution of KOH or a water solution of NaOH as an electrolyte.

The "solid polymer water electrolysis" uses a fluorine-containing perfluoro sulfonic polymer as an electrolyte with a platinum-containing catalyst coated on opposite sides of the fluorine-containing perfluoro sulfonic polymer as a hydrogen generating electrode and an oxygen generating electrode. This method involves a high current density and low power consumption and is thus widely used. An electrolytic cell is formed by contact of a solid material such as a power feeder/electrode/solid polymer electrolyte. Thus, the method has the disadvantage of having difficulty producing a large electrolytic cell. Furthermore, the solid polymer electrolyte is highly acidic, and thus, a platinum-containing material needs to be used as a catalyst, and an expensive corrosion-resistant material needs to be used as a power feeder.

The "high-temperature steam electrolysis" is a method of electrolyzing steam at approximately 800 to 1000° C. using a solid electrolyte of an oxygen ion conductor such as yttria-stabilized zirconia. This method uses the high temperature and thus, achieves high energy efficiency for water electrolysis. However, the electrolytic cell is mainly composed of a ceramic material, and thus, the method has a serious technical problem associated with high temperature operations and has not been put to practical use.

The "alkaline water electrolysis" is a method already used for 80 years or more, and large water electrolysis plants (3300 $Nm^3$/h-hydrogen) have been constructed. However, the method involves high energy consumption and thus, achieves only an approximately five to ten times lower current density than the "solid polymer water electrolysis". The method also still needs high electrolytic cell construction costs.

In recent years, attention has been paid to problems such as global warming and a decrease in environments and underground resources. As a solution for these problems, hydrogen has gathered attention as renewable energy or clean energy. However, such renewable energy is not only locally biased but also involves a significant fluctuation in output. Thus, transmission of power generated from natural energy to general power systems has limitations. Another problem is that, for example, surplus power is generated as a result of a significant change in the amount of generated power depending on weather or season. Thus, manufacture, storage, and transportation of hydrogen based on water electrolysis are now gaining attention. That is, attention is being paid to the manufacture of inexpensive storable hydrogen using inexpensive surplus power, the transportation of the hydrogen as needed, and the utilization of the hydrogen as clean energy source or material.

As a method for manufacturing hydrogen by electrolysis, an alkaline water electrolysis apparatus is expected to be used as a large-scale hydrogen manufacturing apparatus because, for example, the apparatus needs less expensive facility costs than other water electrolysis apparatuses and has already been successfully used in commercial plants. However, many problems need to be solved before an alkaline water electrolysis apparatus needing only low facility costs and providing high performance compared to conventional techniques is implemented using power such as renewable energy which fluctuates sharply in voltage or current within a short time.

In alkaline water electrolysis, a reduction in energy loss is important to improve performance. Examples of the energy loss include the overvoltage of the cathode, the overvoltage of the anode, an Ohmic loss in a partition wall, an Ohmic loss associated with the electrolytic solution, and an Ohmic loss resulting from the structural resistance of the electrolytic cell. If these losses can be reduced and the electrolysis current density can be increased by improving the structure of the electrolysis unit, the size of the facility can also be reduced, thus also enabling a substantial reduction in construction costs. However, the current density of the alkaline water electrolysis is low and 1340 $A/m^2$ to 2000 $A/m^2$ as illustrated in "Non-Patent Literature 2". Thus, a large number of electrolytic cells are provided, the facility is large in size, and the facility costs are high. Furthermore, bipolar plates are used, and thus, when electrolysis is performed using an unstable power supply with a significant fluctuation in load, for example, outgassing may be improper, and moreover, the electrodes may be degraded.

For the structure of the electrolysis unit, a structure is desired which is simple and involves low manufacture costs and low voltage loss. Such an electrolytic cell as illustrated in Non-Patent Literature 1 and Patent Literature 2 has a structure which uses no bipolar electrolysis unit and in which an electrode plate, a gasket, and a partition wall frame are separately provided and in which the components are stacked so as to provide an electrolytic cell. Thus, the electrolytic cell has the disadvantage of being difficult to assemble and maintain. Furthermore, a long distance is present between the anode and the cathode, and thus, another problem of the electrolysis unit is a high Ohmic loss associated with an electrolytic solution.

Patent Literature 2 discloses a zero gap structure which has a continuous, rectangular uneven cross section and which is joined to the electrodes by brazing. The structure allows a small electrolytic cell to be produced, but for a larger electrolytic cell, needs a large facility that joins the electrodes and the rectangular uneven surface together and achieves poor productivity. Moreover, for a large electrolytic cell, the structure may involve a large amount of gas bubbles retained in an internal upper position of the cell and is thus not preferable.

Patent Literature 3 discloses a zero gap electrolysis unit for chlor-alkali electrolysis. However, the electrolysis unit comprises a gas liquid separation chamber, and an anode chamber and a cathode chamber are large in depth, and thus, when an electrolytic cell is formed by arranging a large number of the electrolysis units, the resultant electrolytic cell is long. The zero gap electrolysis unit also has the disadvantages of being heavy and expensive and needing a large installation area for the electrolytic cell. Furthermore, as materials that allow chlorine and hydrogen to be generated, titanium is used for the anode chamber, and nickel is used for the cathode chamber. Thus, to produce a bipolar electrolysis unit, the zero gap electrolysis unit needs to join a nickel partition wall and a titanium partition wall together back to back and is complicated.

Patent Literature 4 discloses a nonconductive frame in which a cell structure includes a peripheral portion with channels supporting the anode and the cathode, respectively, and an end plate to which the anode and the cathode are attached. This electrochemical cell structure comprises the components including the end plate and integrated together using an adhesive, polymer welding, or the like. The cell structure enables a small electrolysis apparatus to be produced but has much difficulty producing a large electrolytic cell that generates a large amount of hydrogen.

For alkaline water electrolysis, needs for an anode that generates oxygen include, besides a low overvoltage for oxygen generation, the unlikelihood of corrosion of a base material for the electrodes or a catalytic layer, dissolution into the electrolytic solution, and the like in an environment in which exposure to alkaline water containing NaOH, KOH, or the like occurs, in spite of the use of an unstable current such as renewable energy. Thus, as a conductive base material for the anode, nickel, nickel alloy, stainless steel, or iron or stainless steel with nickel-plated surfaces is used. Furthermore, as an electrode catalyst (catalytic layer), rare metal such as ruthenium or platinum, an oxide mainly comprising porous nickel, nickel, or cobalt, or the like is used.

As a method for reducing the oxygen overvoltage in alkaline water electrolysis using nickel as an electrode catalyst, increasing the surface area of the electrode catalyst to reduce the actual current density has been proposed. For the increased surface of the electrode catalyst, the use of Raney nickel electrodes as a raw material with a large specific surface area has been proposed. The Raney nickel is nickel left after dissolution and removal only of aluminum from a Raney alloy comprising nickel and the aluminum by means of alkali such as NaOH. The Raney nickel has a large number of pores formed therein when the aluminum is dissolved, and thus has porosity and a very large specific surface area. Accordingly, the Raney nickel is very responsive. As a method for producing Raney nickel electrodes, a method is known which involves forming a Raney alloy layer on a surface of conductive base material such as a nickel net by a method such as electroplating or plasma spraying, and then developing the Raney alloy layer by means of alkali such as NaOH (see Patent Literatures 5 to 7 and Non-Patent Literature 3 described below). However, all of the methods pose a problem in terms of performance such as a rise in oxygen generating overvoltage in a short period of time.

Patent Literature 8 discloses electrodes produced by plasma spraying coating, which are not suitable as water electrolysis electrodes in terms of specific surface area, pore size, composition, and the like. Thus, the electrodes as disclosed in Patent Literature 8 fail to provide satisfactory performance as oxygen generating electrodes.

CITATION LIST

Patent Literature

Patent Literature 1: Japanese Patent Application Laid-Open Publication No. 2002-332586
Patent Literature 2: Japanese Patent Application Laid-Open Publication No. 2009-149932
Patent Literature 3: Japanese Patent No. 4453973
Patent Literature 4: Japanese Patent Application Laid-Open Publication No. 2008-274432
Patent Literature 5: Japanese Patent No. S53-54174
Patent Literature 6: Japanese Patent Application Laid-Open Publication No. S60-159184
Patent Literature 7: Japanese Patent Application Laid-Open Publication No. S57-57880
Patent Literature 8: Japanese Patent Application Laid-Open Publication No. H4-301062

Non-Patent Literature

Non-Patent Literature 1: Abstract Ebara Engineering Review No. 177 (1997-10)
Non-Patent Literature 2: Hydrogen Energy. Edited by Stolten (Hydrogen and Fuel Cells Fundamentals, Technologies and Applications P243-P270) Copyright 2010 WILKY-VCH Verlag GmbH & KGaA, Weinheim ISBN: 978-527-32711-9
Non-Patent Literature 3: Tsuyoshi Morita et al., "Alkali Ion Exchange Membrane Water Electrolysis", Reports of the Research Laboratory, Asahi Glass Co., Ltd. Vol. 35[1], (1985)

SUMMARY OF INVENTION

Technical Problem

As described above, for the conventional electrolytic cell, not only is it difficult to perform stable electrolysis in a large alkaline water electrolysis unit at a high current density and a low voltage using an unstable power supply but also assembly of the electrolytic cell is cumbersome and facility costs are likely to be high.

The present invention is aimed not only to enable electrolysis at a high current density by integrating a diagram, electrodes, and an outer frame together but also to simplify the assembly of the electrolytic cell. As a result, stable electrolysis can be performed in a large electrolytic cell with an electrode surface of 0.1 $m^2$ to 3 $m^2$ or more per cell. Furthermore, a bipolar alkaline water electrolysis unit and an electrolytic cell can be provided which need only low facility costs and enable stable electrolysis.

Solution to Problem

As a result of earnest examinations, the inventors have arrived at the present invention by finding that provision of an outer frame that surrounds a partition wall in the bipolar alkaline water electrolysis unit prevents an ion permeable diaphragm and electrodes (an anode and a cathode) from being broken, allows the unit to be easily assembled, and facility costs can be kept down even when electrolysis is performed at a high current density of 3 $kA/m^2$ or more.

That is, a bipolar alkaline water electrolysis unit according to an aspect of the present invention is a bipolar alkaline water electrolysis unit comprising in an electrolytic cell for electrolyzing an electrolytic solution of alkaline water to obtain oxygen and hydrogen, the bipolar alkaline water electrolysis unit comprising an anode comprising an oxygen generating porous medium, a hydrogen generating cathode, a conductive partition wall that separates the anode and the cathode from each other, and an outer frame that surrounds the conductive partition wall, wherein a gas and electrolytic solution passage is provided at an upper portion of the conductive partition wall and/or the outer frame, and an electrolytic solution passage is provided at a lower part of the conductive partition wall and/or the outer frame.

In an embodiment, the anode or the cathode may be supported by the conductive partition wall via a conductive elastic medium.

In an embodiment, the anode or the cathode may be supported by the conductive partition wall via a conductive support medium.

In an embodiment, the anode comprises a conductive base material and a catalytic layer disposed on the conductive base material, pores containing a metal crystal of nickel are formed in the catalytic layer, and when an X ray diffracted by a (1 1 1) face of the metal crystal of the nickel in the catalytic layer has a peak intensity INi and an X ray diffracted by a (0 1 2) face of the metal crystal of the nickel in the catalytic layer has a peak intensity INiO, a value of [INi/(INi+INiO)]×100 may be 75 to 100%. INi/(INi+INiO) is a rate of metal nickel in a content of the metal nickel and nickel oxide in the catalytic layer.

In an embodiment, of the pores formed in the catalytic layer, a first pore with a pore size of 2 to 5 nm may have a specific surface area of 0.6 to 2.0 m$^2$/g, and the first pore may have a pore volume of $3\times10^{-4}$ to $9\times10^{-4}$ ml/g, and of the pores, a second pore with a pore size of 0.01 to 2.00 μm may have a specific surface area of 2.0 to 5.0 m$^2$/g, and the second pore may have a pore volume of 0.04 to 0.2 ml/g.

The specific surface area refers to the value resulting from division, by the mass of the anode catalyst, of the surface area of each of those of the pores formed in the catalytic layer (anode catalyst) which have a pore size within a predetermined range. The pore volume refers to a value resulting from division, by the mass of the catalytic layer, of the volume of each of those of the pores formed in the catalytic layer which have a pore size within a predetermined range. In the anode in the present application, the first pore and the second pore have respective specific surface areas within predetermined ranges and respective pore volumes within predetermined ranges, and thus, the catalytic layer is porous but strong and allows an oxygen overvoltage to be kept at a small value over a long period of time. When an element mainly comprising a compound of rare metal, cobalt, manganese, or the like is attached to a surface of the catalytic layer with the above-described pores by a method such as dispersion plating, an anode can also be obtained which has a higher strength and a lower oxygen overvoltage.

In an embodiment, a thickness of catalytic layer may be 50 to 80 μm. Since the pore size and specific surface area of the catalytic layer are adjusted to within the optimum ranges, an oxygen generating overvoltage is low. Furthermore, the anode has a large surface area and is thus resistant to oxidation and reduction caused by a fluctuation in the potentials of the electrodes. Thus, the anode is adapted to an electrolytic cell for alkaline water electrolysis to enable water electrolysis at a low voltage, making the anode very resistant even to electrolysis using a varying power supply.

In an embodiment, the catalytic layer may be fixated by a first step of spraying nickel oxide onto a conductive base material by a spraying method and a second step of reducing the nickel oxide sprayed on the conductive base material.

In an embodiment, the catalytic layer may be formed by reducing the nickel oxide sprayed on the conductive base material by means water electrolysis using the nickel oxide sprayed on the conductive base materials as a cathode.

In an embodiment, the catalytic layer may be formed by reducing the nickel oxide sprayed on the conductive base material using hydrogen.

In an embodiment, the catalytic layer may be formed by reducing the nickel oxide at 180 to 250° C. using hydrogen. Thus, the desired pore size, the desired specific surface area, and the desired pore volume may be easily achieved.

In an embodiment, a step may be provided in which the catalytic layer granulates the nickel oxide before the first step. In this case, a particle size of powder of the nickel oxide is 1.0 to 5.0 μm before granulation.

In an embodiment, the bipolar alkaline water electrolysis unit may comprise a thin metal plate part extending from the conductive partition wall and covering at least a part of the outer frame, and the outer frame may be fixed to the thin metal plate part to provide an integral structure. In this manner, in the alkaline water electrolysis unit, the anode, the cathode, and the conductive partition wall are integrated with the outer frame. Thus, for example, when a large number of bipolar alkaline water electrolysis units are arranged and an ion permeable diaphragm and a gasket are sandwiched between the bipolar alkaline water electrolysis units to provide an electrolytic cell, electrolytic cell can be reliably, very easily assembled due to a small number of components. Furthermore, the reliable assembly of the electrolytic cell allows accurate provision of an anode chamber space comprising the conductive partition wall, the outer frame, the anode, and the like and a cathode chamber space comprising the conductive partition wall, the outer frame, the cathode, and the like. Additionally, the reliable assembly is effective for suppressing retention of the gas and reducing a pressure loss in letting out an electrolytic solution and the generated gas, allowing electrolysis at a high current density to be easily achieved. As a result, the number of alkaline water electrolysis units can be reduced in manufacturing an electrolytic cell that allows a desired amount of hydrogen to be generated, enabling a reduction in facility costs.

In the above-described configuration, a conductive elastic medium may be provided which is disposed between the conductive partition wall and the cathode or the anode and which supports the anode or the cathode so that the anode or the cathode is movable relative to the conductive partition wall, enabling a zero gap structure to be implemented. When, to form an electrolytic cell, the ion permeable diaphragm is disposed between the adjacent alkaline water electrolysis units and sandwiched between the cathode of one of the alkaline water electrolysis units and the anode of the other alkaline water electrolysis unit, the cathode, the ion permeable diaphragm, and the anode can be brought into tight contact with one another uniformly by providing the conductive elastic medium that supports the cathode or the anode so that the cathode or the anode is movable relative to the conductive partition wall. As a result, the generated gas can be let out from rear surfaces of the cathode and the anode without resistance, and retention of gas bubbles, vibration during discharge of the generated gas, and the like can be prevented. Thus, stable electrolysis with a very low electrolytic voltage can be performed over a long period of time.

In an embodiment, the thin metal plate part may comprise an anode side flange pan overlapping the outer frame on the anode side and a cathode side flange pan overlapping the outer frame on the cathode side. The outer frame may be sandwiched between a flange portion of the anode side flange pan and a flange portion of the cathode side flange pan, and a distance from an anode side reference surface including a surface on the anode side of the conductive partition wall to a flange surface of the anode side flange pan and a distance from a cathode side reference surface including a surface on the cathode side of the conductive partition wall to a flange surface of the cathode side flange pan may each be 5 mm or more and 40 mm or less.

In an embodiment, a part or all of the outer frame may be resin, and an outer frame may be provided which surrounds the conductive partition wall and holds the conductive partition wall in a sandwiching manner.

In an embodiment, a distance from an anode side surface of the outer frame to an anode side surface of the partition wall and a distance from a cathode side surface of the outer frame to a cathode side surface of the partition wall may each be 5 mm or more and 40 mm or less.

In an embodiment, the outer frame may be divided into an anode side frame part disposed on the anode side of the conductive partition wall and a cathode side frame part disposed on the cathode side of the conductive partition wall, and a part of the conductive partition wall may be sandwiched between the anode side frame part and the cathode side frame part.

In an embodiment, a thickness of the anode side frame part and a thickness of the cathode side frame part may each be 5 mm or more and 40 mm or less.

In an embodiment, the conductive elastic medium may be a spring.

In an embodiment, the conductive elastic medium may comprise a current collector and a cushion mat layer, and the cathode or the anode may contact with the cushion mat layer.

In an embodiment, the outer frame may comprise a material selected from a vinyl chloride resin, a polyethylene resin, a polypropylene resin, a polyphenylene ether resin, a polyphenylene sulfide resin, a polysulphone resin, a polyether sulphone resin, a polyether ether ketone resin, an epoxy resin, nickel, a nickel alloy, stainless steel, or mild steel or stainless steel plated with nickel.

In an embodiment, the cathode may comprise a mild steel, a stainless steel, a nickel alloy base material, or a base material comprising mild steel or a nickel alloy plated with nickel, the base material being coated with a metal selected from platinum group metals, nickel, cobalt, molybdenum, or manganese or an alloy or an oxide thereof.

In an embodiment, a rib for fixing the anode, the cathode, or the spring may be attached to the conductive partition wall.

In an embodiment, a rib for fixing the anode, the cathode, or the current collector may be attached to conductive partition wall.

In an embodiment, at least one of a surface of the partition wall, a surface of a part of the conductive elastic medium, or a surface of the current collector may be coated with a selected one of Raney nickel, porous nickel, and porous nickel oxide.

In an embodiment, a gas and electrolytic solution passage provided at the upper portion of the conductive partition wall and/or the outer frame may be an anode liquid and gas conduit and a cathode liquid and gas conduit, an electrolytic solution passage provided at the lower part of the conductive partition wall and/or the outer frame may be an anode liquid conduit and a cathode liquid conduit, and an inner surface of each of the conduits may be lined with rubber or resin.

Furthermore, the bipolar alkaline water electrolysis unit can be easily configured when the conductive partition wall is supported by incorporating a part of the conductive partition wall into the resin outer frame and holding the conductive partition wall in a sandwiching manner. Thus, a plurality of bipolar electrolytic cells can be relatively easily assembled in which a large number of bipolar alkaline water electrolysis units are arranged and in which a gas permeable diaphragm and a gasket are sandwiched between the bipolar alkaline water electrolysis units. However, metal is typically used as the conductive partition wall, and the resin outer frame holding the conductive partition wall in a sandwiching manner has a linear coefficient of expansion different from a linear coefficient of expansion of the conductive partition wall. In general, resin stretches more significantly than metal, and thus, stress may be generated at an interface between the resin outer frame and the conductive partition wall by thermal expansion or contraction. This may lead to a gap between the resin and the partition wall or a crack. To prevent this, it is preferable to select a resin with a linear coefficient of expansion close to the linear coefficient of expansion of the conductive partition wall and to improve the adhesion property or adhesiveness of the tightly contacted surfaces of the resin outer frame and the conductive partition wall. Then, even when the conductive partition wall thermally expands, the thermal expansion can be absorbed.

Thus, the embodiments allow easy, accurate, and sufficient provision of the anode chamber space defined by the conductive partition wall, the outer frame, and the anode and the cathode chamber space defined by the conductive partition wall, the outer frame, and the cathode. Consequently, the embodiments are effective for suppressing retention of the gas and reducing a pressure loss in letting out the electrolytic solution and the generated gas, allowing electrolysis at a high current density to be easily achieved. As a result, the number of alkaline water electrolysis units can be reduced in manufacturing an electrolytic cell that allows a desired amount of hydrogen to be generated, enabling a reduction in facility costs.

An electrolytic cell according to an aspect of the present invention is an electrolytic cell for electrolyzing an electrolytic solution of alkaline water to obtain oxygen and hydrogen, the electrolytic cell comprising a plurality of the bipolar alkaline water electrolysis units, an anode terminal unit provided with an anode feeding terminal and an anode, a cathode terminal unit provided with a cathode feeding terminal and a cathode, and a plurality of ion permeable diaphragms, wherein the bipolar alkaline water electrolysis units are disposed between the anode terminal unit and the cathode terminal unit, and the ion permeable diaphragms are disposed between the anode terminal unit and the bipolar alkaline water electrolysis unit, between the adjacently disposed bipolar alkaline water electrolysis units, and between the bipolar alkaline water electrolysis unit and the cathode terminal unit.

Advantageous Effects of Invention

According to the present invention, stable electrolysis can be performed at a low voltage in spite of a high current density using an unstable power supply based on renewable energy, the electrolytic cell can easily assembled, and facility costs can be kept down.

DESCRIPTION OF EMBODIMENTS

Figure 1:
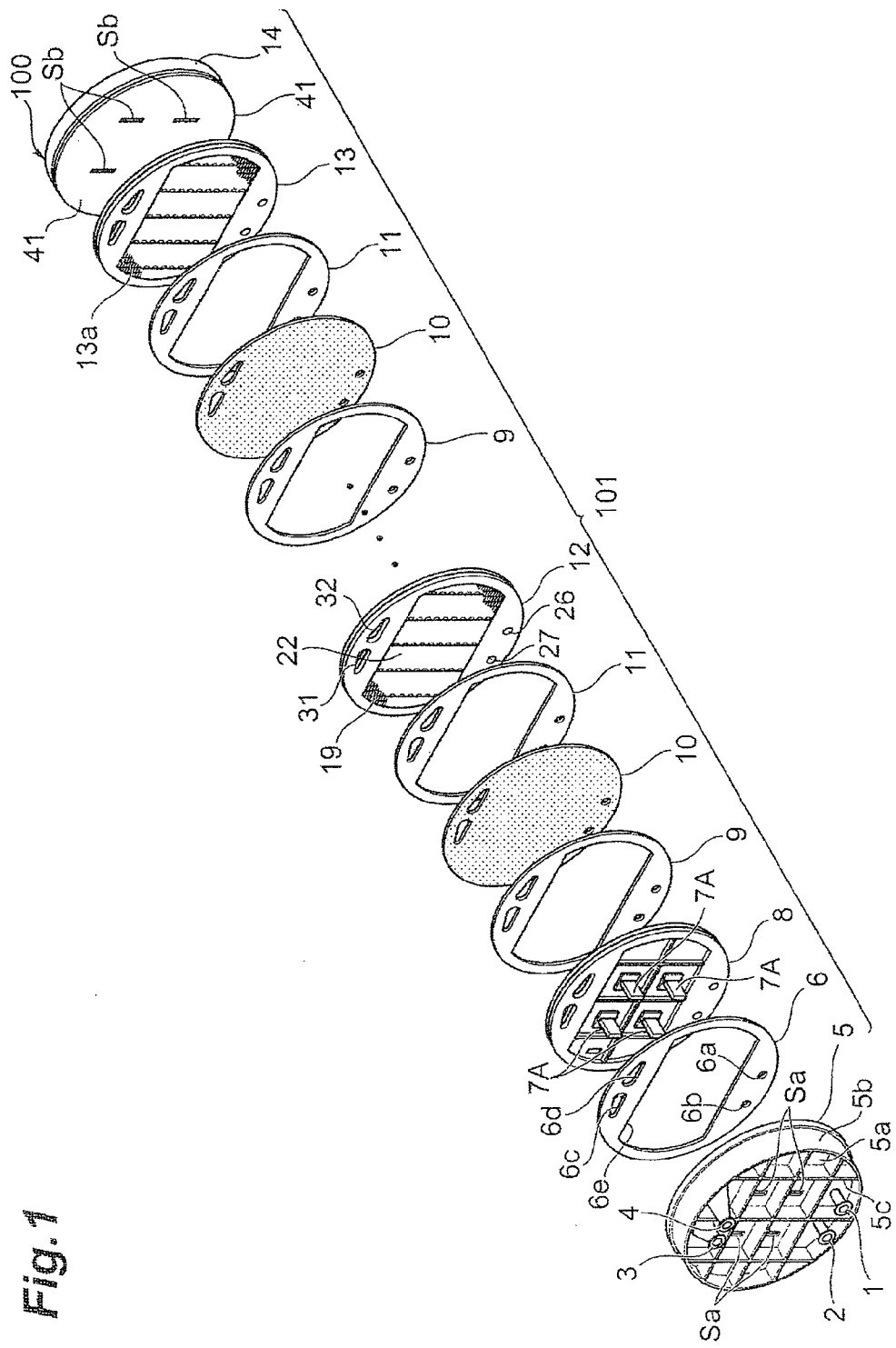
FIG. 1 is a perspective view depicting disposition of members providing a bipolar alkaline electrolysis unit that is a main part of an electrolytic cell.

Embodiments of the present invention will be described with reference to the drawings. However, the embodiments described below are illustrative for description of the present invention and are not intended to limit the present invention to contents described below. In the description, identical reference numerals are used for identical elements or elements with identical functions, and duplicate descriptions are omitted.

(Configuration of the Electrolytic Cell)

As depicted in FIGS. 1 to 3 and FIG. 11 and FIG. 12, an electrolytic cell 100 according to the embodiments is an apparatus for electrolyzing an electrolytic solution of alkaline water to obtain oxygen and hydrogen. The electrolytic cell 100 comprises an electrolytic cell 101 comprising members. The members of the electrolytic cell 101 are integrated together by being clamped using tie rods 15 (see FIG. 2).

Figure 2:
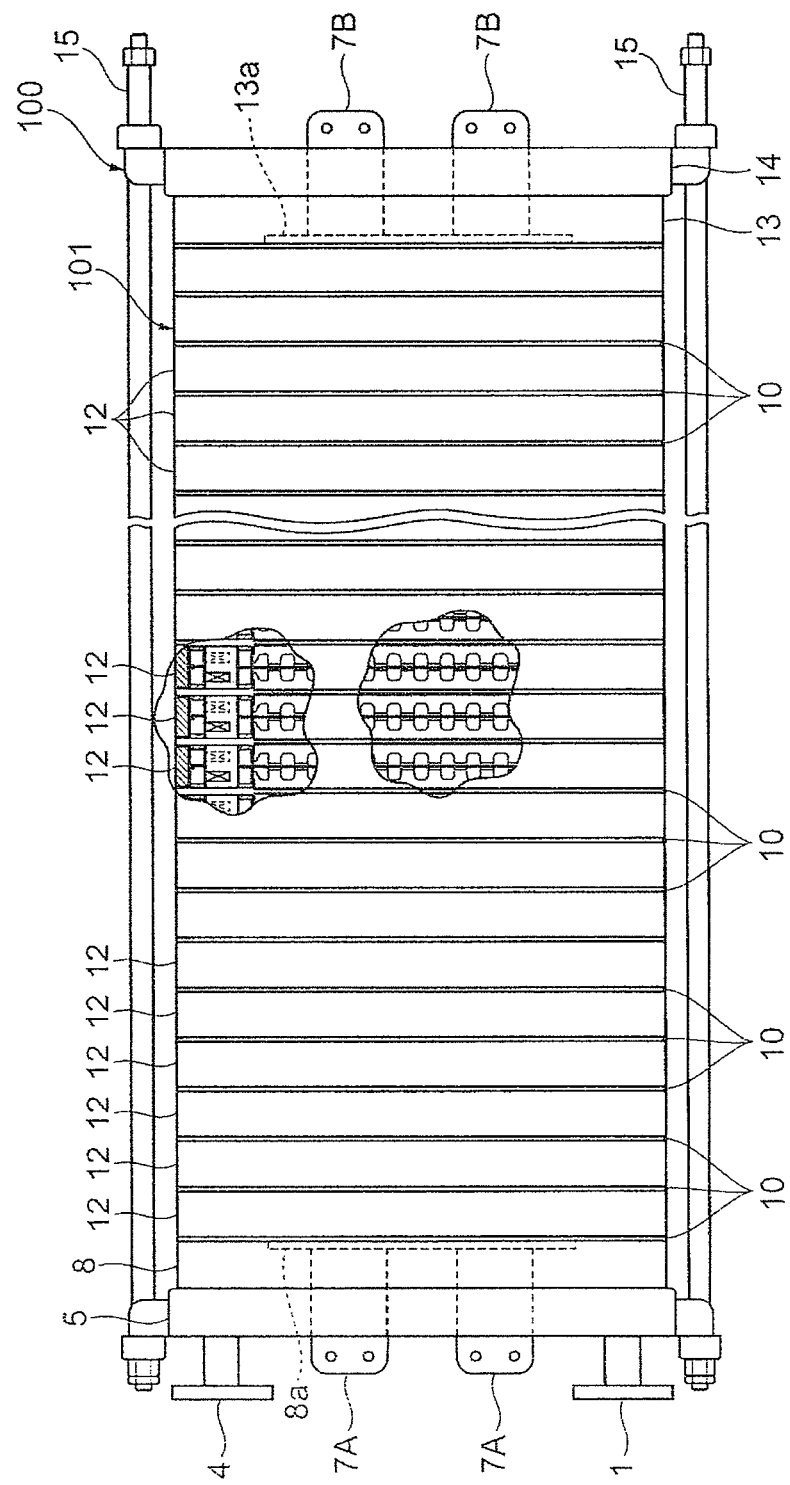
FIG. 2 is a partly exploded side view depicting the electrolytic cell.

The electrolytic cell 101 comprises a press flange 5, a press flange gasket 6, and an anode terminal unit 8 arranged in order and further comprises an anode gasket 9, an ion permeable diaphragm 10, a cathode gasket 11, and a bipolar alkaline water electrolysis unit 12 arranged in this order. The components from the anode gasket 9 to the bipolar alkaline water electrolysis unit 12 are repeatedly arranged until the needed numbers of the components for planned production are provided. Among the repeatedly arranged anode gaskets 9, ion permeable diaphragms 10, cathode gaskets 11, and bipolar alkaline water electrolysis units 12, FIG. 2 depicts only the ion permeable diaphragms 10 and the bipolar alkaline water electrolysis units 12 for convenience.

After the components from the anode gasket 9 to the bipolar alkaline water electrolysis unit 12 are repeatedly arranged until needed numbers of the components are provided (see FIG. 1), the anode gaskets 9, the ion permeable diaphragms 10, and the cathode gaskets 11 are arranged again. Finally, the cathode terminal unit 13, an insulating plate 41, and an end press flange 14 are arranged in this order to provide the electrolytic cell 101. The electrolytic cells 101 are integrated into the electrolytic cell 100 by being wholly clamped using the tie rods 15. The deposition providing the electrolytic cell 101 may be optionally selected either from an anode side or a cathode side and is not limited to the order according to the embodiments. In other words, the electrolytic cell 101 implements an aspect in which the bipolar alkaline water electrolysis units 12 are disposed between the anode terminal unit 8 and the cathode terminal unit 13, and the ion permeable diaphragms 10 are each disposed between the anode terminal unit 8 and the bipolar alkaline water electrolysis unit 12, between the adjacent bipolar alkaline water electrolysis units 12, and between the bipolar alkaline water electrolysis unit 12 and the cathode terminal unit 13.

The press flange 5 is provided with a short cylinder-shaped outer frame 5b along an edge of a disc-shaped cover portion 5a. Moreover, the cover portion 5a is provided with a lattice-shaped reinforcing rib 5c. Furthermore, the press flange 5 is provided with an anode liquid inlet nozzle 1, a cathode liquid inlet nozzle 2, an anode and gas outlet nozzle 3, and a cathode liquid and gas outlet nozzle 4 all of which penetrate the cover portion 5a. Moreover, the cover portion 5a has slits 5a formed at four positions and though which anode feeding terminals 7A are inserted.

The press flange gasket 6 has a channel hole 6a that communicates with the anode liquid inlet nozzle 1, channel hole 6b that communicates with the cathode liquid inlet nozzle 2, a channel hole 6c that communicates with the anode liquid and gas outlet nozzle 3, and a channel hole 6d that communicates with the cathode liquid and gas outlet nozzle 4, and further has a hole portion 6e that allows the anode feeding terminal 7A to pass through.

The anode terminal unit 8 is provided with four anode feeding terminals 7A projecting toward the press flange 5 side and an anode 8a (see FIG. 2) provided on a side of the adjacent anode gasket 9.

On the other hand, the cathode terminal unit 13 is provided with a cathode 13a provided on a side of the cathode terminal unit 13 closer to the adjacent cathode gasket 11, and four cathode feeding terminal 7B projecting toward the end press flange 14. The insulating plate 41 and the end press flange 14 have slits Sb formed at four positions and through which the cathode feeding terminal 7B is inserted.

(Bipolar Alkaline Water Electrolytic Unit)

Figure 4:
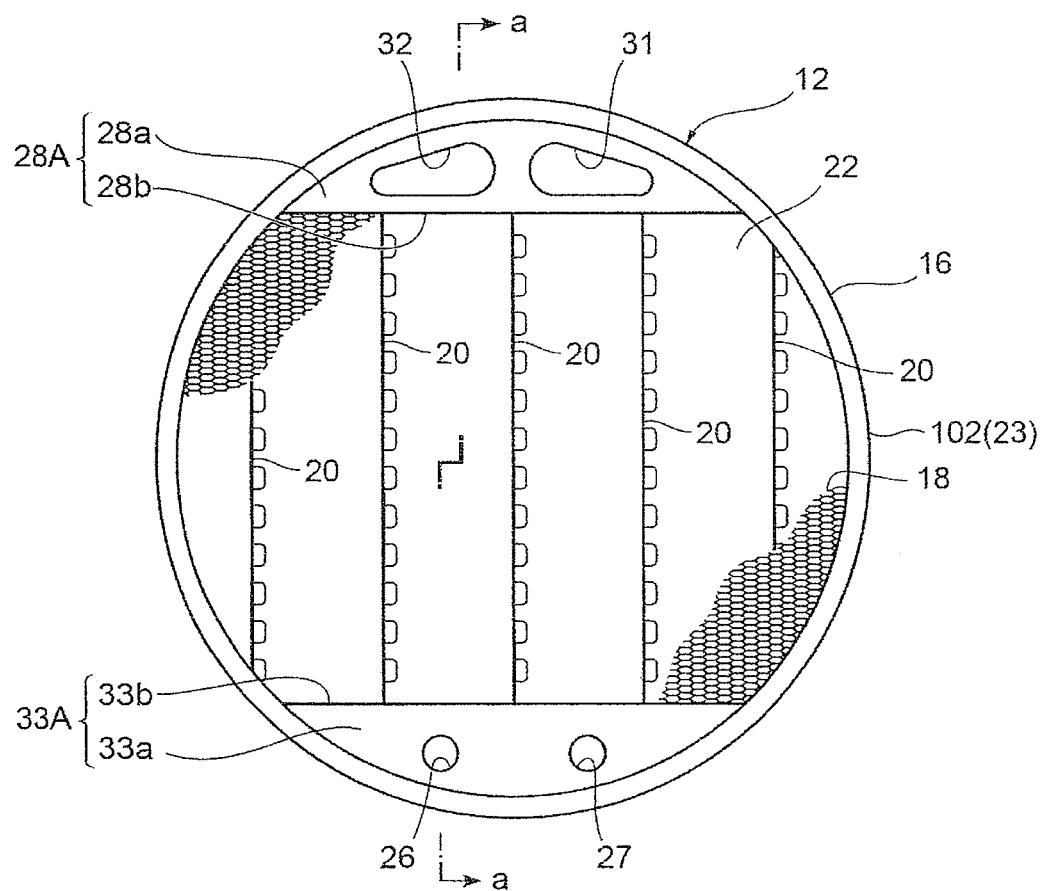
FIG. 4 is a plan view of a bipolar alkaline water electrolysis unit according to a first embodiment as viewed from an anode side.
Figure 5:
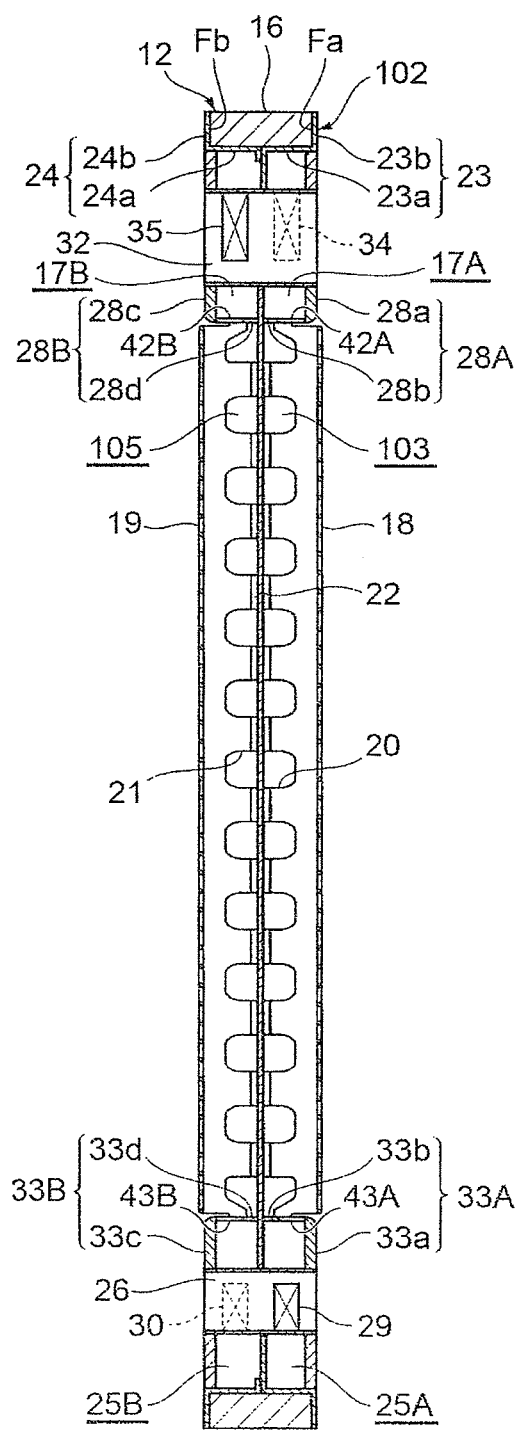
FIG. 5 is a cross-sectional view taken along line a-a in FIG. 4.

The bipolar alkaline water electrolysis unit (hereinafter referred to as an "electrolysis unit") 12 according to a first embodiment will be described in detail with reference to FIG. 4 and FIG. 5. FIG. 4 is a plan view of the electrolysis unit 12. FIG. 5 is a cross-sectional view taken along line V-V in FIG. 4. The electrolysis unit 12 comprises a disc-shaped conductive partition wall (hereinafter referred to as a "partition wall") 22 that separates the anode 18 side from the cathode 19 side. An annular outer frame (outer frame) 16 is disposed along an outer edge of the partition wall 22 so as to surround the partition wall 22.

The partition wall 22 is provided with an anode side flange pan 23 at an outer periphery thereof which extends from the partition wall 22 and abuts against a part of the outer frame 16 so as to cover the part. Furthermore, the partition wall 22 is provided with a cathode side flange pan 24 at the outer periphery thereof which extends from the partition wall 22 and abuts against a part of the outer frame 16 so as to cover the part. The anode side flange pan 23 and the cathode side flange pan 24 provide a thin metal plate part 102 that is attached to the outer frame 16.

Figure 6:
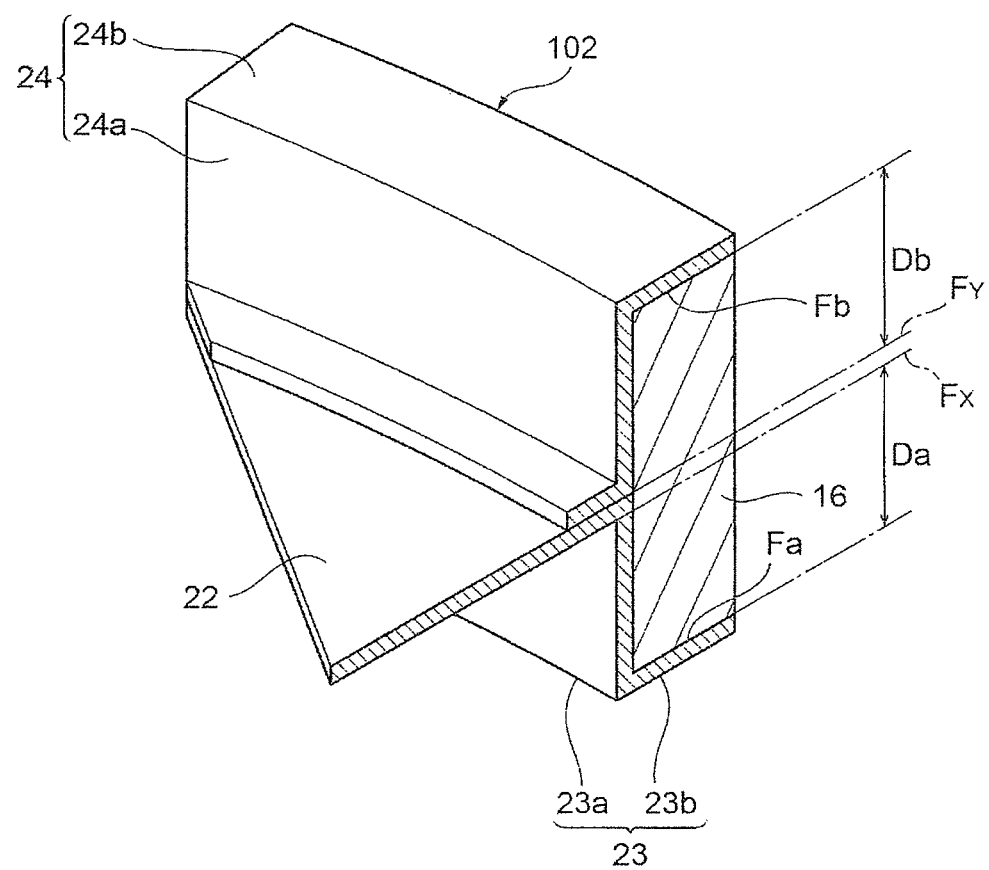
FIG. 6 is a perspective view schematically depicting a junction structure of an anode side flange pan, a cathode side flange pan, and an outer frame.

As depicted in FIG. 5 and FIG. 6, the anode side flange pan 23 comprises a peripheral wall portion 23a formed to bend from the partition wall 22 toward the anode 18 side and a flange portion 23b bending further from the peripheral wall portion 23a to extend in a radial direction of the partition wall 22. Furthermore, the cathode side flange pan 24 has a geometrically symmetrical relationship to the anode side flange pan 23 across the outer frame 16. Specifically, the cathode side flange pan 24 comprises a peripheral wall portion 24a bending from the partition wall 22 toward the cathode 19 side and a flange portion 24b bending further from the peripheral wall portion 24a to extend in a radial direction of the partition wall 22.

The partition wall 22 according to the present embodiment comprises a conductive metal steel plate. The anode side flange pan 23 is formed by bending the metal steel plate. Thus, the partition wall 22 and the anode side flange pan 23 are integral members. Furthermore, the cathode side flange pan 24 comprises a conductive metal steel plate and is integrated with the partition wall 22 by being joined to the partition wall 22. For a method for joining the cathode side flange pan 24 to the partition wall 22, the junction needs to be achieved by laser welding, Tig welding, or the like so that the electrolytic solution or a gas will not leak to the outside. In the present embodiment, the thin metal plate part 102 is formed by bending the partition wall 22 to form the anode side flange pan 23, and joining the cathode side flange pan 24, comprising a member separate from the anode side flange pan 23, to the partition wall 22. However, the thin metal plate part 102 may be formed by bending the partition wall 22 to form the cathode side flange pan 24, and joining the anode side flange pan 23, comprising a member separate from the cathode side flange pan 24, to the partition wall 22.

Furthermore, the anode side flange pan 23 and the cathode side flange pan 24 hold the outer frame 16 in a sandwiching manner so as to wrap a part of the outer frame 16. Specifically, the peripheral wall portion 23a of the anode side flange pan 23 is in abutting contact with an anode 18 side half of an inner peripheral surface of the annular outer frame 16. The peripheral wall portion 24a of the cathode side flange pan 24 is in abutting contact with a cathode 19 side half of the inner peripheral surface of the annular outer frame 16. Furthermore, the flange portion 23b of the anode side flange pan 23 overlaps an anode 18 side surface of the outer frame 16 in an abutting contact manner. The flange portion 24b of the cathode side flange pan 24 overlaps a cathode 19 side surface of the outer frame 16 in an abutting contact manner.

In other words, the outer frame 16 is sandwiched between the flange portion 23b of the anode side flange pan 23 and the flange portion 24b of the cathode side flange pan 24. A surface of the flange portion 23b which is in abutting contact with the outer frame 16 is a flange surface Fa. A surface of the flange portion 24b which is in abutting contact with the outer frame 16 is a flange surface Fb.

The anode side flange pan 23 and the cathode side flange pan 24 are desirably fixed to the outer frame 16 by welding or any other fixing method so as not have a gap or the like between the outer frame 16 and the flange pans 23 and 24. However, even if the flange pans 23 and 24 are not fixed to the outer frame 16, it is sufficient to attach the flange pans 23 and 24 to the outer frame 16 using means for preventing the flange pans 23 and 24 from being detached from the outer frame 16.

As depicted in FIG. 4 and FIG. 5, an anode upper cover plate 28A is provided at an upper portion of the partition wall 22 and inside (below) the anode side flange pan 23. The anode upper cover plate 28A comprises a bow-shaped (a shape formed by a circular arc and a string) cover main body 28a along the anode side flange pan 23 and an outlet wall 28b bending at a lower end of the cover main body 28a to come into abutting contact with the partition wall 22. An anode upper hole 42A is formed in the outlet wall 28b. The anode side flange pan 23, the partition wall 22, and the anode upper cover plate 28A form an anode chamber outlet space portion 17A. The anode upper hole 42A is in communication with an upper portion of an anode chamber 103.

Similarly, a cathode upper cover plate 28B is provided at an upper portion of the partition wall 22 and inside (below) the cathode side flange pan 24. The cathode upper cover plate 28B comprises a bow-shaped (a shape formed by a circular arc and a string) cover main body 28c along the cathode side flange pan 24 and an outlet wall 28d bending at a lower end of the cover main body 28c to come into abutting contact with the partition wall 22. A cathode upper hole 42B is formed in the outlet wall 28d. The cathode side flange pan 24, the partition wall 22, and the cathode upper cover plate 28B form a cathode chamber outlet space portion 17B. The cathode upper hole 42B is in communication with an upper portion of a cathode chamber 105.

Furthermore, an anode lower cover plate 33A is provided at a lower part of the partition wall 22 and inside the anode side flange pan 23. The anode lower cover plate 33A comprises a bow-shaped (a shape formed by a circular arc and a string) cover main body 33a along the anode side flange pan 23 and an inlet wall 33b bending at an upper end of the cover main body 33a to come into abutting contact with the partition wall 22. An anode lower hole 43A is formed in the inlet wall 33b. The anode side flange pan 23, the partition wall 22, and the anode lower cover plate 33A form an anode chamber inlet space portion 25A. The anode lower hole 43A is in communication with a lower part of the anode chamber 103.

Similarly, a cathode lower cover plate 33B is provided at a lower part of the partition wall 22 and inside (above) the cathode side flange pan 24. The cathode lower cover plate 33B comprises a bow-shaped (a shape formed by a circular arc and a string) cover main body 33c along the cathode side flange pan 24 and an inlet wall 33d bending at an upper end of the cover main body 33c to come into abutting contact with the partition wall 22. A cathode lower hole 43B is formed in the inlet wall 33d. The cathode side flange pan 24, the partition wall 22, and the cathode lower cover plate 33B form a cathode chamber inlet space portion 25B. The cathode lower hole 43B is in communication with a lower part of the cathode chamber 105.

The anode chamber inlet space portion 25A is provided with an anode liquid conduit 26 (see FIG. 4) with an anode liquid introduction hole 29 through which an electrolytic solution (anode liquid) is introduced into the anode chamber 103. The cathode chamber inlet space portion 25B is provided with a cathode liquid conduit 27 with a cathode liquid introduction hole 30 through which an electrolytic solution (cathode liquid) is introduced into the cathode chamber 105.

The anode chamber outlet space portion 17A is provided with an anode liquid and gas conduit 31 (see FIG. 4) with an anode liquid and gas discharge hole 34 through which the electrolytic solution (anode liquid) and the gas are let out from inside the anode chamber 103. The cathode chamber outlet space portion 17B is provided with a cathode liquid and gas conduit 32 with a cathode liquid and gas discharge hole 35 through which the electrolytic solution (cathode liquid) and the gas are let out from inside the cathode chamber 105.

A pair of openings is formed at the upper portion of the partition wall 22 at positions corresponding to the anode liquid and gas conduit 31 and the cathode liquid and gas conduit 32, respectively. The anode liquid and gas conduit 31 is installed in one of the openings in an inserting manner. The cathode liquid and gas conduit 32 is installed in the other opening in an inserting manner. In the present embodiment, the anode liquid and gas conduit 31 and the cathode liquid and gas conduit 32 form a passage for the electrolytic solution and the gas.

Furthermore, a pair of openings is formed at the lower part of the partition wall 22 at positions corresponding to the anode liquid conduit 26 and the cathode liquid conduit 27, respectively. The anode liquid conduit 26 is installed in one of the openings in an inserting manner. The cathode liquid conduit 27 is installed in the other opening in an inserting manner. In the present embodiment, the anode liquid conduit 26 and the cathode liquid conduit 27 form a passage for the electrolytic solution.

In the present embodiment, the electrolytic cells 101 of the electrolytic cell 100 are integrated together by being clamped using the tie rod 15 to provide what is called a filter press electrolytic cell. For the filter press electrolytic cell, a large number of the electrolysis units 12 are clamped, and thus, the outer frame 16 is subjected to a direct pressing force and needs to have a strength sufficient to withstand a clamping pressure.

Furthermore, the outer frame 16 is a portion that does not contact the electrolytic solution or the generated gas and thus need not be very resistant to corrosion. However, electrolysis may occur at 80° C. to 90° C., and thus, a heat-resistant resin, nickel, a nickel alloy, stainless steel, mild steel, or nickel-plated stainless steel may be utilized. When the resin is used, any of the following resins or the like may be used as the outer frame: a vinyl chloride resin, a polyethylene resin, a polypropylene resin, a polyphenylene ether resin, a polyphenylene sulfide resin, a polysulphone resin, a polyethersulphone resin, a polyether ether ketone resin, and an epoxy resin.

An anode rib 20 and a cathode rib 21 are attached to the partition wall 22. The anode rib 20 and the cathode rib 21 serve not only to support the anode 18 or the cathode 19 but also to conduct current from the partition wall 22 to the anode 18 or the cathode 19. Thus, in general, a conducive metal is used for the anode rib 20 and the cathode rib 21. For example, mild steel or stainless steel plated with nickel or nickel may be utilized. Furthermore, the thicknesses of the anode rib 20 and the cathode rib 21 are selected from the range of 0.5 mm to 5 mm in view of costs, productivity, strength, and the like.

The distance between the adjacent anode ribs 20 or the distance between the adjacent cathode ribs 21 is determined in view of an electrolysis pressure, a pressure difference between the anode chamber 103 and the cathode chamber 105, and the like. If the distance between the adjacent anode ribs 20 or the distance between the adjacent cathode ribs 21 is excessively short, then disadvantageously, the fluidity of the electrolytic solution or the gas is hindered but the costs are high. An excessively long distance is disadvantageous in that such a distance may cause deformation of the electrodes (anode 18 and cathode 19) held by means of a slight difference in pressure between the anode chamber 103 and the cathode chamber 105 or reduce the number of anode ribs 20 or cathode ribs 21, resulting in increased electric resistance. Thus, typically, the distance is preferably selected from the range of 50 mm to 150 mm. Laser welding or a Tig welding method, or the like is used to attach the anode rib 20 and the cathode rib 21 to the partition wall 22.

The heights of the anode rib 20 and the cathode rib 21 are appropriately determined based on the distance from the partition wall 22 to each of the flange portions 23b and 24b of the flange pans 23 and 24 extending from the partition wall 22, the thickness of the gasket, the thicknesses of the electrodes (anode 18 and cathode 19), the distance between the anode 18 and the cathode 19, and the like. The present embodiment adopts the following dimensional conditions.

That is, in the present embodiment, a net-shaped or porous-plate-shaped anode 18 is attached on the anode rib 20, and a net-shaped or porous-plate-shaped cathode 19 is attached on the cathode rib 21. The height of each of the ribs 20, 21 is set the same as or smaller than the height in a state where the gaskets 9, 11 are stuck on the flange portion 23b, 24b of the flange pans 23, 24, respectively. If the height of the anode rib 20 or the cathode rib 21 is larger than the same height as that in the state where the gaskets 9, 11 are stuck on the flange portion 23b, 24b of the flange pans 23, 24, respectively, an elastic medium needs to be placed between the anode 18 or the cathode 19 and each of the ribs 20, 21. Without an elastic medium, the ion permeable diaphragm 10 may be damaged. This is not preferable.

Furthermore, the anode rib 20 or the cathode rib 21 is easily used when the thickness of the anode rib 20 or the cathode rib 21 is 1 mm to 2 mm. However, the thickness of the anode rib 20 or the cathode rib 21 is not particularly limited. The method for attaching the anode 18 or the cathode 19 to the anode rib 20 or the cathode rib 21 is typically spot welding but may be a method based on laser welding, Tig welding, or the like. An alternative method may involve using a wire or a string-like member to tie the anode 19 or the cathode 19 to the anode rib 20 or the cathode rib 21 in a close contact manner. Like the anode 18 or the cathode 19, the anode rib 20 or the cathode rib 21 is fixed to the partition wall 22 by means such as spot welding, laser welding, or Tig welding.

The anode chamber 103 is defined by the peripheral wall portion 23a of the anode side flange pan 23, the partition wall 22, the anode upper cover plate 28A, the anode lower cover plate 33A, and the anode 18. The volume of the anode chamber 103 is determined by the dimensions and shapes of the peripheral wall portion 23a of the anode side flange pan 23, the partition wall 22, the anode upper cover plate 28A, the anode lower cover plate 33A, and the anode 18. Furthermore, the cathode chamber 105 is defined by the peripheral wall portion 24a of the cathode side flange pan 24, the partition wall 22, the cathode upper cover plate 28B, the cathode lower cover plate 33B, and the cathode 19. The volume of the cathode chamber 105 is determined by the dimensions and shapes of the peripheral wall portion 24a of the cathode side flange pan 24, the partition wall 22, the cathode upper cover plate 28B, the cathode lower cover plate 33B, and the cathode 19.

During an alkaline water electrolysis operation, a gas is generated by the anode 18 and the cathode 19, and thus, the anode chamber 103 and the cathode chamber 105 are internally filled with the gas and the liquid. The ratio of the gas to the liquid (gas-liquid ratio) increases consistently with the current density. Furthermore, the gas-liquid ratio tends to increase with decreasing volumes of the anode 18 and the cathode 19. An excessively high gas-liquid ratio may affect circulation of the electrolytic solution to create a gas zone in the anode chamber 103 and the cathode chamber 105, thus increasing the electric resistance. Moreover, an adverse effect such as an increase in the amount of gas transmitted may be exerted, leading to an increased voltage or a reduced gas purity.

Thus, an anode chamber depth and a cathode chamber depth are desirably determined depending on design electrolysis conditions. With an excessively large anode chamber depth or cathode chamber depth, when a large number of electrolysis unit 12 are arranged in series, not only is the electrolytic cell 100 long and needs a large space but facility costs are high. Furthermore, an excessively small depth excessively increases the gas-liquid ratio, leading to the adverse effects as described above. Here, the anode chamber depth is a distance Da (see FIG. 3 and FIG. 6) from an anode side reference surface Fx including an anode 18 side surface of the partition wall 22 to a flange surface Fa of the anode side flange pan 23. The cathode chamber depth is a distance Db from a cathode side reference surface Fy including a cathode 19 side surface of the partition wall 22 to a flange surface Fa of the cathode side flange pan 24. The distance Da indicative of the anode chamber depth and the distance Db indicative of the cathode chamber depth are preferably 5 mm to 40 mm and most preferably 10 mm to 20 mm.

The external shape of the electrolysis unit 12 may be a circle, a square, a rectangle, or any other polygon but is preferably a square, a rectangle, or a circle for production. In particular, if an internal pressure is high during electrolysis, the circle is more preferable for making stress resulting from the pressure uniform. A material for the anode side flange pan 23 and the cathode side flange pan 24 needs to resist corrosion because of direct contact with the electrolytic solution or the gas. The alkaline water electrolysis is performed at 60° C. to 100° C. using a corrosive liquid such as caustic potash or caustic soda. Thus, a material that resists this condition is used. For example, a heat-resistant resin, nickel-plated mild steel or stainless steel, or nickel may be utilized.

In general, a conducive metal is used as a material for the partition wall 22. For example, nickel-plated mild steel or stainless steel or nickel may be utilized.

The thickness of the partition wall 22 need not be large when the anode rib 20 and the cathode rib 21 are joined to the partition wall 22 by welding or the like to provide an integral structure because the partition wall 22 is reinforced by the anode rib 20 and the cathode rib 21. A thickness of 0.5 mm to 2 mm is typically sufficient. A thickness of less than 0.5 mm is disadvantageous in that such a thickness makes welding of the anode rib 20 and the cathode rib 21 to the partition wall 22 difficult and also makes handling for production difficult. Furthermore, a thickness of more than 2 mm is not preferable in that such a thickness increases production costs and the weight of the electrolysis unit 12.

The cover plates 28A, 28B, 33A, 33B are provided with the anode upper hole 42A, the cathode upper hole 42B, the anode lower hole 43A, and the cathode lower hole 43B, respectively. Each of the cover plates 28A, 28B, 33A, 33B are joined to the flange pans 23, 24 and to the partition wall 22.

When a large number of electrolysis units 12 are arranged and clamped, a clamping pressure is exerted on the cover plates 28A, 28B, 33A, 33B. Thus, the cover plates 28A, 28B, 33A, 33B need to have a strength sufficient to resist the clamping pressure. Moreover, the cover plates 28A, 28B, 33A, 33B are exposed to the electrolytic solution or the gas. Thus, nickel-plated mild steel or stainless steel or nickel, which has both a strength and corrosion resistance, is preferably used as a material for the cover plates 28A, 28B, 33A, 33B. Moreover, the cover plates 28A, 28B, 33A, 33B also preferably have a thickness of 2 mm or more and more preferably 3 mm to 5 mm. An excessively large thickness increases not only the weight but also the costs and is thus not preferable. The shapes of the anode upper hole 42A, the cathode upper hole 42B, the anode lower hole 43A, and the cathode lower hole 43B may each be a circle, a polygon, a triangle, or the like. The anode upper hole 42A, the cathode upper hole 42B, the anode lower hole 43A, and the cathode lower hole 43B each need to have a sufficient area to allow the liquid or the gas to pass through. Thus, a large number of holes of 5 $mm^2$ to 300 $mm^2$ in area are formed.

The anode liquid conduit 26 and the cathode liquid conduit 27 penetrate the partition wall 22 and are joined to the anode lower cover plate 33A and the cathode lower cover plate 33B, respectively. Furthermore, the anode liquid and gas conduit 31 and the cathode liquid and gas conduit 32 penetrate the partition wall 22 and are joined to the anode upper cover plate 28A and the cathode upper cover plate 28B.

The conduits 26, 27, 31, 32 need to be joined to the partition wall 22 and the cover plates 28A, 28B, 33A, 33B so that no liquid or gas leaks from junction positions. Furthermore, when a large number of electrolysis units 12 are arranged and clamped, a clamping pressure is exerted on the conduits 26, 27, 31, 32 along with the cover plates 28A, 28B, 33A, 33B. Thus, the conduits 26, 27, 31, 32 need to have a strength sufficient to resist a certain degree of clamping pressure. Moreover, the conduits 26, 27, 31, 32 are exposed to the electrolytic solution or the gas. Thus, nickel-plated mild steel or stainless steel or nickel, which has both a strength and corrosion resistance, is preferably used as a material for the conduits 26, 27, 31, 32. Resin may also be used but the conduits 26, 27, 31, 32 need to be sealed with rubber packing, any other seal material, or the like so that the liquid or the gas will not leak from junction positions where the conduits 26, 27, 31, 32 are joined to the partition wall 22 and the cover plates 28A, 28B, 33A, 33B. Moreover, the conduit material also preferably has a thickness of 1 mm or more and more preferably 2 mm to 4 mm. An excessively large thickness increases not only the weight but also the costs and is thus not preferable.

For example, when inner surfaces of the conduits 26, 27, 31, 32 are metal, a potential difference from the adjacent electrolysis unit 12 cause a current to flow, resulting in electrolysis. This may lead to electric corrosion of the inner surfaces, generation of a gas, or a loss in current. Thus, the inner surfaces are preferably lined with rubber, resin, or the like and insulated.

Furthermore, the anode liquid conduit 26 and the cathode liquid conduit 27 provided at the lower part of the electrolysis unit 12 have an anode liquid introduction hole 29 and a cathode liquid introduction hole 30, respectively. The shapes of the introduction holes 29, 30 may each be round or polygonal and are not limited. However, round introduction holes are preferable for production. Furthermore, the positions of the introduction holes may be in the upper or lower part or on the right or left of the anode liquid conduit 26 or the cathode liquid conduit 27. The channel areas of the introduction holes 29, 30 may optionally be determined to the extent that the pressure loss is made as low as possible. Additionally, the introduction holes 29, 30 may each have a cross-sectional area appropriate to the supply amount of the electrolytic solution.

Furthermore, the anode liquid and gas conduit 31 and the cathode liquid and gas conduit 32 provided at the upper portion of the electrolysis unit 12 are passages through which a mixture of the electrolytic solution and the gas resulting from electrolysis passes. Thus, typically, the anode liquid and gas conduit 31 and the cathode liquid and gas conduit 32 preferably have a larger cross-sectional area than the anode liquid conduit 26 or the cathode liquid conduit 27 to make the pressure loss as low as possible. The shapes of the anode liquid and gas conduit 31 and the cathode liquid and gas conduit 32 are not particularly limited. For example, in the present embodiment, the anode liquid and gas conduit 31 and the cathode liquid and gas conduit 32 are each shaped like a deformed ellipse as shown in FIG. 4. This shape is one of the most effective means for making the cross-sectional area as small as possible. Alternatively, a round shape has the advantage of allowing easy junction to a nozzle.

Furthermore, the liquid and gas conduits 31 and 32 have the anode liquid and gas discharge hole 34 or the cathode liquid and gas discharge hole 35. The position of the anode liquid and gas discharge hole 34 or the cathode liquid and gas discharge hole 35 may be in the upper or lower part or on the right or left of the liquid and gas conduit 31 or 32. However, the gas is likely to be collected in an upper portion of the anode chamber outlet space portion 17A or the cathode chamber output space portion 17B. Thus, to let out as much of the gas as possible, the anode liquid and gas discharge hole 34 or the cathode liquid and gas discharge hole 35 is preferably formed in the upper portion of the anode liquid and gas conduit 31 or the cathode liquid and gas conduit 32. Moreover, anode liquid and gas discharge hole 34 and the cathode liquid and gas discharge hole 35 need to have as large a cross-sectional area as possible in order to reduce the pressure loss. However, the cross-sectional area is limited by the anode chamber depth or the cathode chamber depth. Thus, a method such as formation of a large number of holes that are, for example, round or elliptic is effective.

Figure 13:
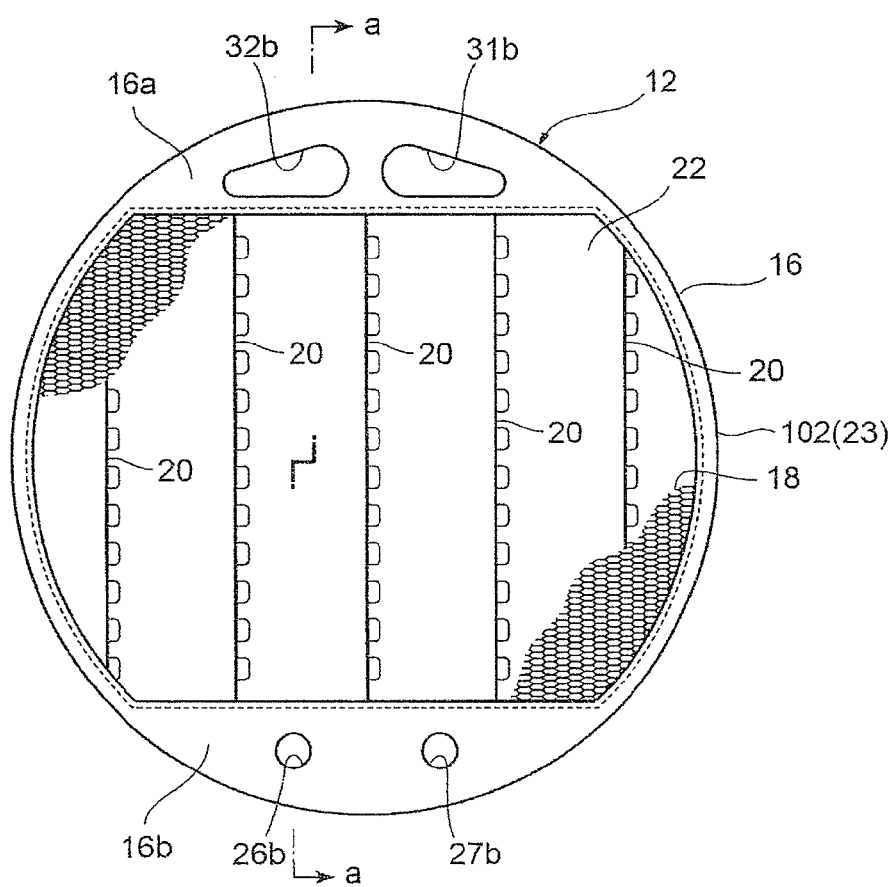
FIG. 13 is a plan view of a bipolar alkaline water electrolysis unit according to a third embodiment as viewed from the anode side.
Figure 14:
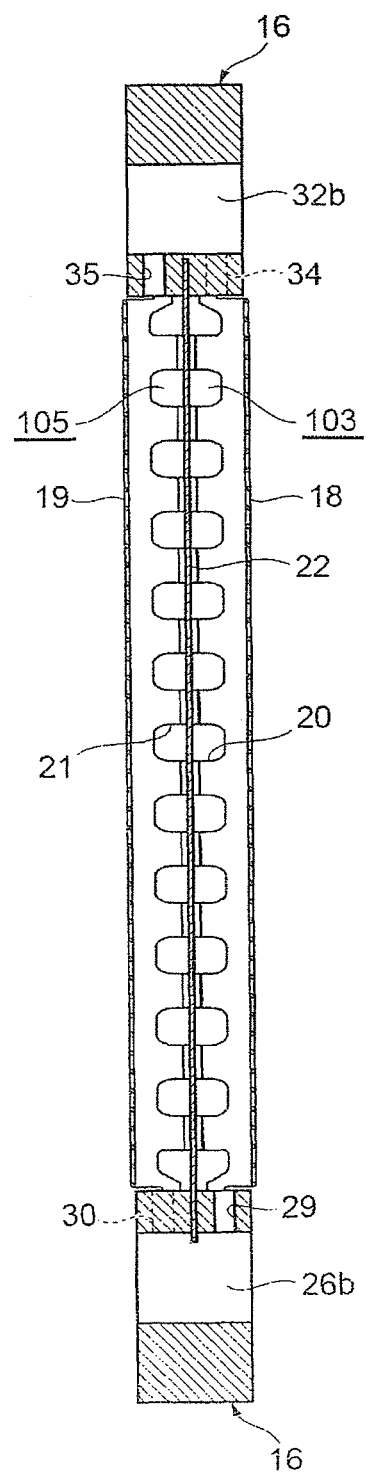
FIG. 14 is a cross-sectional view taken along line a-a in FIG. 13.

Now, a bipolar alkaline water electrolysis unit 12 according to a third embodiment will be described in detail with reference to FIG. 13 and FIG. 14. FIG. 13 is a plan view of the electrolysis unit 12. FIG. 14 is a cross-sectional view taken along line a-a in FIG. 13. As depicted in FIG. 13 and FIG. 14, the electrolysis unit 12 comprises an oxygen generating anode 18, a hydrogen generating cathode 19, a partition wall 22 disposed between the anode 18 and the cathode 19 to separate the anode 18 from the cathode 19, an anode rib 20 and a cathode rib 21 attached to the partition wall 22, and a resin outer frame 16 located along an outer edge of the partition wall 22 to surround the partition wall 22.

The partition wall 22 comprises a conductive metal steel plate and is at least partly connected to the resin outer frame 16.

Figure 15:
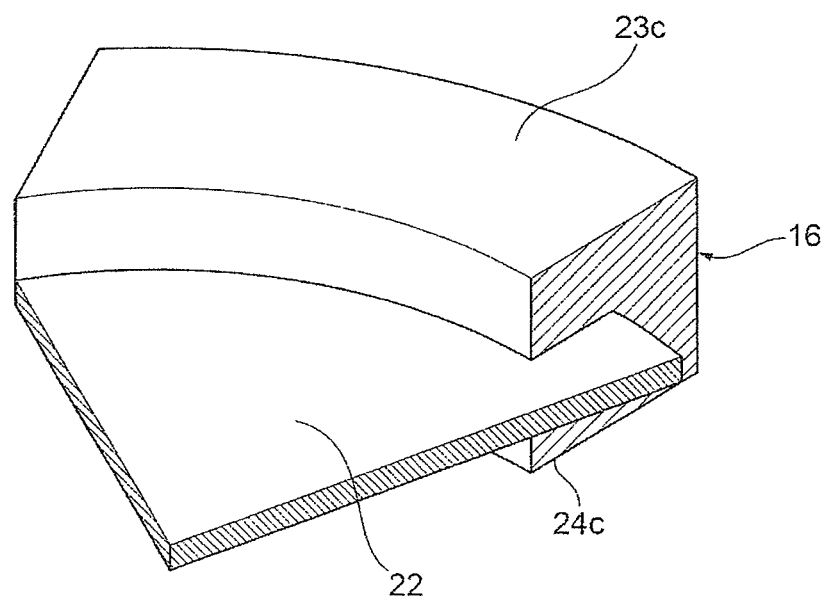
FIG. 15 is a perspective view schematically depicting a junction structure of a partition wall and an outer frame.

A method as an example of the junction between the outer frame 16 and the partition wall 22 involves incorporating (embedding) a part of the partition wall 22 in the outer frame 16 in a sandwiching manner to integrate the outer frame 16 with the partition wall 22 as depicted in FIG. 15. The incorporation of the partition wall 22 in the outer frame 16 may be performed by, for example, insert molding in which a thermoplastic molten resin or a thermosetting resin blended with a curing agent is poured into a mold with the partition wall 22 inserted therein. In this case, the part of the partition wall 22 incorporated in the outer frame 16 is the entire peripheral portion of the partition wall 22. The following method or the like may be used to increase the bonding strength of the bond with the resin forming the outer frame 16: a part of the peripheral portion that tightly contacts the resin outer frame 16 is made uneven, a hole is formed in the part, or the part is folded. The incorporation is not limited to the incorporation depicted in FIG. 14.

The outer frame 16 is formed to have a rectangular cross section that extends toward the anode 18 side and the cathode 19 side across the partition wall 22. An anode side outer frame flange surface 23c is formed on an anode 18 side of the outer frame 16. A cathode side outer frame flange surface 24c is formed on a cathode 19 side of the outer frame 16.

Furthermore, the outer frame 16 is annularly formed so as to surround the partition wall 22. The outer frame 16 comprises an upper bulging portion 16a formed at an upper portion of the outer frame 16 and bulging like a bow (a shape enclosed by a circular arc and a string) toward a central axis of the outer frame 16 (inward in a radial direction), and a lower bulging portion 16b formed in an lower part of the outer frame 16 and bulging like a bow (a shape enclosed by a circular arc and a string) toward a central axis of the outer frame 16 (inward in a radial direction). The upper bulging portion 16a and the lower bulging portion 16b are opposite to each other in the vertical direction.

The lower bulging portion 16b at the lower part of the resin outer frame 16 has an anode liquid passing hole 26b through which an inlet side electrolytic solution (anode liquid) passes, a cathode liquid passing hole 27b through which an inlet side electrolytic solution (cathode liquid)

passes into a cathode chamber 105, an anode liquid introduction hole 29 through which the electrolytic solution (anode liquid) is introduced from the anode liquid passing hole 26b into an anode chamber 103, and a cathode liquid introduction hole 30 through which the electrolytic solution (cathode liquid) is introduced from the cathode liquid passing hole 27b into the cathode chamber 105.

The upper bulging portion 16a at the upper portion of the resin outer frame 16 has an anode liquid and gas passing hole 3b1 through which an outlet side electrolytic solution (anode liquid) and a gas pass, a cathode liquid and gas passing hole 32b through which an outlet side electrolytic solution (cathode liquid) and a gas pass, an anode liquid and gas discharge hole 34 through which the outlet side electrolytic solution (anode liquid) and the gas are let out from inside the anode chamber 103 via the anode liquid and gas passing hole 31b, and a cathode liquid and gas discharge hole 35 through which the outlet side electrolytic solution (cathode liquid) and the gas are let out from inside the cathode chamber 105 via the cathode liquid and gas passing hole 32b.

The thickness of the resin outer frame 16 corresponds to the sum of the distance between the anode side outer frame flange surface 23c and the partition wall 22, the distance between the cathode side outer frame flange surface 24c and the partition wall 22, the thickness of the partition wall 22. During operation, a gas is generated on the anode 18 and the cathode 19 in the anode chamber 103 and the cathode chamber 105, which are thus filled with the gas and the liquid. The ratio of the gas to the liquid (gas-liquid ratio) increases consistently with the current density. Furthermore, the gas-liquid ratio tends to increase with decreasing volumes of the anode chamber 103 and the cathode chamber 105. An excessively high gas-liquid ratio may affect circulation of the electrolytic solution to create a gas zone in the anode chamber 103 and the cathode chamber 105, thus increasing the electric resistance of the partition wall 22. Moreover, an adverse effect such as an increase in the amount of gas transmitted may be exerted, leading to an increased voltage or a reduced gas purity.

Thus, the distance (hereinafter referred to as the "anode chamber depth") between the anode side outer frame flange surface 23c and the partition wall 22 and the distance (hereinafter referred to as the "cathode chamber depth") between the cathode side outer frame flange surface 24c and the partition wall 22 are desirably determined depending on design electrolysis conditions. With an excessively large anode chamber depth or cathode chamber depth, when a large number of electrolysis unit 12 are arranged in series, not only is the electrolytic cell 100 long and needs a large space but also facility costs are high. Furthermore, an excessively small anode chamber depth or cathode chamber depth excessively increases the gas-liquid ratio, leading to the adverse effects as described above. Thus, the anode chamber depth and the cathode chamber depth are preferably 5 mm or more and 40 mm or less and most preferably 10 mm or more and 20 mm or less.

The external shape of the electrolysis unit 12 may be a circle, a square, a rectangle, or any other polygon but is preferably a square, a rectangle, or a circle for production. In particular, if an internal pressure is high during electrolysis, the circle is more preferable for making stress resulting from the pressure uniform.

The anode liquid passing hole 26b and the cathode liquid passing hole 27b formed in the lower bulging portion 16b at the lower part of the resin outer frame 16 are connected to the anode liquid introduction hole 29 and the cathode liquid introduction hole 30, respectively. The shapes of the anode liquid passing hole 26b and the cathode liquid passing hole 27b may each be round or polygonal but is preferably round for production. Furthermore, the channel areas of the anode liquid passing hole 26a and the cathode liquid passing hole 27b may be optionally determined to the extent that a pressure loss is made as low as possible. The anode liquid introduction hole 29 and the cathode liquid introduction hole 30 may each have a cross-sectional area appropriate to the supply amount of the electrolytic solution. The shapes and the like of the anode liquid introduction hole 29 and the cathode liquid introduction hole 30 are not particularly limited.

The anode liquid and gas passing hole 31b and the cathode liquid and gas passing hole 32b are passages through which a mixture of the electrolytic solution and the gas resulting from electrolysis passes. Thus, typically, the anode liquid and gas passing hole 31b and the cathode liquid and gas passing hole 32b preferably have a larger cross-sectional area than the anode liquid introduction hole 29 and the cathode liquid introduction hole 30 to make the pressure loss as low as possible. The shapes of the anode liquid and gas passing hole 31b and the cathode liquid and gas passing hole 32b are not particularly limited. For example, it is effective means to shape the anode liquid and gas passing hole 31b and the cathode liquid and gas passing hole 32b like deformed ellipses to make the cross-sectional area as small as possible. Alternatively, a round shape has the advantage of allowing easy junction to a nozzle.

An anode liquid and gas discharge hole 34 and a cathode liquid and gas discharge hole 35 formed in the upper bulging portion 16a at the upper portion of the grease outer frame 16 are connected to the anode liquid and gas passing hole 31b and the cathode liquid and gas passing hole 32b, respectively. The anode liquid and gas discharge hole 34 and the cathode liquid and gas discharge hole 35 each need to have as large a cross-sectional area as possible in order also to reduce the pressure loss. However, the cross-sectional area is limited by the anode chamber depth and the cathode chamber depth and the thickness of the outer frame 16. Thus, a method such as formation of a large number of holes that are, for example, round or elliptic is effective.

The resin outer frame 16 directly contacts the electrolytic solution or the gas and thus needs to resist corrosion. The alkaline water electrolysis is performed at 60° C. to 100° C. using a corrosive liquid such as caustic potash or caustic soda. Thus, a material that resists this condition is used. For example, the following may be used due to the resistance thereof to corrosion: a vinyl chloride resin, a polypropylene resin, a polyphenylene ether resin, a polyphenylene sulfide resin, a polysulphone resin, a polyethersulphone resin, a polyether ether ketone resin, and an epoxy resin. In particular, the epoxy resin is particularly preferable in that the resin facilitates production because the resin can be molded by being poured into a mold form along with a curing agent and can thus be molded and cured with the partition wall 22 held in a sandwiching manner.

Furthermore, the outer frame may be divided into an anode side frame part disposed on an anode side of the conductive partition wall and a cathode side frame part disposed on a cathode side of the conductive partition wall. That is, the electrolysis unit 10 has a structure in which the unit is held by the anode side frame part, at least a part of the conductive partition wall, and the cathode side frame part in a sandwiching manner and in which the units are fixed via bolts, an adhesive, or the like with gaskets placed between the units. The anode side frame part and the cathode chamber frame part may be resin or metal. Also in that case, as the material of the resin, the same material as that of the resin outer frame 16 may be used. For metal, nickel-plated mild steel or stainless steel or nickel may be utilized. The thickness of the anode side frame part and the thickness of the cathode side frame part are preferably 5 mm or more and 40 mm or less.

In general, a conductive metal is used as a material for the partition wall 22. For example, nickel-plated mild steel or stainless steel or nickel may be utilized. When a chemical- and heat-resistant resin is used, no current flows through the partition wall 22. Thus, the chemical- and heat-resistant resin can be used by connecting the anode rib 20 and the cathode rib 21 together via a conductive metal and sealing the periphery of the metal so that the liquid or gas in the anode chamber 103 and the cathode chamber 105 will not pass through to the metal.

The thickness of the partition wall 22 need not be large when the anode rib 20 and the cathode rib 21 are joined together by welding or the like to provide an integral structure because the partition wall 22 is reinforced by the anode rib 20 and the cathode rib 21. A thickness of 0.5 mm or more and 2 mm or less is typically sufficient. A thickness of less than 0.5 mm is disadvantageous in that such a thickness makes welding of the anode rib 20 and the cathode rib 21 to the partition wall 22 difficult and also makes handling for production difficult. Furthermore, a thickness of more than 2 mm is not preferable in that such a thickness increases production costs and the weight of the electrolysis unit 12.

In the above-described electrolysis units 12, 12A, 12B, 120, a part of the partition wall 22 is incorporated in the resin outer frame 16 to support the partition wall 22, resulting in a reduced number of components. Thus, assembly of the electrolytic cell 100 can be very easily performed in which the electrolytic cell 101 is formed by arranging a large number of bipolar alkaline water electrolysis units 12, 12A, 12B, 120 and placing an ion permeable diaphragm 10 and gaskets 9 and 11 between the bipolar alkaline water electrolysis units. Moreover, the outer frame 16 incorporating the partition wall 22 is formed of a resin selected to have a linear coefficient of expansion that is not significantly different from the linear coefficient of expansion of the partition wall 22. Consequently, the outer frame 16 is unlikely to be broken even when the partition wall 22 thermally expands.

As described above, the unit can be produced such that the anode chamber 103 and the cathode chamber 105 have accurate, sufficient volumes. Thus, the present embodiment is effective for suppressing retention of the gas and reducing the pressure loss in letting out the electrolytic solution and the generated gas. This facilitates implementation of electrolysis at an unstable current or a high current density. As a result, the number of bipolar alkaline water electrolysis units 12, 12A, 12B, 120 can be reduced when an electrolytic cell 100 that can provide a desired amount of hydrogen is manufactured, leading to a reduction in facility costs. This is because, although the anode side of the electrolytic cell is typically significantly affected by gas bubbles, the electrolysis unit 12, 12A, 12B, 120 according to the present embodiment enables a reduction in the adverse effects of the gas bubbles because the anode chamber 103 and the cathode chamber 105 have sufficient volumes.

For example, under electrolysis conditions including 4 $kA/m^2$, 0.1 MPa, and 90° C., the upper portion of the anode chamber 103 is filled with gas bubbles, and the gas-liquid ratio is 80% or more in some areas of the anode chamber 103. The areas with high gas-liquid ratios tend to expand consistently with the current density. In the areas with high gas-liquid ratios, the fluidity is poor and gas retention areas may be created. A large amount of gas retained allows the gas to pass easily through the ion permeable diaphragm, leading to a reduction in current efficacy and gas purity and to a significant fluctuation in pressure at the time of discharge of the gas and liquid. To reduce the number of the areas with high gas-liquid ratios in the upper portions of the anode chamber 103 and the cathode chamber 105 as much as possible, methods are available such as an increase in electrolytic voltage and a sharp increase in the amount of electrolytic solution circulated. However, the methods tend to increase facility construction costs and are not preferable. In the electrolysis unit 12, 12A, 12B, 120 according to the present invention, the anode chamber 103 and the cathode chamber 105 have sufficient volumes. This reduces the retention of the gas and secures the fluidity of the liquid. Thus, the electrolytic solution can be circulated utilizing the ascending force of the gas bubbles, and the gas can be discharged without any fluctuation in pressure.

The anode comprises a conductive base material and a catalytic layer covering the conductive base material. Pores are formed in the catalytic layer. In other words, the catalytic layer is porous. The catalytic layer preferably covers the entire conductive base material.

First pores included in the pores in the catalytic layer and having a pore size of 2 to 5 nm have a specific surface area of 0.6 to 2.0 $m^2/g$. The pore volume of the first pores is $3 \times 10^{-4}$ to $9 \times 10^{-4}$ ml/g. Second pores included in the pores in the catalytic layer and having a pore size of 0.01 to 2.0 μm have a specific surface area of 2.0 to 5.0 $m^2/g$. The pore volume of the second pores is 0.04 to 0.2 ml/g.

The second pores with a pore size of 0.01 to 2.00 μm have a small specific surface area but a large pore volume. Thus, the first pore is present inside the second pore. The first pores serve to significantly increase the surface area of the catalytic layer. The surface of the first pore functions as a reaction field (reaction interface) for oxidation reaction of hydroxide ions (oxygen forming reaction). Nickel hydroxide is generated inside the first pore when oxygen is generated, and it is thus expected that the pore is further reduced in size. However, since the first pore is present inside the second pore with a large pore size, oxygen generated inside the first pore at the time of electrolysis is likely to pass through the second pore to the outside of the catalytic layer. Consequently, the electrolysis is unlikely to be hindered. Thus, it is estimated that an oxygen generating overvoltage is prevented from increasing according to the present embodiment.

The specific surface area of the first pore is preferably 0.6 to 1.5 $m^2/g$ and more preferably 0.6 to 1.0 $m^2/g$. The specific surface area of the first pore may be 0.62 to 0.98 $m^2/g$. In general, it is expected that an oxygen generating potential decreases with increasing specific surface area of the first pore. However, when excessively small, the first pore tends to be completely filled with nickel hydroxide generated at the time of oxygen generation, to have a reduced substantial surface area. The reduced specific surface area of the first pore tends to also reduce the entire surface area of the catalytic layer. The oxygen generating potential tends to rise with decreasing entire surface area of the catalytic layer.

The volume of the first pore is preferably $3.3 \times 10^{-4}$ to $8.5 \times 10^{-4}$ ml/g. The volume of the first pore may be $3.6 \times 10^{-4}$ ml/g to $7.9 \times 10^{-4}$ ml/g. The specific surface area of the first pore tends to decrease with increasing pore volume. The specific surface area of the first pore tends to increase with decreasing pore volume of the first pore.

The specific surface area of the second pore is preferably 2.3 to 4.5 $m^2/g$ and more preferably 2.5 to 4.2 $m^2/g$. The volume of the second pore tends to decrease with increasing specific surface area of the second pore. The volume of the second pore tends to increase with decreasing specific surface area of the second pore.

The volume of the second pore is preferably 0.04 to 0.15 ml/g and more preferably 0.04 to 0.1 ml. The volume of the second pore may be 0.04 to 0.09 ml/g. Defoaming of an oxygen gas generated in the catalytic layer tends to be likely to progress as the pore volume of the second pore increases. As the pore volume of the second pore decreases, outgassing of the catalytic layer is hindered, and the oxygen generating overvoltage tends to increase, whereas a mechanical strength tends to increase.

The catalytic layer contains nickel as an element. The catalytic layer preferably contains at least one type of nickel selected from a group consisting of nickel oxide, metal nickel (a metal crystal of nickel), and nickel hydroxide. The catalytic layer may contain an alloy comprising nickel and another metal. The catalytic layer particularly preferably comprises metal nickel. The catalytic layer may further contain at least one type of metal selected from a group consisting of titanium, chromium, molybdenum, cobalt, tantalum, zirconium, aluminum, zinc, a platinum group, rare earth elements, and the like. The surface of the catalytic layer may be modified with at least one type of catalyst selected from a group consisting of rhodium, vanadium, iridium, ruthenium, and the like.

Preferably, when the catalytic layer contains a metal crystal of nickel, an X ray diffracted by a (1 1 1) face of the metal crystal of nickel in the catalytic layer has a peak intensity INi, and an X ray diffracted by a (0 1 2) face of NiO in the catalytic layer has a peak intensity INiO, the value of [INi/(INi+INiO)]×100 is 75 to 100%. [INi/(INi+INiO)]×100 is more preferably 90 to 100% and particularly preferably 95 to 100%. The electric resistance of the catalytic layer and a voltage loss at the time of oxygen generation decrease with increasing [INi/(INi+INiO)]×100. In the nickel oxide portion of the catalytic layer, conductivity decreases but oxygen forming reaction is unlikely to occur. Furthermore, nickel oxide is relatively chemically stable, and thus, the containment of nickel oxide in the catalytic layer may be effective for maintaining the strength of the catalytic layer. INi and INiO are determined from measurement results for XRD (X-Ray Diffraction) for the catalyst layer.

The thickness of the catalyst layer is preferably 50 to 800 μm and more preferably 100 to 400 μm. At a thickness of 50 μm or less, the catalytic layer is thin and has a reduced entire surface area, and it is predicted that the oxygen overvoltage increases. Furthermore, at a thickness of 800 μm, the catalytic layer is excessively thick and may be likely to suffer peel-off or the like. Additionally, the production costs of the anode may be excessively high.

An example of the conductive base material is a base material comprising at least one type of element selected from a group consisting of nickel iron, vanadium, molybdenum, copper, silver, manganese, a platinum group, graphite, chromium, and the like. It is possible to use a conductive base material comprising an alloy comprising two or more types of metals or a mixture of two or more types of conductive substances. Preferably, the conductive base material comprises metal nickel. The shape of the conductive base material may be a net, a plate, or an expand metal. Preferably, the conductive base material is an expand metal. The expand metal is a metal plate with staggered cuts which is extended and processed into a mesh shape. The conductive base material may be subjected to surface treatment. When the surface of the conductive base material is made uneven by blast treatment, etching, or the like, the adhesion between the catalytic layer and the conductive base material is improved. The thickness of the conductive base material is preferably 0.5 to 2.0 mm and more preferably 1.2 mm.

In a conventional anode without such a pore structure as in the present invention, the surface of the catalytic layer is oxidized to form a hydroxide, which fills the pores to hinder oxygen bubbles form being let out of the pores. Thus, the oxygen overvoltage is likely to increase. Alternatively, the surface of the catalytic layer is reduced back to metal nickel, and when impurities in the electrolytic solution are electrodeposited on the reduced surface of the catalytic layer, the overvoltage is likely to further increase when oxygen is generated again. On the other hand, the pore size, specific surface area, and pore volume of the catalytic layer in the anode according to the present invention are in the optimum condition. Thus, according to the present invention, nickel hydroxide generated on the surface of the catalytic layer in an oxidation state during electrolysis does not occlude the pores. Additionally, even in a reduction state, the hydroxide is only gradually reduced and the catalytic layer itself is unlikely to change. The electrolytic cell of the present invention comprising the anode as described above enables oxygen and hydrogen to be stably manufactured even when, for example, natural energy from wind generation or photovoltaic power generation involving a very significant fluctuation in power, is used directly for electrolysis.

A method for manufacturing an alkaline water electrolysis anode according to the present application comprises a first step (spraying step) of spraying the conductive base material with nickel oxide by a spraying method and a second step (reduction step) of reducing the nickel oxide on the conductive base material.

In the manufacturing method according to the present application, nickel oxide as a starting material for the catalytic layer is preferably powdery. Before the first step, nickel oxide powder with a mean particle size of 1.0 to 5.0 μm is granulated using a spray drying granulator to obtain nickel oxide particles with an average particle size of 10 to 100 μm. The particles of nickel oxide are blown into a hot gas such as a plasma gas, melted, and then sprayed on the conductive base material. In other words, the conductive base material is coated with the molten nickel oxide. When the particle size of the nickel oxide before granulation is excessively large or small, the needed pore size, specific surface area, and pore volume are not obtained when electrodes are formed. The mean particle size of the nickel oxide powder before granulation is preferably 1.0 to 5.0 μm and more preferably 1.0 to 1.2 μm.

A mixture of nickel oxide powder and another powder may be sprayed on the conductive base material by the spraying method. The another power may be one type of metal powder selected from a group consisting of metal nickel, titanium, chromium, molybdenum, cobalt, manganese, iron, tantalum, zirconium, aluminum, zinc, a platinum group, rare earth elements, and the like. Moreover, the nickel oxide powder before being sprayed on the conductive base material may be mixed with at least one type of additive selected from a group consisting of gum arabic, carboxyl methyl cellulose, and sodium lauryl sulfate.

If Raney nickel is sprayed on the conductive base material by the spraying method, the Raney nickel is melted and has a reduced surface area, and it is thus difficult to form a catalytic layer with the above-described pore size, specific surface area, and pore volume of the pores is difficult. When an alloy of nickel and aluminum is sprayed on the conductive base material by the spraying method, the aluminum is oxidized in the air. Thus, even when the aluminum in the catalytic layer is removed using an alkaline water solution, obtaining a catalytic layer with a large surface area is difficult. When an anode is manufactured by a method of melting an alloy of nickel and aluminum in vacuum and spraying the molted alloy on the conductive base material, a relevant manufacturing apparatus is not simple and has low productivity. Thus, this method needs high production costs and is not preferable.

Examples of the spraying method include a method of melting spray powder on heat from combustion of oxygen and a flammable gas such as acetylene, a method of spraying, via a combustion gas, a material obtained by processing spray powder used for the spraying method (material powder for the catalytic layer) into a bar and melting the material on heat from combustion of a flammable gas, and a method of inching spray powder using a plasma gas resulting from heating of a gas such as argon, hydrogen, nitrogen, or helium. Among the methods, plasma spraying is preferable which involves converting a gas resulting from a mixture of nitrogen or argon with hydrogen into plasma and melting spray powder using the plasma. In the plasma spraying, the speed of the plasma gas is at a level exceeding the speed of sound, and the temperature of the gas is 5000° C. or more. Thus, spray powder with a high melting point can be melted, and the melted spray powder can be attached to the base material at high speed. As a result, a dense and strong coating layer (a precursor of the catalytic layer) can be formed. With the plasma spraying, a catalytic layer with a thickness of 10 to 1000 μm can be formed in a relatively short time due to a high coating speed for the material powder. Depending on conditions, the plasma spraying is likely to make pores formed between particles while melted material power is accumulated on the base material denser than the other spraying methods. When an oxide is sprayed on the base material by a spraying method using a plasma gas containing hydrogen, a part of the coating is likely to be reduced, and the conductivity of the coating layer is enhanced. Therefore, an anode with a high conductivity can be manufactured.

A large number of crystal defects are formed in the nickel oxide having been subjected to a hot state during spraying based on plasma spraying and to a succeeding quenching process. Reducing such nickel oxide also enables formation of a catalytic layer with a high activity. How the second pores are formed in the catalytic layer according to the present embodiment is not altogether clear. However, the inventors estimate that the composition of the spray powder (nickel oxide), the spraying method, and the like affect the formation of second pores.

The coating layer formed by the spraying method is reduced under a hydrogen stream to form first pores in the catalytic layer. The coating layer may be reduced by electrolysis. For example, the conductive base material with a coating layer formed thereon is used as a cathode to electrolyze a saline solution. Then, hydrogen is generated to reduce the coating layer, thus providing a desired catalytic layer. Alternatively, a water solution of caustic soda with a concentration of approximately 32% may be electrolyzed at a solution temperature of 70° C. to 90° C. The electrolysis may be carried out for approximately one month to six months. The reduction steps may involve electrolyzing water using a conductive base material with a coating layer formed thereon as a cathode. The reduction steps may involve electrolyzing (generation of hydrogen at the cathode) a water solution of KOH or NaOH with a concentration of 10% to 30% for approximately six months using a conductive base material with a coating layer formed thereon as a cathode. However, these methods have the disadvantages of taking a long time and having low productivity. However, these electrolytic reductions provide a catalytic layer with fine pores formed therein (porous catalytic layer). The electrolytic reductions are performed at low temperatures and thus take a long time to reduce nickel oxide, but allow the pore size of the first pores in the catalytic layer to be easily controlled to 2 to 5 nm. The catalytic layer resulting from the electrolytic reductions comprises a framework formed in the catalytic layer and which is excellent in defoaming capability and electron conductivity.

The temperature measured when the coating layer (nickel oxide) formed by the spraying method is reduced with hydrogen is important. At an excessively high reduction temperature, pores resulting from the reduction may be collapsed on heat, preventing expected pores, specific surface area, and pore volume from being obtained. Furthermore, at an excessively low reduction temperature, the reduction of nickel oxide fails to progress. Thus, the temperature for the reduction reaction of the coating layer with hydrogen is preferably 180 to 300° C. and particularly preferably 180 to 250° C.

An alternative reduction method involves treating the coating layer with a reducing agent such as hydrazine, sodium sulfite, or sodium boron hydride at normal temperature to 100° C. However, with these methods, even slightly reducing the coating layer takes a long time and the reduction of the coating layer does not substantially progress. When a reducing agent is heated to 100° C. or more in order to facilitate the reduction reaction, the solution of the reducing agent is evaporated or the reducing agent is decomposed. This is not preferable.

In general, nickel oxide, used as a material for the catalytic layer, has a composition close to stoichiometry. A reduction starting temperature for the nickel oxide is 300° C. or more. Thus, in general, the hydrogen reduction is conventionally performed with nickel oxide heated to high temperatures of 400° C. or more. Under these temperature conditions, thermal motion of the metal in the nickel oxide is intense and aggregation of the metal progresses rapidly. Thus, approximately all the pores with a pore size of 2 to 5 nm disappear.

On the other hand, the nickel oxide sprayed on the conductive base material by the spraying method (particularly the plasma spraying) contains a large number of crystal defects as described above and has a composition deviating from stoichiometry. Thus, the nickel oxide subjected to the spraying steps is easily reduced and is sufficiently reduced even at low temperatures of 250° C. Performing hydrogen reduction at low temperatures of 250° C. or less suppresses the thermal motion of metal elements in nickel oxide and makes the aggregation of the metal elements difficult. As a result, first pores with a pore size of 2 to 5 nm can be easily formed in the catalytic layer.

The above-described spraying steps and reduction steps provide a catalytic layer. Moreover, the surface of the catalytic layer may be modified with at least one type of catalyst selected from a group consisting of rhodium, palladium, iridium, and ruthenium.

Now, the ion permeable diaphragm 10 (see FIG. 1), a part of the electrolytic cell 101, will be described. There has been a demand to provide the ion permeable diaphragm 10 with a low gas permeability, a low conductivity, and a high strength. Diaphragms conventionally used for alkaline water electrolysis are asbestos, modified asbestos, and the like. However, the following and the like have recently been used: a porous diagram of a polysulfone-containing polymer, a cloth of polyphenylene sulfide fibers, a fluorine-containing porous medium membrane, and a porous medium comprising a mixture of an inorganic substance and an organic substance. Instead of the porous diaphragms, fluorine-containing ion exchange membranes may be used. Any of these membranes may be used as the bipolar alkaline water electrolysis unit 12 without limitation.

In normal alkaline water electrolysis, a gap is present between the ion permeable membrane and the anode or the cathode. Thus, in this portion, a large amount of gas bubbles are present besides the electrolytic solution and the electric resistance is very high. To drastically reduce the electrolytic voltage in the electrolytic cell, it is most effective to make the gap between the anode and the cathode (hereinafter referred to as the "inter-electrode distance") as small as possible to eliminate the adverse effects of the electrolytic solution or gas bubbles present between the anode and the cathode. However, conventionally, the inter-electrode distance is ordinarily approximately 1 to 3 mm (An electrolytic cell with such a level of inter-electrode distance is hereinafter referred to as a "finite gas electrolytic cell"). Several techniques for reducing the inter-electrode distance have been proposed. However, large electrolytic cells generally have a current-carrying area of 1 m$^2$ or more, and it is thus impossible to make the anode and the cathode completely smooth to substantially zero the tolerance of manufacturing accuracy. Thus, a simple reduction in inter-electrode distance may cause the ion permeable diaphragm present between the anode and the cathode to be pressed and cut by the electrode. Furthermore, even with a forcible reduction in inter-electrode distance, it is difficult to perform production with accuracy sufficient to achieve a state in which the inter-electrode distance is approximately equal to the thickness of the ion permeable diaphragm all over the surfaces of the electrodes, so that there is substantially no gap between the anode and the ion permeable diaphragm and between the cathode and the ion permeable diaphragm (this state is hereinafter referred to as a "zero gap"). Thus, the ideal zero gap has not been obtained.

Figure 7:
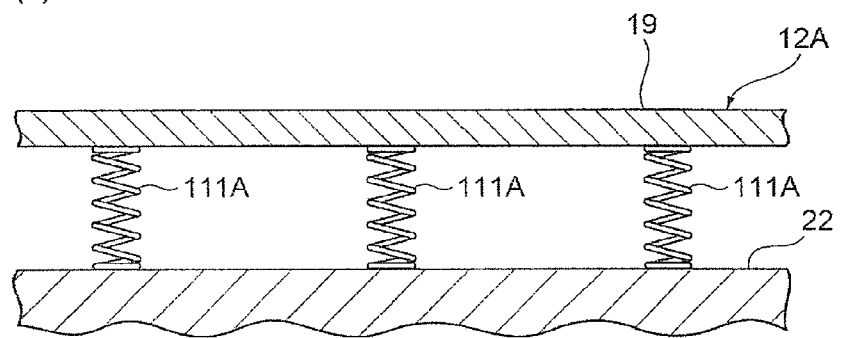
FIG. 7(a) is a schematic cross-sectional view of a variation of the bipolar alkaline water electrolysis unit in which a cathode and a conductive partition wall are joined together via a spring.
FIG. 7(b) is a schematic cross-sectional view of a variation of the bipolar alkaline water electrolysis unit in which a cathode rib joined to the cathode and the conductive partition wall are joined together via a spring.
Figure 7:
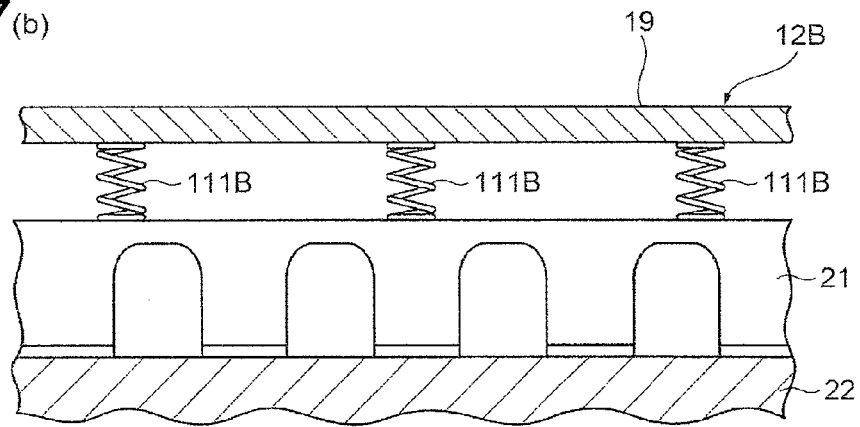

An electrolysis unit 12A, 12B according to a variation for correcting the above-described situation will be described with reference to FIG. 7. In the following variation, elements and members similar to the corresponding elements and members in the above-described electrolysis unit 12 are denoted by the same reference numerals. Detailed description of these elements and members is omitted.

The electrolysis unit 12A, 12B according to the variation is configured such that springs 111A, 111B that are elastic mediums are disposed between the cathode 19 and the partition wall 22 as means for reducing the inter-electrode distance and used to support the cathode 19 so that the cathode 19 is movable. For example, in a first variation, the springs 111A produced using a conductive material are attached to the partition wall 22, and the cathode 19 is attached to the springs 111A, as depicted in FIG. 7(a). Furthermore, in a second variation, the springs 111B are attached to the cathode rib 21 attached to the partition wall 22, and the cathode 19 is attached to the springs 111B, as depicted in FIG. 7(b). When a configuration with the elastic mediums such as the springs 111A, 111B is adopted, the pressure at which the cathode 19 contacts the ion permeable diaphragm 10 may be nonuniform. Furthermore, when a large number of springs are attached, the production may be difficult, and thus, the strength, number, shape, and the like of the springs need to be appropriately adjusted as needed.

Now, an electrolysis unit 120 according to a second embodiment 120 will be described with reference to FIGS. 8 to 10. The electrolysis unit 120 is configured to be able to implement the above-described zero gap structure. In the electrolysis unit 120 according to the second embodiment, elements and members similar to the corresponding elements and members in the above-described electrolysis unit 12 are denoted by the same reference numerals. Detailed description of these elements and members is omitted.

In the electrolysis unit 120, an anode 39 has a higher rigidity than a cathode 38. Thus, the electrolysis unit 120 is structured to be only slightly deformed particularly even when an ion permeable diaphragm 10 is pressed against the electrolysis unit 120. On the other hand, the cathode 38 is structured to be flexible enough to be deformed when the ion permeable diaphragm 10 is pressed against the cathode 38. Thus, the electrolysis unit 120 is structured to absorb the tolerance of the manufacturing accuracy of an electrolytic cell 101 and unevenness resulting from deformation of the electrodes (anode 39, cathode 38), maintaining a zero gap.

Specifically, at least a three-layer structure is provided in which a current collector 36 is attached to a tip of a cathode rib 21, a conductive cushion mat (cushion mat layer) 37 is attached to an upper surface side of the current collector 36, in other words, the side of the current collector 36 opposite to a partition wall 22, and moreover, the zero gap cathode 38 with a thickness of 0.5 mm or less is laid on top of an upper surface side of the conductive cushion mat 37, in other words, adjacently to the cushion mat 37. In the present embodiment, the current collector 36 and the cushion mat 37 provide an elastic medium.

The current collector 36 serves to conduct electricity to the cushion mat 37 and the zero gap cathode 38 stacked on the current collector 36 and to support loads from the cushion mat 37 and the zero gap cathode 38 to allow a gas generated on the cathode 38 to pass through toward the partition wall 22 without any hindrance. Thus, the shape of the current collector 36 is preferably like an expand metal or a punching plate. The aperture ratio of the current collector 36 in this case is preferably 30% to 70% so as to let out the hydrogen gas generated on the cathode 38 to the partition wall 22 side without any hindrance. However, an excessively high aperture ratio may pose a problem such as a decrease in strength or in conductivity to the cushion mat 37. An excessively low aperture ratio may degrade outgassing.

The current collector 36 is effectively coated with a porous electrode catalyst. Particularly when water electrolysis is performed using renewable energy from wind power generation or the like, such an unstable state may occur as it involves a significant fluctuation in supplied electrolytic current or voltage within a short time. In the worst case, if the supplied voltage is lower than a theoretical electrolytic voltage, the current may flow in a direction opposite to the direction for electrolysis. In that case, the catalyst function of the anode 39 and the cathode 38 are damaged. To prevent such damage, the surface of the current collector 36 is coated with a porous catalyst for prevention. This is because, due to the large surface area of the porous medium, a large amount of charge is accumulated on the porous medium and because a reduction substance is formed on the surface of the porous medium. That is, even if the current flows in the opposite direction, the current is consumed as a result of consumption of the surface charge and oxidation of the reduction substance. Thus, an electrode potential can be kept at a constant value for a certain amount of time. The time for which the constant voltage can be kept varies depending on the duration and frequency of the opposite flow of the current and the amount of coating.

As a porous electrode catalyst that serves as described above, Raney nickel, a nickel porous medium (porous nickel), a nickel oxide porous medium (porous nickel oxide), or the like may be used. For the Raney nickel, a coating with the Raney nickel dispersed therein is obtained by means plating using a nickel plating cell with Raney nickel powder dispersed therein. For the nickel porous medium, a method of coating nickel powder by thermal spraying or plasma spraying may be utilized. Furthermore, a method of coating nickel oxide powder by thermal spraying or plasma spraying may be utilized. Moreover, a method is available in which, after coating by such spraying, the surface area is further increased by reduction with hydrogen. The coating with this type of porous electrode catalyst may be applied to a part or all of the elements providing the elastic medium, in other words, not only to the current collector 36 but also to the cushion mat 37 and the like.

For the strength of the current collector 36, the current collector 36 may be used as a conductive plate given that the current collector 36 is flexed by 0.5 mm or less even under a pressure of 3 $mH_2O/cm^2$ on a central portion of the current collector 36 when the gap between the adjacent cathode ribs 21 is 100 mm. For a material for the current collector 36, nickel, a nickel alloy, stainless steel, mild steel, or the like may be utilized in view of conductivity. However, nickel, or mild steel or a stainless steel nickel alloy plated with nickel is most preferable in view of corrosion resistance. Fixation of the above-described current collector 36 to the cathode rib 21 is achieved by spot welding, laser welding, Tig welding, or the like.

The cushion mat 37 is located between the current collector 36 and the anode 38 in contact with the current collector 36 and the anode 38. The cushion mat 37 needs to conduct electricity to the cathode 38 and to allow a hydrogen gas generated on the cathode 38 to pass through to the current collector 36 without any resistance. The most important function of the cushion mat 37 is to apply an appropriate, uniform pressure to the cathode 38 in contact with the ion permeable diaphragm 10 to the degree that the ion permeable diaphragm 10 is not damaged, thus tightly contacting the ion permeable diaphragm 10 and the cathode 38 with each other. Typically, a well-known cushion mat is used as the cushion mat 37. The cushion mat 37 may be obtained by, for example, weaving a nickel wire with a wire diameter of approximately 0.1 mm and then corrugating the woven nickel wire. As a material for the cushion mat 37, nickel, a nickel alloy, or stainless steel or mild steel plated with nickel in view of conductivity. Furthermore, the thickness of such a cushion mat may typically be approximately 5 mm to 10 mm.

The flexibility of the cushion mat 37 may be within a well-known range. For example, the cushion mat 37 may be used which has elasticity corresponding to a repulsion of 30 to 50 $g/cm^2$ generated at the time of 50% compression deformation. Such a cushion mat 37 is laid on top of the current collector 36 comprising a conductive plate 36 for use. As this attachment method, a well-known method is typically used, for example, appropriate fixation by spot welding, or resin pin or metal wire.

A zero gap cathode may be laid directly on top of the cushion mat 37 as in the present embodiment. Alternatively, the cathode may be laid on top of the cushion mat 37 via another conductive sheet. As a cathode material that can be used for a zero gap, a cathode with a small mesh with a small wire diameter is preferable due to the high flexibility of the cathode. As such a base material, a well-known base material may be used. For example, as a base material for the cathode 38, nickel, a nickel alloy, stainless steel, mild steel, or a nickel alloy or stainless steel or mild steel plated with nickel may be used. For these base materials, linearity may be 0.05 to 0.5 mm, and aperture may be approximately 30 meshes to 80 meshes.

As a coating for the zero gap cathode 38, a coating of a rare metal oxide or a coating of a metal selected from nickel, cobalt, molybdenum, and manganese or an oxide thereof is preferable. This is because, for example, a coating resulting from plasma spraying of a nickel oxide is as large as 100 microns or more in thickness and the resultant zero gap cathode 38, which needs to be flexible, is hard and brittle, possibly causing the ion permeable diaphragm 10 contacting the cathode 38 to be damaged. A small coating thickness is preferable because such a thickness does not impair the flexibility of the cathode 38 or cause the ion permeable diaphragm 10 to be damaged. An excessively thick coating is disadvantageous in that such a coating may not only cause the ion permeable diaphragm 10 to be damaged but also increase production costs of cathode 38. Furthermore, an excessively small thickness prevents sufficient activity from being obtained. Thus, preferably, the coating thickness is approximately 0.5 micron to 50 microns and most preferably 1 micron to 10 m microns.

The cathode 38 for implementing the zero gap structure is fixed to the cushion mat by spot welding or by using a metal or plastic pin or a push pressure associated with the resilience of the cushion mat.

Furthermore, the shape of the anode 39 itself is important for implementation of the zero gap structure. The ion permeable diaphragm is pressed against a zero gap anode harder than in a conventional finite gap electrolytic cell. Thus, for an anode with an expand metal base material, the ion permeable diaphragm may be broken at an edge of an opening in the anode or the ion permeable diaphragm may cut into the opening to form a gap between the cathode and the ion permeable diaphragm, leading to a rise in voltage.

To solve the above-described problem, the anode 39 needs to be shaped to be as planar as possible. To achieve this, an expand-processed base material is desirably pressed by a roller so as to be planar. In general, when the expand-processing is executed, the apparent thickness of the base material is increased by a factor of approximately 1.5 to 2 compared to the apparent thickness obtained before the expand-processing. However, when the resultant base material is used directly in the electrolytic cell 101, the above-described problem occurs. Thus, the base material is desirably made planar by being rolled by means such as a roll press to reduce the thickness to 95% to 110% of the original metal plate thickness.

By using the anode 39 manufactured by the above-described processing, damage to the ion permeable diaphragm 10 can be prevented, and unexpectedly, the voltage can be reduced. The reason for the prevention and the reduction is not clear but is expected to be that the current density is made uniform because the surface of the ion permeable diaphragm 10 and the electrode surface contact each other uniformly.

Furthermore, preferably, the thickness of the anode 39 is approximately 0.7 mm to 3 mm. An excessively small thickness is not preferable in that, with such a thickness, the anode 39 is sunken by the pressure at which the ion permeable diaphragm 10 presses the anode 39 and which is associated with a difference in pressure between the anode chamber 103 and the cathode chamber 105 or the push pressure of the cathode, thus increasing the inter-electrode distance and the voltage. Furthermore, an excessively large thickness increases the costs, and thus, a thickness of 0.9 mm to 1.5 mm is preferable.

The aperture ratio of an anode base material used as the zero gap anode 39 is preferably 30% to 70%. When the aperture ratio is excessively small, a generated gas has difficulty leaving the electrode to cause a rise in electrolytic voltage. Furthermore, an excessively large aperture ratio is not preferable in that such an aperture ratio reduces the surface area of the electrode to increase the voltage. Thus, an aperture ratio of 40% to 60% is most preferable. Furthermore, as a material for the anode 39, an expand metal or a punching plate comprising nickel, a nickel alloy, or mild steel or a nickel alloy plated with nickel may be used.

The unevenness of a surface coating layer of the anode 39 is preferably 30 microns to 100 microns. With excessively small unevenness, when the ion permeable diaphragm 10 and the anode 39 are in contact with each other, only a small amount of electrolytic solution is fed to this contact area, leading to a rise in temperature or the like to damage the diaphragm. Furthermore, excessively large unevenness may cause the ion permeable diaphragm 10 to be damaged. The unevenness of the surface of the anode 39 is not particularly limited if the anode 39 is not combined with the zero gap cathode 38. However, the unevenness is preferably made as small as possible.

In the above-described electrolysis units 12, 12A, 12B, 120, the partition wall 22 and the outer frame 16 have an integral structure. Thus, for example, when the electrolytic cell 101 is configured by disposing a large number of electrolysis units 12, 12A, 12B, 120 and sandwiching the ion permeable diaphragm 10 and gaskets 9, 11 between the electrolysis units 12, 12A, 12B, 120, reliable assembly of an electrolytic cell 100 can be very easily achieved because of the fewer components.

Furthermore, the reliable assembly of the electrolytic cell 100 means that the partition wall 22, the outer frame 16, an anode chamber 103 comprising the anode 18, 39 and the like, the partition wall 22, the outer frame, and a cathode chamber 105 comprising the cathode 19, 39 and the like can be accurately and sufficiently provided. As a result, the reliable assembly is effective for suppressing retention of the gas and reducing a pressure loss in letting out the electrolytic solution and the generated gas. Thus, electrolysis at a high current density is easily achieved. The reason for the easy achievement is that, although the anode side of the electrolytic cell is normally seriously affected by the gas bubbles, the electrolysis unit 12, 12A, 12B, 120 according to the present embodiment enables a reduction in the adverse effect of the gas bubbles as a result of the sufficient volumes of the anode chamber 103 and the cathode chamber 105.

For example, under electrolysis conditions including 4 kA/m$^2$, 0.1 MPa, and 90° C., the upper portion of the anode chamber 103 is filled with gas bubbles, and the gas-liquid ratio is 80% or more in some areas of the anode chamber 103. The areas with high gas-liquid ratios tend to expand consistently with the current density. In the areas with high gas-liquid ratios, the fluidity is poor and gas retention areas may be created. A large amount of gas retained allows the gas to pass easily through the ion permeable diaphragm, leading to a reduction in current efficacy and gas purity and to a significant fluctuation in pressure at the time of discharge of the gas and liquid. To reduce the areas with high gas-liquid ratios in the upper portions of the anode chamber 103 and the cathode chamber 105 as much as possible, methods are available such as an increase in electrolytic voltage and a sharp increase in the amount of electrolytic solution circulated. However, the methods tend to increase facility construction costs and are not preferable. In the electrolysis unit 12, 12A, 12B, 120 according to the present invention, the anode chamber 103 and the cathode chamber 105 have sufficient volumes. This reduces the retention of the gas and secures the fluidity of the liquid. Thus, the electrolytic solution can be circulated utilizing the ascending force of gas bubbles, and the gas can be discharged without any fluctuation in pressure.

As described above, electrolysis can be performed at a current density higher than the current density achieved by a conventional alkaline water electrolytic cell of 6 kA/m$^2$ or the like. This enables a reduction in the number of electrolysis units 12, 12A, 12B, 120 in manufacture of an electrolytic cell 100 that allows a desired amount of generated hydrogen to be secured, thus enabling the facility costs to be reduced.

Furthermore, by adopting the zero gap structure for the electrolysis unit 12A, 12B according to the above-described variation of the first embodiment and the electrolysis unit 120 according to the second embodiment, the cathode 19, 38, the ion permeable diaphragm 10, and the anode 18, 39 can be uniformly brought into tight contact with one another. As a result, the generated gas can be let out from rear surfaces of the cathode 19, 38 and the anode 18, 39 without any resistance but retention of the gas bubbles and possible vibration at the time of letting out of the generated gas can be prevented. Stable electrolysis at a very low electrolytic voltage can be performed over a long period of time.

Figure 17:
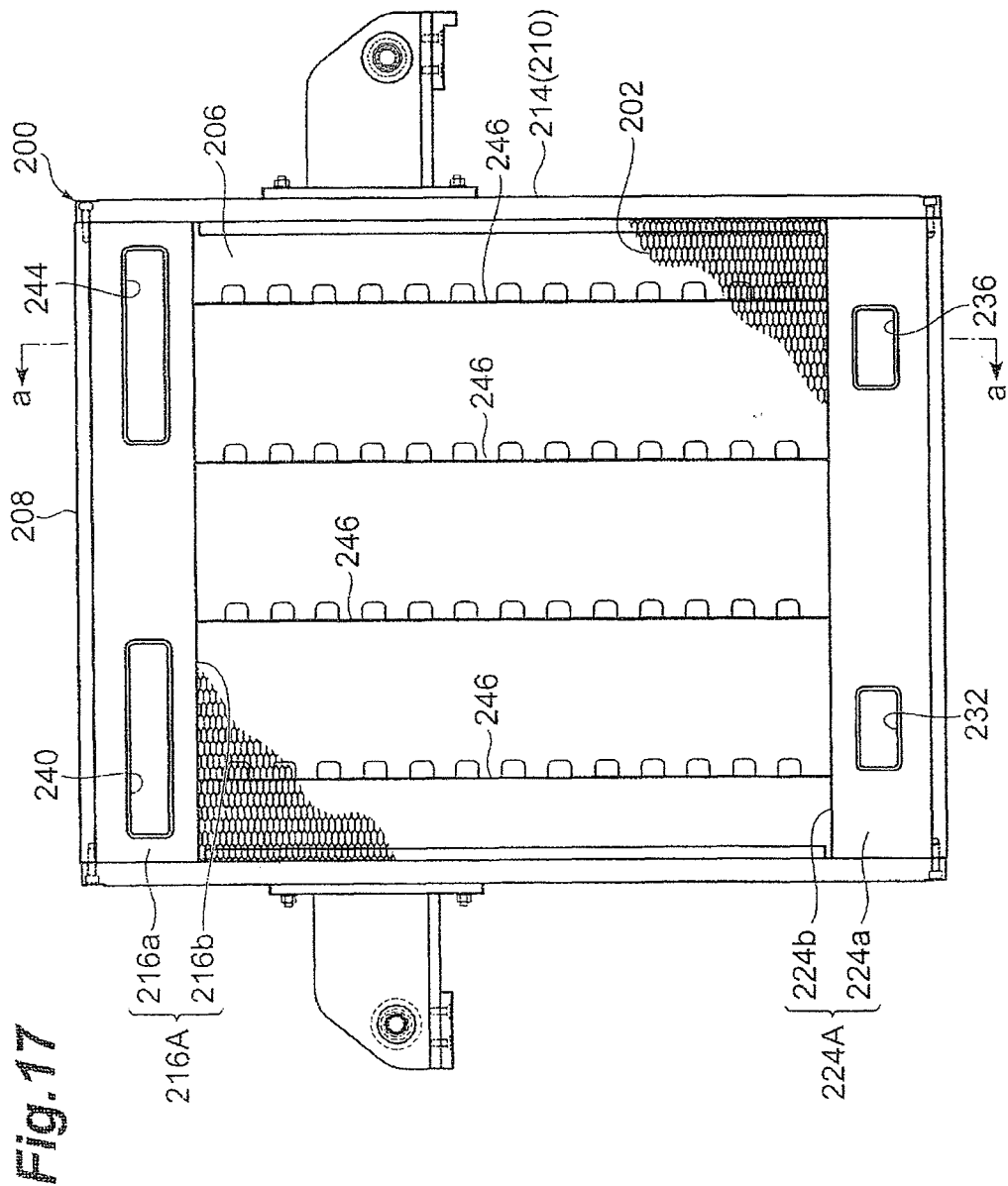
FIG. 17 is a plan view of a bipolar alkaline water electrolysis unit according to another embodiment as viewed from the anode side.
Figure 18:
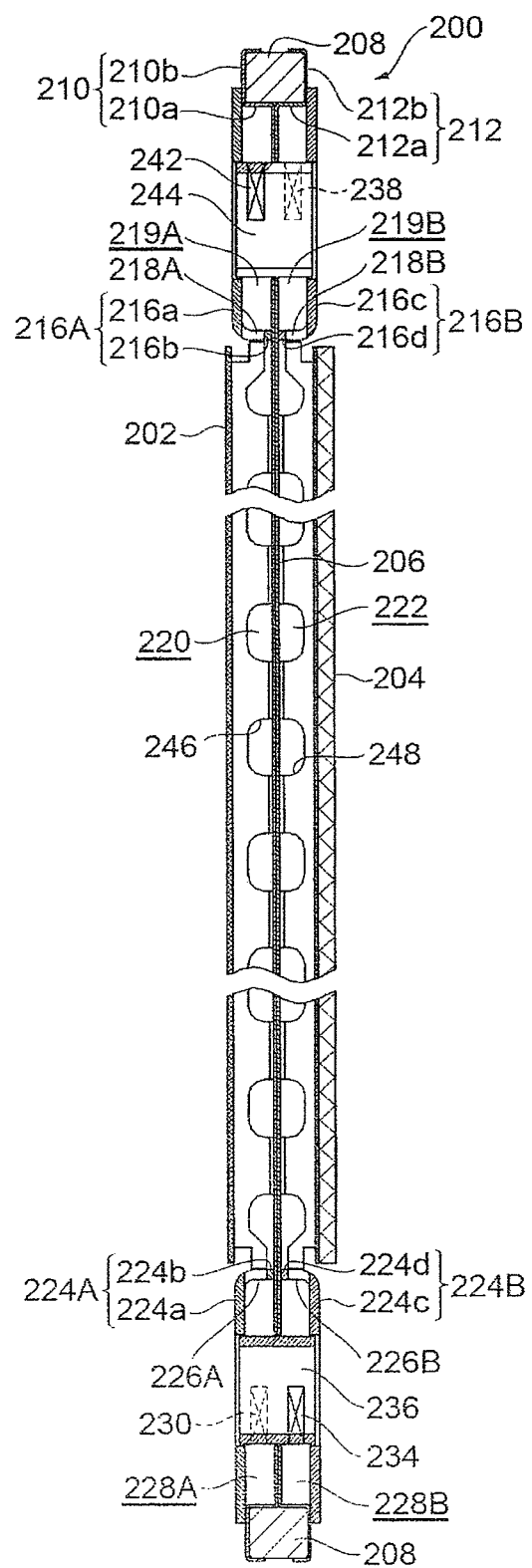
FIG. 18 is a cross-sectional view taken along line a-a in FIG. 17.

Now, an electrolysis unit 200 according to another embodiment will be described with reference to FIG. 17 and FIG. 18. FIG. 17 is a plan view of the electrolysis unit. FIG. 18 is a cross-sectional view taken along line a-a in FIG. 17. The electrolysis unit 200 is different from the electrolysis units 12, 12A, 12B, 120 in that the shape of an outer frame 208 in the electrolysis unit 200 is generally like a rectangle.

The electrolysis unit 200 comprises a rectangular partition wall 206 that separates an anode 202 side and a cathode 204 side from each other. An annular outer frame 208 is disposed along an outer edge of a partition wall 206 so as to surround the partition wall 206.

At an outer periphery of the partition wall 206, an anode side flange pan 210 is provided which extends from the partition wall 206 to come into abutting contact with a part of an outer frame 208 so as to cover the part. Furthermore, at the outer periphery of the partition wall 206, a cathode side flange pan 212 is provided which extends from the partition wall 206 to come into abutting contact with a part of an outer frame 208 so as to cover the part. The anode side flange pan 210 and the cathode side flange pan 212 provide a thin metal plate part 214 attached to the outer frame 208.

The anode side flange pan 210 comprises a peripheral wall portion 210a formed to bend from the partition wall 206 toward the anode 202 side and flange portion 210b bending further from peripheral wall portion 210a to extend in an extending direction of the partition wall 206. Furthermore, the cathode side flange pan 212 has a geometrically symmetrical relationship to the anode side flange pan 210 across the outer frame 208. Specifically, the cathode side flange pan 212 comprises a peripheral wall portion 212a formed to bend from the partition wall 206 toward the cathode 204 side and flange portion 212b bending further from peripheral wall portion 212a to extend in an extending direction of the partition wall 22.

The partition wall 206 comprises a conductive metal steel plate, and the anode side flange pan 210 is formed by bending the metal steel plate. Thus, the partition wall 206 and the anode side flange pan 210 are integral embers. Furthermore, the cathode side flange pan 212 comprises a conductive metal steel plate and is integrated with the partition wall 206 by being joined to the partition wall 206. For a method for joining the cathode side flange pan 212 to the partition wall 206, the junction needs to be achieved by laser welding, Tig welding, or the like so that the electrolytic solution or the gas will not leak to the outside.

Furthermore, the anode side flange pan 210 and the cathode side flange pan 212 are provided to hold the outer frame 208 in a sandwiching manner so as to wrap a part of the outer frame 208. Specifically, the peripheral wall portion 210a of the anode side flange pan 210 is in abutting contact with an anode 202 side half of an inner peripheral surface of the annular outer frame 208. The peripheral wall portion 212a of the cathode side flange pan 212 is in abutting contact with a cathode 204 side half of the inner peripheral surface of the annular outer frame 208. Furthermore, the flange portion 210b of the anode side flange pan 210 overlaps an anode 202 side surface of the outer frame 208 in an abutting contact manner. The flange portion 212b of the cathode side flange pan 212 overlaps a cathode 204 side surface of the outer frame 208 in an abutting contact manner.

The anode side flange pan 210 and the cathode side flange pan 212 are desirably fixed to the outer frame 208 by welding or any other fixing method so as not have a gap or the like between the outer frame 208 and the flange pans 210 and 212. However, even if the flange pans 210 and 212 are not fixed to the outer frame 208, it is sufficient to attach the flange pans 210 and 212 to the outer frame 208 using means for preventing the flange pans 210 and 212 from being detached from the outer frame 208.

An anode upper cover plate 216A is provided at an upper portion of the partition wall 206 and inside (below) the anode side flange pan 210. The anode upper cover plate 216A comprises a rectangular cover main body 216a along the anode side flange pan 210 and an outlet wall 216b bending at a lower end of the cover main body 216a to come into abutting contact with the partition wall 206. An anode upper hole 218A is formed in the outlet wall 216b. The anode side flange pan 210, the partition wall 206, and the anode upper cover plate 216A form an anode chamber outlet space portion 219A. The anode upper hole 218A is in communication with an upper portion of an anode chamber 220.

Similarly, a cathode upper cover plate 216B is provided at an upper portion of the partition wall 206 and inside (below) the cathode side flange pan 212. The anode upper cover plate 216B comprises a rectangular cover main body 216c along the cathode side flange pan 212 and an outlet wall 216d bending at a lower end of the cover main body 216c to come into abutting contact with the partition wall 206. A cathode upper hole 218B is formed in the outlet wall 216d. The cathode side flange pan 212, the partition wall 206, and the cathode upper cover plate 216B form a cathode chamber outlet space portion 219B. The cathode upper hole 218B is in communication with an upper portion of a cathode chamber 222.

Furthermore, an anode lower cover plate 224A is provided at a lower part of the partition wall 206 and inside the anode side flange pan 210. The anode lower cover plate 224A comprises a rectangular cover main body 224a along the anode side flange pan 210 and an inlet wall 224b bending at an upper end of the cover main body 224a to come into abutting contact with the partition wall 206. An anode lower hole 226A is formed in the inlet wall 224b. The anode side flange pan 210, the partition wall 206, and the anode lower cover plate 224A form an anode chamber inlet space portion 228A. The anode lower hole 226A is in communication with a lower part of the anode chamber 220.

Similarly, a cathode lower cover plate 224B is provided at a lower part of the partition wall 206 and inside (above) the cathode side flange pan 212. The cathode lower cover plate 224B comprises a rectangular cover main body 224c along the cathode side flange pan 212 and an inlet wall 224d bending at an upper end of the cover main body 224c to come into abutting contact with the partition wall 206. A cathode lower hole 226B is formed in the inlet wall 224d. The cathode side flange pan 212, the partition wall 206, and the cathode lower cover plate 224B form a cathode chamber inlet space portion 228B. The cathode lower hole 226B is in communication with a lower part of the cathode chamber 222.

The anode chamber inlet space portion 228A is provided with an anode liquid conduit 232 (see FIG. 17) with an anode liquid introduction hole 230 through which an electrolytic solution (anode liquid) is introduced into the anode chamber 220. The cathode chamber inlet space portion 228B is provided with a cathode liquid conduit 236 with a cathode liquid introduction hole 234 through which an electrolytic solution (cathode liquid) is introduced into the cathode chamber 222.

The anode chamber outlet space portion 228B is provided with an anode liquid and gas conduit 240 (see FIG. 17) with an anode liquid and gas discharge hole 238 through which the electrolytic solution (anode liquid) and the gas are let out from inside the anode chamber 220. The cathode chamber outlet space portion 219B is provided with a cathode liquid and gas conduit 244 with a cathode liquid and gas discharge hole 242 through which the electrolytic solution (cathode liquid) and the gas are let out from inside the cathode chamber 222.

A pair of openings is formed at the upper portion of the partition wall 206 at positions corresponding to the anode liquid and gas conduit 240 and the cathode liquid and gas conduit 244, respectively. The anode liquid and gas conduit 240 is installed in one of the openings in an inserting manner. The cathode liquid and gas conduit 244 is installed in the other opening in an inserting manner. In the present embodiment, the anode liquid and gas conduit 240 and the cathode liquid and gas conduit 244 form a passage for the electrolytic solution and the gas.

Furthermore, a pair of openings is formed at the lower part of the partition wall 206 at positions corresponding to the anode liquid conduit 232 and the cathode liquid conduit 236, respectively. The anode liquid conduit 232 is installed in one of the openings in an inserting manner. The cathode liquid conduit 236 is installed in the other opening in an inserting manner. In the present embodiment, the cathode liquid conduit 232 and the cathode liquid conduit 236 form a passage for the electrolytic solution.

An anode rib 246 and a cathode rib 248 are attached to the partition wall 206. The anode rib 246 and the cathode rib 248 serve not only to support the anode 202 or the cathode 204 but also to conduct current from the partition wall 206 to the anode 202 or the cathode 204. Thus, in general, a conducive metal is used for the anode rib 246 and the cathode rib 248. For example, mild steel or stainless steel plated with nickel or nickel may be utilized. Furthermore, the thicknesses of the anode rib 20 and the cathode rib 21 are selected from the range of 0.5 mm to 5 mm in view of costs, productivity, strength, and the like.

The electrolysis unit 200 configured as described above exerts effects similar to the effects of the above-described electrolysis units 12, 12A, 12B, 120.

EXAMPLE 1

The present invention will be described below based on examples. However, the present invention is not limited to the examples.

Example 1

Figure 3:
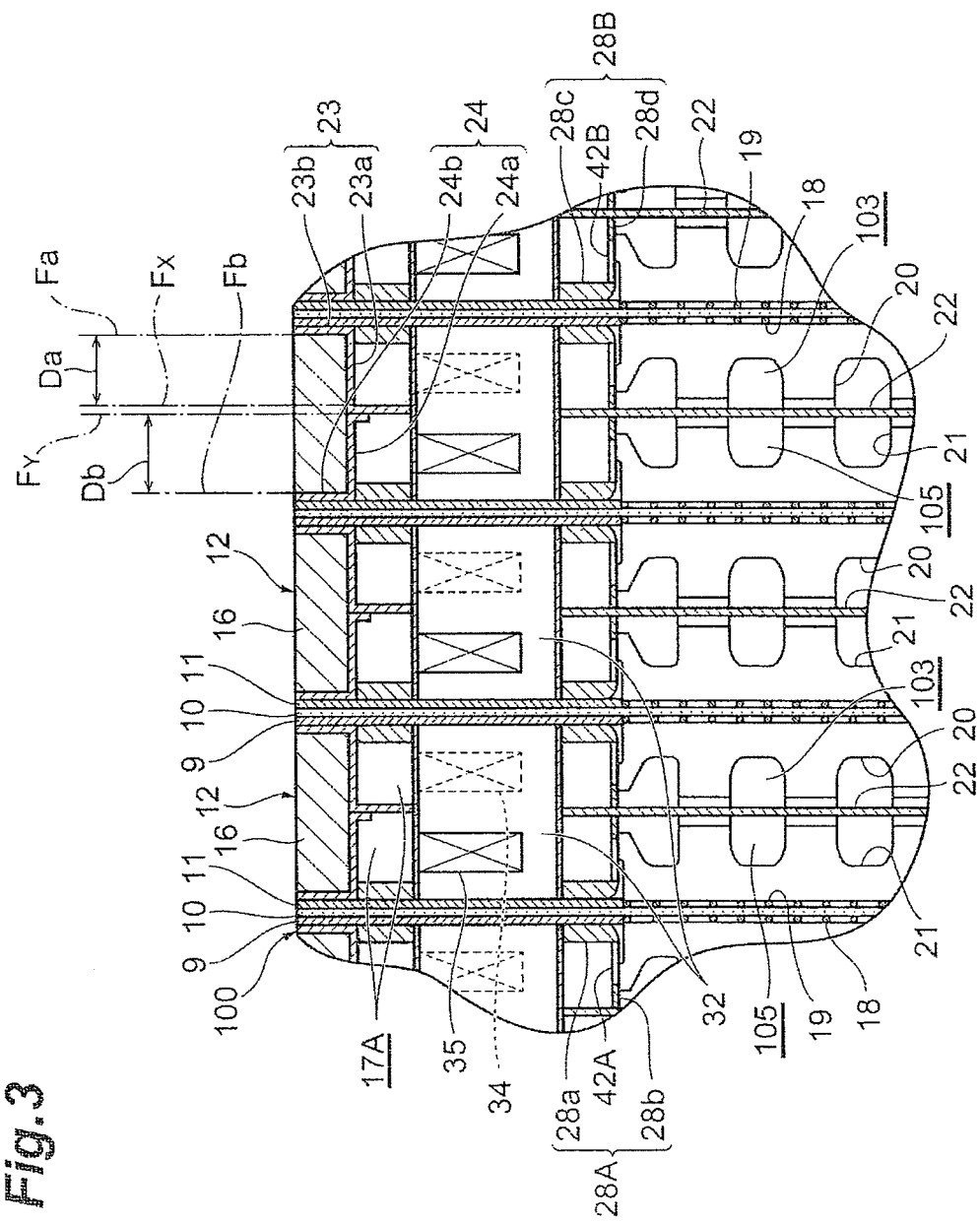
FIG. 3 is a partly enlarged cross-sectional view of the electrolytic cell.

An electrolytic cell 100 similar to the one depicted in FIG. 2 was assembled by using three cells with electrolysis units 12 similar to those according to the first embodiment depicted in FIG. 3 and FIG. 4, and placing the press flange 5, the press flange gasket 6, and the anode terminal unit 8 at one end of the electrolytic cell, while arranging the end press flange 14 with the cathode terminal unit 13 and the insulating plate 41 attached thereto, at the other end, as depicted in FIG. 1.

The electrolysis unit 12 was shaped like a circle with an outer diameter of 700 mm, and the areas of the anode 18 and the cathode 19 were each 0.25 $m^2$. Furthermore, the depth (anode chamber depth) of the anode chamber 103 was 15 mm, and the depth (cathode chamber depth) of the cathode chamber 105 was 15 mm. The materials for the anode side flange pan 23 and the cathode side flange pan 24 were each nickel. The nickel partition wall 22 to which the nickel anode rib 20 of height 15 mm and thickness 1.5 mm and the nickel cathode rib 21 of height 13.5 mm and thickness 1.5 mm were attached by welding had a thickness of 1 mm.

For the anode 18 installed in the electrolysis unit 12, the thickness of the electrode was set to 2 mm by coating nickel oxide on the nickel expand metal of thickness 1.5 mm in the anode by plasma spraying. The cathode 19 was used in which a coating containing ruthenium oxide as a main component was deposited, to a thickness of 5 microns, on the nickel expand metal of thickness 1.5 mm.

The anode gasket 9 and the cathode gasket 11 formed of EPDM and having a thickness of 2 mm were used. The nickel anode lower cover plate 33A of thickness 3 mm with the rectangular anode lower hole 43A of width 3 mm and length 10 mm was attached to the anode 18 side lower part of the electrolysis unit 12. Furthermore, the nickel cathode lower cover plate 33B of thickness 3 mm with the rectangular cathode lower hole 43B of width 3 mm and length 10 mm was attached to the cathode 19 side lower part of the electrolysis unit 12. The anode lower cover plate 33A and the cathode lower cover plate 33B were provided with the anode liquid conduit 26 and the cathode liquid conduit 27 which were shaped like a circle of diameter 34 mm and internally lined with EPDM rubber to a thickness of 0.5 mm. One hole with a diameter of 10 mm was formed in each of the anode and cathode lower cover plates 33A and 33B as the anode liquid introduction hole 29 and the cathode liquid introduction hole 30, respectively.

The nickel anode upper cover plate 28A of thickness 3 mm with the rectangular anode upper hole 42A of width 3 mm and length 10 mm was attached to the anode 18 side upper portion of the electrolysis unit 12. Furthermore, the nickel cathode upper cover plate 28B of thickness 3 mm with the rectangular cathode upper hole 42B of width 3 mm and length 10 mm was attached to the cathode 19 side upper portion of the electrolysis unit 12. The anode upper cover plate 28A and the cathode upper cover plate 28B were provided with the anode liquid and gas conduit 31 and the cathode liquid and gas conduit 32 which had a cross-sectional area equivalent diameter of 70 mm and which were internally lined with EPDM rubber to a thickness of 0.5 mm. Slits of width 10 mm and length 50 mm were formed as the anode liquid and gas discharge hole 34 and the cathode liquid and gas discharge hole 35. Openings that were the same in size as the anode liquid and gas conduit 31 and the cathode liquid and gas conduit 32, respectively, were also formed at the upper portion of the partition wall 22 at the same positions as those of the anode liquid and gas conduit 31 and the cathode liquid and gas conduit 32 so that the anode liquid, the cathode liquid, and the gas passed though the openings.

As the ion permeable diaphragm 10, an ion exchange membrane of thickness 200 microns was installed in the electrolytic cell 100 with the above-described electrolysis units 12; the ion exchange membrane was a fluorine-containing sulphonic acid membrane with an equivalent weight of 950 g/eq and comprised a PTFE core material. Electrolysis was performed at 80° C. and at a current density of 2 kA/$m^2$ to 6 kA/$m^2$ for one week using 23% NaOH as an electrolytic solution. The voltage and the hydrogen gas purity were measured. The hydrogen gas purity was measured by gas chromatography. Table 1 depicts results. Stable electrolysis was achieved even at a high current density of 6 kA/$m^2$ without a rapid rise in voltage.

TABLE 1

|  | Example 1 | | |
|---|---|---|---|
| Current (A/$m^2$) | 500 | 1000 | 1500 |
| Current density (A/$m^2$) | 2000 | 4000 | 6000 |
| Electrolytic solution concentration (NaOH wt %) | 23 | 23 | 23 |
| Electrolysis temperature (° C.) | 80 | 80 | 80 |
| Mean temperature (V) | 1.72 | 1.90 | 2.08 |
| Hydrogen purity (%) | >99 | >99 | >99 |
| Electric power consumption rate (dc-k\WH/$Nm^3$-$H_2$) | 4.15 | 4.59 | 5.02 |

Example 2

Figure 12:
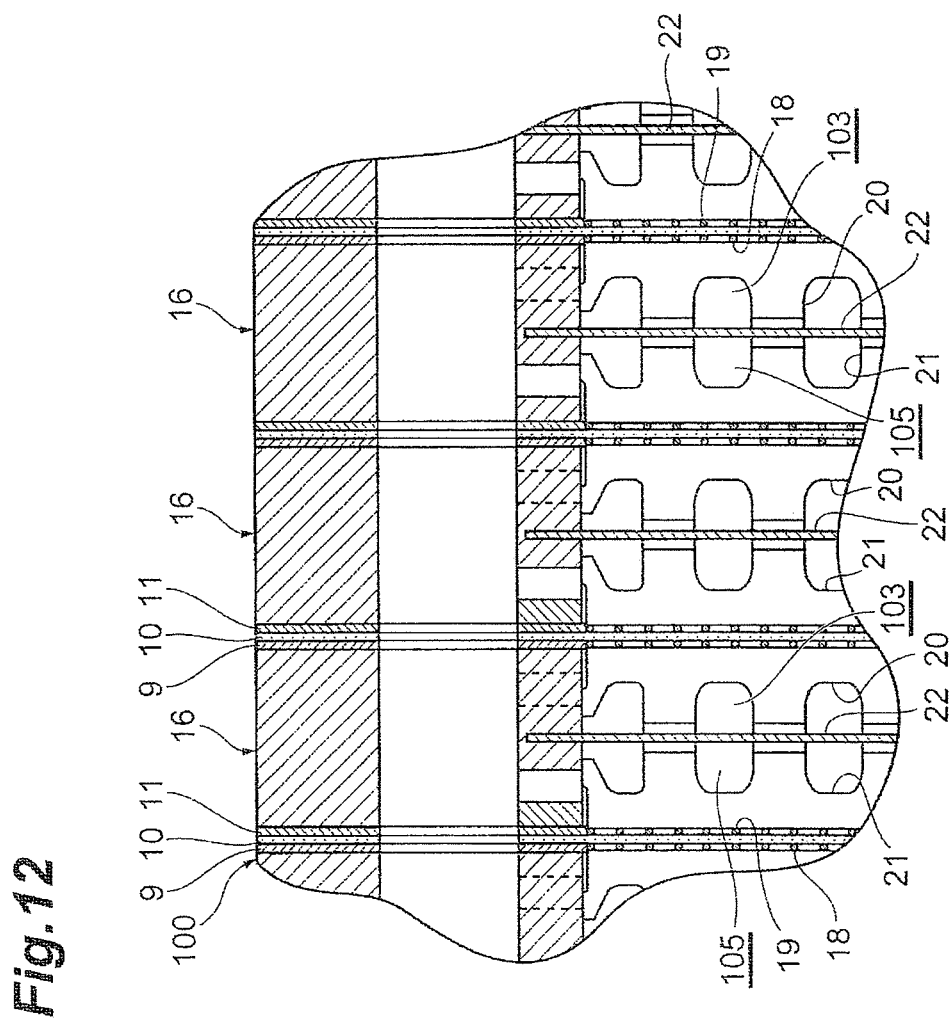
FIG. 12 is a partly enlarged cross-sectional view of the electrolytic cell.

An electrolytic cell 100 similar to the one depicted in FIG. 2 was assembled by using three cells with electrolysis units 12 similar to those according to the first embodiment depicted in FIG. 12 and FIG. 13, and placing the press flange 5, the press flange gasket 6, and the anode terminal unit 8 at one end of the electrolytic cell, while arranging the end press flange 14 with the cathode terminal unit 13 and the insulating plate 41 attached thereto, at the other end, as depicted in FIG. 1.

The electrolysis unit 12 was shaped like a circle with an outer diameter of 700 mm, and the areas of the anode 18 and the cathode 19 were each 0.25 $m^2$. Furthermore, the depth (anode chamber depth) of the anode chamber 103 was 15 mm, and the depth (cathode chamber depth) of the cathode chamber 105 was 15 mm. The nickel anode rib 20 of height 15 mm and thickness 1.5 mm and the nickel cathode rib 21 of height 13.5 mm and thickness 1.5 mm were attached to the partition wall 22 of thickness 1 mm by welding. The resin outer frame 16 was produced by being molded with the partition wall 22 installed therein, using an epoxy resin with a curing agent containing aromatic amine.

For the anode 18 installed in the electrolysis unit 12, the thickness of the electrode was set to 2 mm by coating nickel oxide on the nickel expand metal of thickness 1.5 mm in the anode by plasma spraying. The cathode 19 was used in which a coating containing ruthenium oxide as a main component was deposited, to a thickness of 5 microns, on the nickel expand metal of thickness 1.5 mm. The anode gasket 9 and the cathode gasket 11 each formed of EPDM and having a thickness of 2 mm were used.

In the lower bulging portion 16b at the lower part of the resin outer frame 16, the anode liquid passing hole 26b and cathode liquid passing hole 27b each shaped like a circle and having a thickness of 34 mm were formed, and one hole shaped like a conduit and having a diameter of 10 mm was formed as the anode liquid introduction hole 29 and the cathode liquid introduction hole 30.

In the upper bulging portion 16a at the upper portion of the resin outer flume 16, the anode liquid and gas passing hole 31b and cathode liquid and gas passing hole 32b each having a cross-sectional area equivalent diameter of 70 mm were formed, and five holes each shaped like a conduit and having a diameter of 10 mm were formed as the anode liquid and gas discharge hole 34 and the cathode liquid and gas discharge hole 35.

As the ion permeable diaphragm 10, an ion exchange membrane of thickness 200 microns was installed in the electrolytic cell 100 with the above-described electrolysis units 12; the ion exchange membrane was a fluorine-containing sulphonic acid membrane with an equivalent weight of 950 g/eq and comprised a PTFE core material. Electrolysis was performed at 80° C. and at a current density of 2 kA/m$^2$ to 6 kA/m$^2$ for one week using 23% NaOH as an electrolytic solution. The voltage and the hydrogen gas purity were measured. The hydrogen gas purity was measured by gas chromatography.

Table 2 depicts results. Stable electrolysis was achieved even at a high current density of 6 kA/m$^2$ without a rapid rise in voltage.

TABLE 2

|  | Example 2 | | |
|---|---|---|---|
| Current (A/m$^2$) | 500 | 1000 | 1500 |
| Current density (A/m$^2$) | 2000 | 4000 | 6000 |
| Electrolytic solution concentration (NaOH wt %) | 23 | 23 | 23 |
| Electrolysis temperature (° C.) | 80 | 80 | 80 |
| Mean temperature (V) | 1.70 | 1.87 | 2.05 |
| Hydrogen purity (%) | >99 | >99 | >99 |
| Electric power consumption rate (dc-kWH/Nm$^3$-H$_2$) | 4.10 | 4.51 | 4.95 |

Example 3

Figure 8:
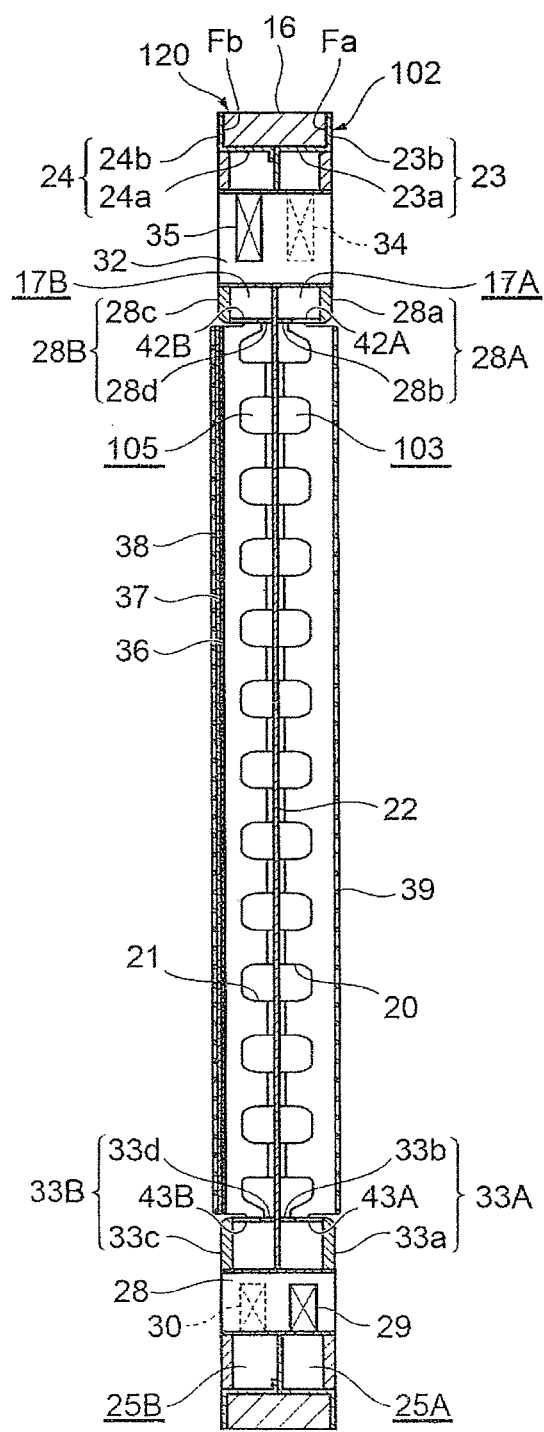
FIG. 8 is a cross-sectional view of a bipolar alkaline water electrolysis unit according to a second embodiment.
Figure 9:
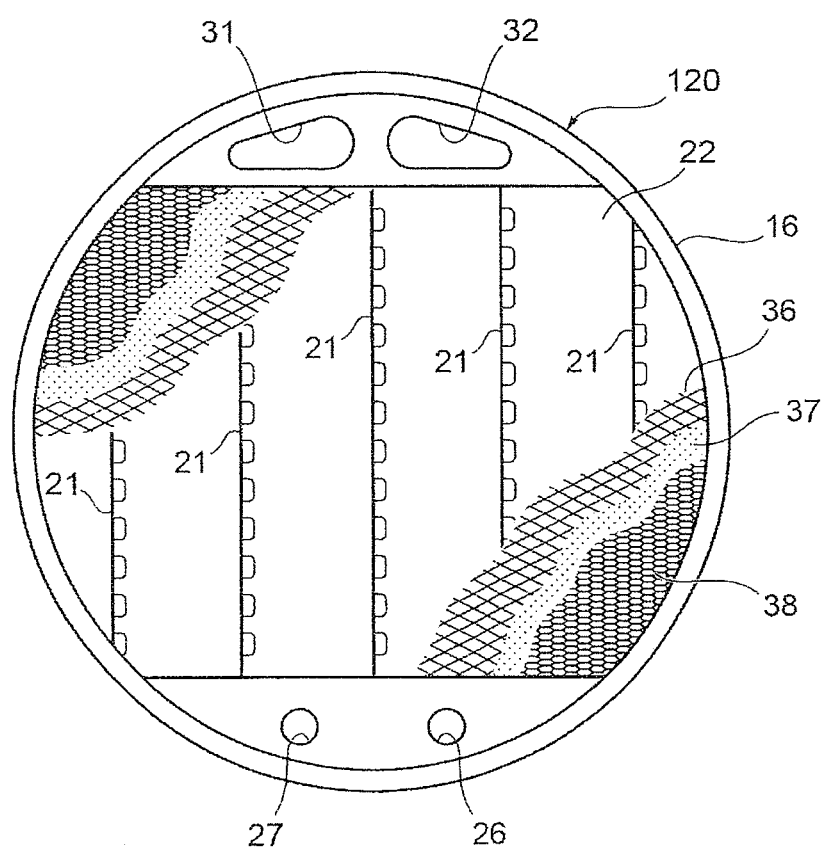
FIG. 9 is a plan view of the bipolar alkaline water electrolysis unit according to the second embodiment as viewed from a cathode side.
Figure 10:
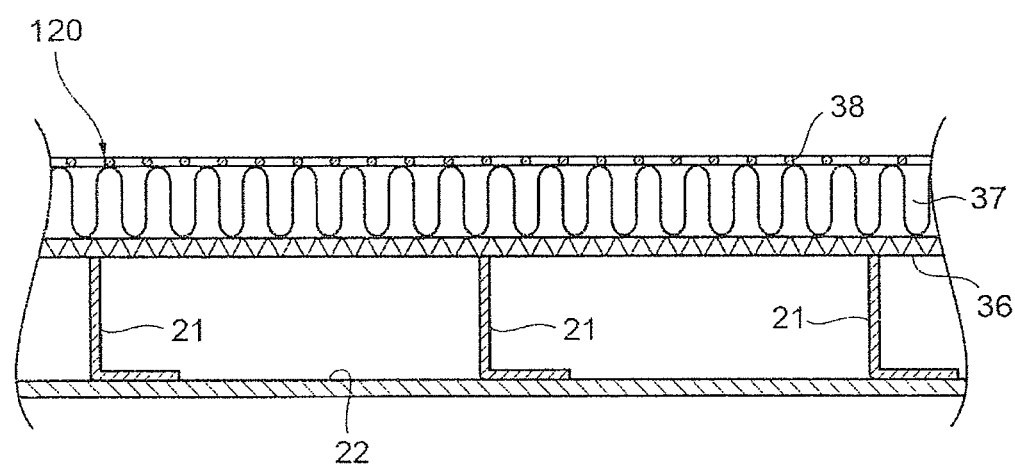
FIG. 10 is a cross-sectional view of a cathode side part of the bipolar alkaline water electrolysis unit according to the second embodiment.
Figure 11:
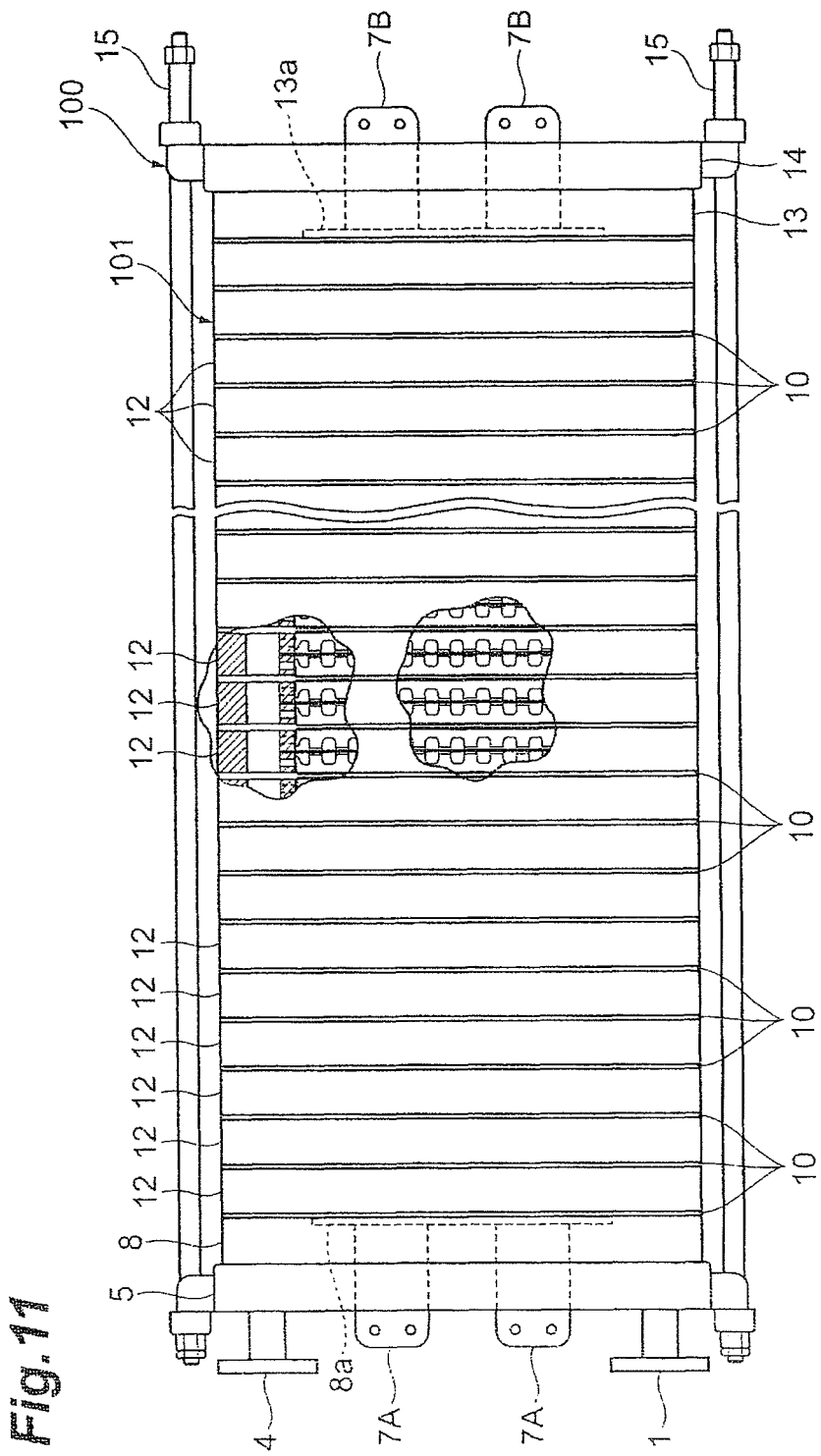
FIG. 11 is a partly exploded side view depicting an electrolytic cell.

An electrolytic cell 100 similar to the one depicted in FIG. 2 was assembled by using three cells with electrolysis units 120 similar to those according to the second embodiment depicted in FIGS. 8 to 10 instead of the electrolysis units 12, and placing the press flange 5, the press flange gasket 6, and the anode terminal unit 8 at one end of the electrolytic cell, while arranging the end press flange 14 with the cathode terminal unit 13 and the insulating plate 41 attached thereto, at the other end, as depicted in FIG. 1.

The electrolysis unit 12 was shaped like a circle with an outer diameter of 700 mm, and the areas of the anode 18 and the cathode 19 were each 0.25 m$^2$. Furthermore, the depth (anode chamber depth) of the anode chamber 103 was 15 mm, and the depth (cathode chamber depth) of the cathode chamber 105 was 15 mm. The materials for the anode side flange pan 23 and the cathode side flange pan 24 were each nickel. The partition wall 22 to which the nickel anode rib 20 of height 15 mm and thickness 1.5 mm and the nickel cathode rib 21 of height 13.5 mm and thickness 1.5 mm were attached had a thickness of 1 mm.

For the anode 39 installed in the electrolysis unit 12, a base material was formed by pressing the nickel expand metal of thickness 1.5 mm using a roll, and smoothing the pressed expand metal to a thickness of 1.0 mm. Nickel oxide was then coated on the base material by plasma spraying to set the thickness of the electrode to 1.5 mm.

The zero gap module (zero gap structure) was structured as depicted in FIG. 8. That is, nickel expand metal of thickness 1.2 mm with an opening of horizontal length 8 mm and vertical length 5 mm was used as the current collector 36. The cushion mat 37 with a thickness of 9 mm was obtained by weaving four 0.1-mm nickel wires into a fabric and further corrugating the fabric, and the fabric was fixed on the current collector at five positions by spot welding. The zero gap cathode 38 was used which was obtained by depositing, to a thickness of 3 microns, a coating containing ruthenium oxide as a main component on a nickel net having a wire shape of 0.15 mm and 40 meshes.

The nickel anode upper cover plate 28A of thickness 3 mm with the rectangular anode upper hole 42A of width 3 mm and length 10 mm was attached to the anode 39 side upper portion of the electrolysis unit 12. Furthermore, the nickel cathode upper cover plate 28B of thickness 3 mm with the rectangular cathode upper hole 42B of width 3 mm and length 10 mm was attached to the cathode 38 side upper portion of the electrolysis unit 12.

The anode upper cover plate 28A and the cathode upper cover plate 28B were provided with the anode liquid and gas conduit 31 and the cathode liquid and gas conduit 32 which had a cross-sectional area equivalent diameter of 70 mm and which were coated with EPDM rubber to a thickness of 0.5 mm. Slits of width 10 mm and length 50 mm were formed as the anode liquid and gas discharge hole 34 and the cathode liquid and gas discharge hole 35. Openings that were the same in size as the anode liquid and gas conduit 31 and the cathode liquid and gas conduit 32, respectively, were also formed at the upper portion of the partition wall 22 at the same positions as those of the anode liquid and gas conduit 31 and the cathode liquid and gas conduit 32 so that the anode liquid, the cathode liquid, and the gas passed though the openings.

As the ion permeable diaphragm 10, an ion exchange membrane of thickness 200 microns was installed in the electrolytic cell 100 as described above; the ion exchange membrane was a fluorine-containing sulphonic acid membrane with an equivalent weight of 950 g/eq and comprised a PTFE core material. Electrolysis was performed at 80° C. and at a current density of 2 kA/m$^2$ to 6 kA/m$^2$ for one week using 23% NaOH as an electrolytic solution. The voltage and the hydrogen gas purity were measured. The hydrogen gas purity was measured by gas chromatography.

Table 3 depicts results. Not only was stable electrolysis achieved even at a high current density of 6 kA/m$^2$ without a rapid rise in voltage but also the electrolytic voltage was low.

TABLE 3

|  | Example 3 | | |
|---|---|---|---|
| Current (A/m$^2$) | 500 | 1000 | 1500 |
| Current density (A/m$^2$) | 2000 | 4000 | 6000 |

TABLE 3-continued

|  | Example 3 | | |
| --- | --- | --- | --- |
| Electrolytic solution concentration (NaOH wt %) | 23 | 23 | 23 |
| Electrolysis temperature (° C.) | 80 | 80 | 80 |
| Mean temperature (V) | 1.57 | 1.72 | 1.87 |
| Hydrogen purity (%) | >99 | >99 | >99 |
| Electric power consumption rate (dc-kWH/Nm$^3$-H$_2$) | 3.79 | 4.15 | 4.51 |

Example 4

Figure 16:
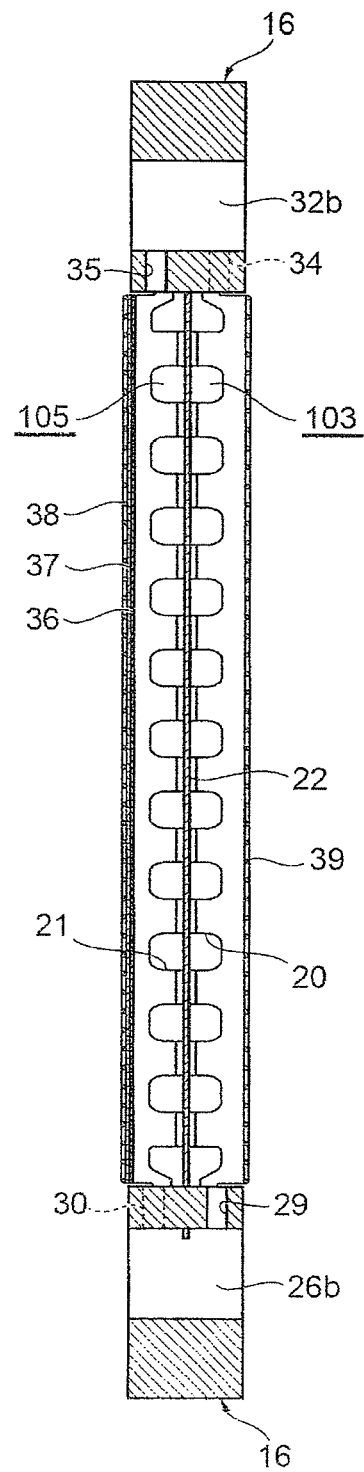
FIG. 16 is a cross-sectional view of a bipolar alkaline water electrolysis unit according to a fourth embodiment.

An electrolytic cell 100 similar to the one depicted in FIG. 2 was assembled by using three cells with electrolysis units 120 similar to those according to the fourth embodiment depicted in FIG. 9, FIG. 16, and FIG. 10 instead of the electrolysis units 12, and placing the press flange 5, the press flange gasket 6, and the anode terminal unit 8 at one end of the electrolytic cell, while arranging the end press flange 14 with the cathode terminal unit 13 and the insulating plate 41 attached thereto, at the other end, as depicted in FIG. 1.

The electrolysis unit 120 was shaped like a circle with an outer diameter of 700 mm, and the areas of the anode 18 and the cathode 19 were each 0.25 m$^2$. Furthermore, the depth (anode chamber depth) of the anode chamber 103 was 15 mm, and the depth (cathode chamber depth) of the cathode chamber 105 was 15 mm. The nickel anode rib 20 of height 15 mm and thickness 1.5 mm and the nickel cathode rib 21 of height 13.5 mm and thickness 1.5 mm were attached to the partition wall 22 of thickness 1 mm by welding. The resin outer frame 16 was produced by being molded with the partition wall 22 sandwiched therein, using an epoxy resin with a curing agent containing aromatic amine.

For the anode 39 installed in the electrolysis unit 120, a base material was formed by pressing the nickel expand metal of thickness 1.5 mm using a roll, and smoothing the pressed expand metal to a thickness of 1.0 mm. Nickel oxide was then coated on the base material by plasma spraying to set the thickness of the electrode to 1.5 mm.

The zero gap module (zero gap structure) was structured as depicted in FIG. 10. That is, nickel expand metal of thickness 1.2 mm with an opening of horizontal length 8 mm and vertical length 5 mm was used as the current collector 36. The cushion mat 37 with a thickness of 9 mm was obtained by weaving four 0.1-mm nickel wires into a fabric and further corrugating the fabric, and the fabric was fixed on the current collector at five positions by spot welding. The zero gap cathode 38 was used which was obtained by depositing, to a thickness of 3 microns, a coating containing ruthenium oxide as a main component on a nickel net having a wire shape of 0.15 mm and 40 meshes.

In the lower bulging portion 16b at the lower part of the resin outer frame 16, the anode liquid passing hole 26b and cathode liquid passing hole 27b each shaped like a circle and having a thickness of 34 mm were formed, and one hole shaped like a conduit and having a diameter of 10 mm was formed as the anode liquid introduction hole 29 and the cathode liquid introduction hole 30.

In the upper bulging portion 16a at the upper portion of the resin outer frame 16, the anode liquid and gas passing hole 31b and cathode liquid and gas passing hole 32b each having a cross-sectional area equivalent diameter of 70 mm were formed, and five holes each shaped like a conduit and having a diameter of 10 mm were fixated as the anode liquid and gas discharge hole 34 and the cathode liquid and gas discharge hole 35.

As the ion permeable diaphragm 10, an ion exchange membrane of thickness 200 microns was installed in the electrolytic cell 100 with the above-described electrolysis units 120; the ion exchange membrane was a fluorine-containing sulphonic acid membrane with an equivalent weight of 950 g/eq and comprised a PTFE core material. Electrolysis was performed at 80° C. and at a current density of 2 kA/m$^2$ to 6 kA/m$^2$ for one week using 23% NaOH as an electrolytic solution. The voltage and the hydrogen gas purity were measured. The hydrogen gas purity was measured by gas chromatography.

Table 4 depicts results. Not only was stable electrolysis achieved even at a high current density of 6 kA/m$^2$ without a rapid rise in voltage but also the electrolytic voltage was low.

TABLE 4

|  | Example 4 | | |
| --- | --- | --- | --- |
| Current (A/m$^2$) | 500 | 1000 | 1500 |
| Current density (A/m$^2$) | 2000 | 4000 | 6000 |
| Electrolytic solution concentration (NaOH wt %) | 23 | 23 | 23 |
| Electrolysis temperature (° C.) | 80 | 80 | 80 |
| Mean temperature (V) | 1.55 | 1.69 | 1.84 |
| Hydrogen purity (%) | >99 | >99 | >99 |
| Electric power consumption rate (dc-kWH/Nm$^3$-H$_2$) | 3.74 | 4.08 | 4.44 |

EXAMPLE 2

(Production of the Electrode A)

100 wt % nickel oxide powder of particle size 0.2 to 2 μm, 2.25 wt % gum arabic, 0.7 wt % carboxyl methylcellulose, 0.001 wt % sodium lathyl sulfate, and 100 wt % water were mixed together and stirred to prepare a suspension. A granulated substance with a particle size of 5 to 50 μm was prepared from the suspension using a spray drying granulator.

The granulated substance was sprayed on the opposite surfaces of a conductive base material by plasma spraying. An electrode A with the conductive base material and a catalytic layer covering the conductive base material was obtained using the steps below. The catalytic layer provided in the electrode A corresponds to a precursor of each of the catalytic layers in electrodes B, C, D, E, F, and H described below.

As the conductive base material, a nickel expand base material previously subjected to blast processing was used. The thickness of the base material was 1 mm. In the plasma spraying, a gas comprising argon and nitrogen mixed in the ratio of 1:0.8 was used as a plasma gas. The thickness of the precursor of the catalytic layer covering the front surface of the conductive base material was adjusted to 240 μm. The thickness of the precursor of the catalytic layer covering the back surface of the conductive base material was adjusted to 160 μm.

(Production of the Electrode B)

The electrode A was produced in a manner similar to the above-described manner. The dimensions of the electrode A were adjusted to 3 cm in height×3 cm in width by means of cutting processing. The electrode was installed in a quartz tube with a length of 80 cm and an inner diameter of 50 mm. The quartz tube was inserted into a ring furnace with a width of 60 cm. The quartz tube was internally heated to 300° C. and a hydrogen stream was continuously fed into the quartz tube for two weeks, to reduce the precursor of the catalytic layer. Through the above-described steps, an electrode B comprising a conductive base material and a catalytic layer covering the conductive base material was obtained.

(Production of the Electrode C)

An electrode C was obtained in a manner similar to the manner for the electrode B except that the precursor of the catalytic layer was reduced while the quartz tube was heated to 600° C.

(Production of the Electrode D)

An electrode D was obtained in a manner similar to the manner for the electrode B except that the precursor of the catalytic layer was reduced while the quartz tube was heated to 180° C.

(Production of the Electrode E)

An electrode E was obtained in a manner similar to the manner for the electrode B except that the precursor of the catalytic layer was reduced while the quartz tube was heated to 200° C.

(Production of the Electrode F)

An electrode F was obtained in a manner similar to the manner for the electrode B except that the precursor of the catalytic layer was reduced while the quartz tube was heated to 250° C.

(Production of the Electrode G)

The electrode A was produced in a manner similar to the above-described manner. The dimensions of the electrode A were adjusted to 3 cm in height×3 cm in width by means of cutting processing. The resultant electrode was immersed into a water solution of NaOH as a cathode, and electrolysis was performed to generate hydrogen on the cathode. The concentration of the water solution of NaOH was 32 wt %, and the liquid temperature was adjusted to 90° C. The precursor of the catalytic layer was reduced by this electrolysis. The reduction based on the electrolysis was continued for 90 days. During the electrolysis, the current density of the cathode was maintained at 0.6 A/cm$^2$. Through the above-described steps, an electrode G comprising a conductive base material and a catalytic layer covering the conductive base material was obtained.

(Production of the Electrode H)

An electrode H was obtained in a manner similar to the manner for the electrode G except that the reduction of the precursor of the catalytic layer based on the electrolysis was continued for 180 days.

[Measurement of the Specific Surface Area]

The catalytic layer peeled off from the conductive base material of the electrode A was installed in a sample pretreatment apparatus VacuPrep manufactured by Shimadzu Corporation. A chamber with the catalytic layer installed therein was internally evacuated, and the catalytic layer was retained in a vacuum atmosphere at 80° C. for two hours to obtain a sample used for measurement of the specific surface area. An adsorption and desorption isotherm of the sample was measured by a fixed volume gas adsorption method. Based on the adsorption and desorption isotherm, the pore sizes of the pores in the sample and the specific surface area (unit: m$^2$/g·nm) of the pore for each pore size were calculated by the BJH (Barrett Joyner Halenda) method. For the measurement of the adsorption and desorption isotherm, a micrometrics automatic surface area and porosimetry analyzer "TriStar II3020" manufactured by Shimadzu Corporation was used. For the gas adsorption, a nitrogen gas was used as an adsorption gas, and liquid nitrogen was used as a refrigerant.

The specific surface areas of the pores for the different pore sizes were integrated. Thus, for first pores of the pores in the catalytic layer of the electrode A which had a pore size of 2 to 5 nm, the specific surface area (unit: m$^2$/g) was determined. In a similar manner, for second pores of the pores in the catalytic layer of the electrode A which had a pore size of 0.01 to 2.00 nm, the specific surface area (unit: m$^2$/g) was determined. Results are depicted in Table 5.

In a manner similar to the manner for the electrode A, the specific surface areas of each first pore and each second pore were determined which were formed in the catalytic layer of each of the electrodes B, C, D, E, F, G, and H. Results are depicted in Table 5.

[Measurement of Volume of the Pore]

Mercury intrusion was used to measure the pore sizes of the pores in the catalytic layer peeled off from the conductive base material of the electrode A and the pore volume of the pore for each pore size. For the measurement of the pore volume, an automatic porosimeter "AutoPore 9520" by Shimadzu Corporation was used. The pore volumes for the different pore sizes were integrated. Thus, for the first pores of the pores in the catalytic layer of the electrode A which had a pore size of 2 to 5 nm, the pore volume (unit: ml/g) was determined. In a similar manner, for second pores of the pores in the catalytic layer of the electrode A which had a pore size of 0.01 to 2.00 µm, the pore volume (unit: ml/g) was determined. Results are depicted in Table 5.

In a manner similar to the manner for the electrode A, the pore volumes of each first pore and each second pore were determined which were formed in the catalytic layer of each of the electrodes B, C, D, E, F, G, and H. Results are depicted in Table 5.

[Measurement of INi/(INi+INiO)]

Based on the measurement result of ORD, INi/(INi+INiO) of the surface of the catalytic layer of each electrode was determined. Results are depicted in Table 1. The "metal Ni ratio" in Table 1 means that [INi/(INi+INiO)]×100. A large value of [INi/(INi+INiO)]×100 means a high content of metal nickel in each catalytic layer.

[Measurement of Oxygen Generating Potential]

The electrode A of 2 cm in height×2 cm in width resulting from cutting processing was immersed in a water solution of KOH filling a fluorine resin beaker. The temperature of the water solution of KOH was maintained at 90° C. The concentration of the KOH in the water solution was 30 wt %. The water solution of KOH was electrolyzed using an apparatus comprising the electrode A (anode), a platinum gauze (cathode), and a fluorine resin cylinder covering the periphery of the cathode, with electric conductivity secured among the anode, the cathode, and the cylinder. Thus, oxygen was generated on the electrode A. As the fluorine resin cylinder, one with a large number of holes of 1 mmϕ was used. Electrolysis was performed with mixture of a generated gas prevented. The current density in the electrolysis was adjusted to 0.6 A/cm$^2$. The oxygen generating potential of the electrode A during the electrolysis was measured. The oxygen generating potential was measured by a three electrode method using a Luggin capillary in order to eliminate the adverse effects of Ohmic losses resulting from solution resistance. The distance between the tip of the Luggin capillary and the anode was constantly fixed to 1 mm. As a measurement apparatus for the oxygen generating potential, "1470 BEC System" manufactured by Solartron was used. As a reference electrode for the three electrode method, silver-silver chloride (Ag/AgCl) was used. Ohm losses that are not successfully eliminated by using the three electrode method were measured by current interruption, and based on the measured value of the Ohmic losses, the oxygen generating potential was corrected. For the measurement of the Ohmic losses, a constant current pulse generator "HC-2005" by Hokuto Denko Corporation was used.

The oxygen generating potential of each of the electrodes B, C, D, E, F, G, and H was measured in a manner similar to the manner for the electrode A except that, instead of the electrode A, one of the electrodes B, C, D, E, F, G, and H was used as an anode. The oxygen generating potential (unit: mV v. s. Ag/AgCl) of each electrode is depicted in Table 5. A low oxygen generating potential means that the oxygen generating overvoltage is low.

Figure 19:
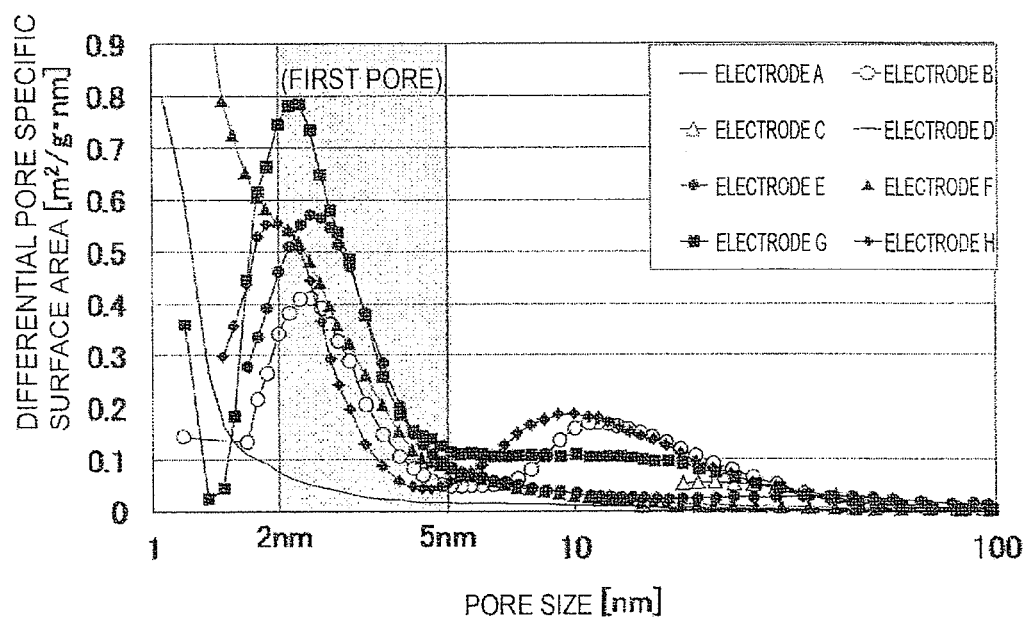
FIG. 19 is a graph depicting relations between the pore size of each pore in a catalytic layer in an alkaline water electrolysis anode and a differential pore specific surface area.
Figure 20:
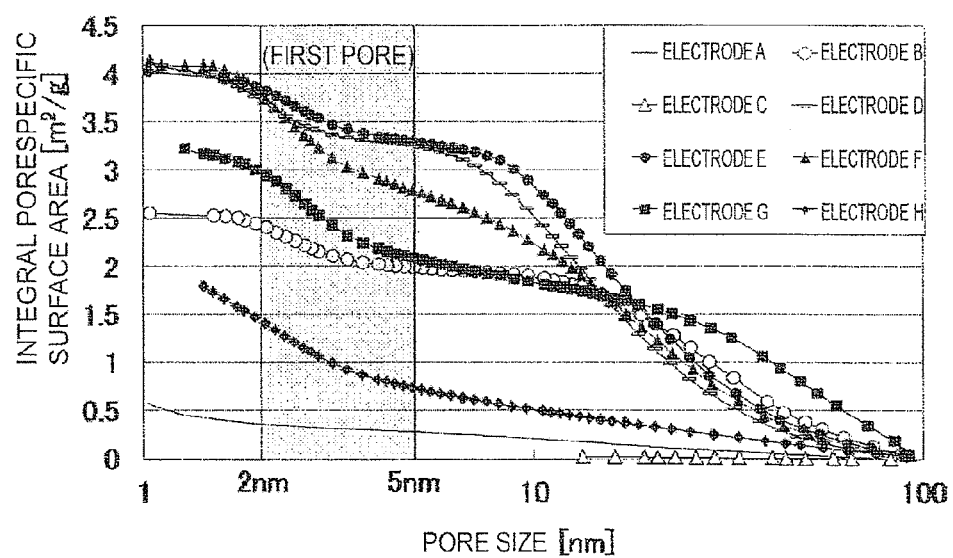
FIG. 20 is a graph depicting relations between the pore size of each pore in the catalytic layer in the alkaline water electrolysis anode and an integral pore specific surface area.

The relations between the pore size of each pore formed in the catalytic layer of each electrode and the specific surface area of the pore for each pore size are depicted in FIG. 19 and FIG. 20. FIG. 19 is based on measurement results for the specific surface area in accordance with the BJH method. The axis of ordinate in FIG. 19 represents a value (differential pore specific surface area) resulting from division of a differential pore volume dV for the integral specific surface area determined in accordance with the BJH method by a differential value d for the pore size of each pore. The axis of abscissas in FIG. 19 represents the mean value of the pore sizes of the pores in each measurement section for the specific surface area. Data illustrated in FIG. 20 are the same as the data in FIG. 19 except that the unit for the axis of ordinate is changed to the integral pore specific surface area.

Figure 21:
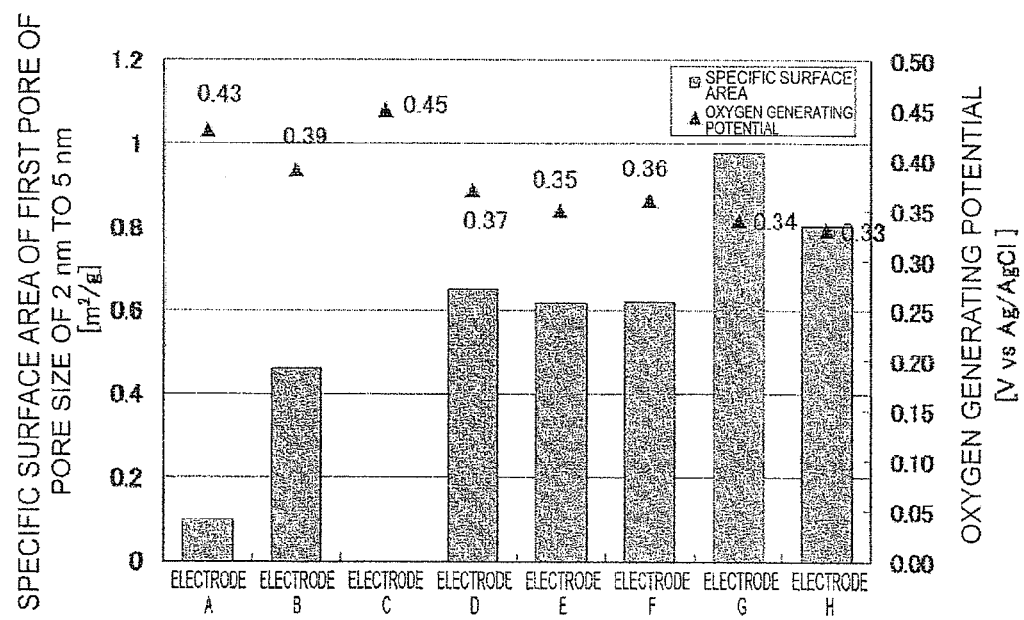
FIG. 21 is a graph depicting relations between the specific surface area of each of those of the pores in the catalytic layer in the alkaline water electrolysis anode which have a pore size of 2 to 5 nm and an oxygen generating potential.

The integral value of the integral pore specific surface area in a section [2 nm, 5 nm] depicted in FIG. 20 is the specific surface areas of the first pores of the pores in catalytic layer which have a pore size of 2 to 5 nm, and corresponds to the "specific surface area" of the first pore in Table 5. The relations between the "specific surface area" of the first pore and the oxygen generating potential are illustrated in FIG. 21.

Figure 22:
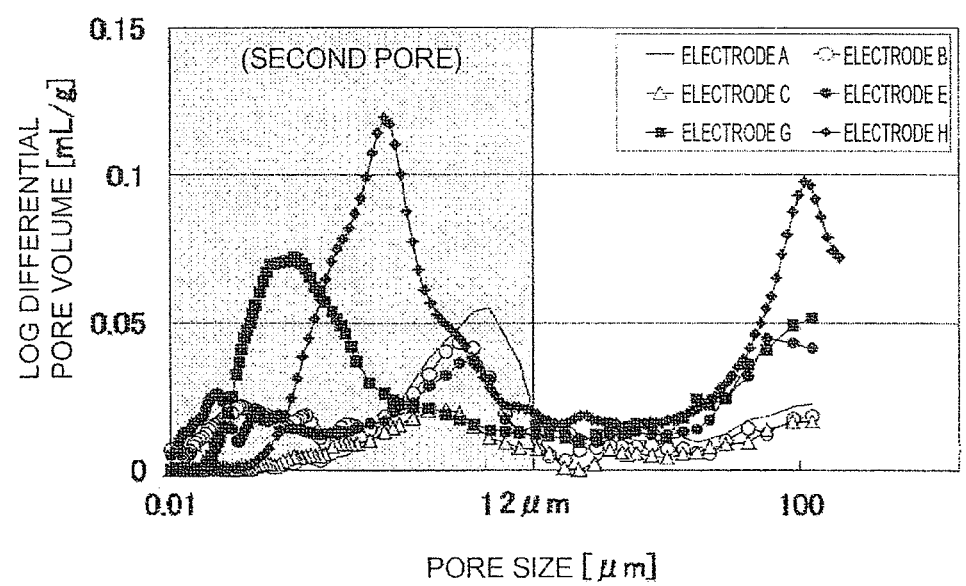
FIG. 22 is a graph depicting relations between the pore size of each pore in the catalytic layer in the alkaline water electrolysis anode and a log differential pore volume.
Figure 23:
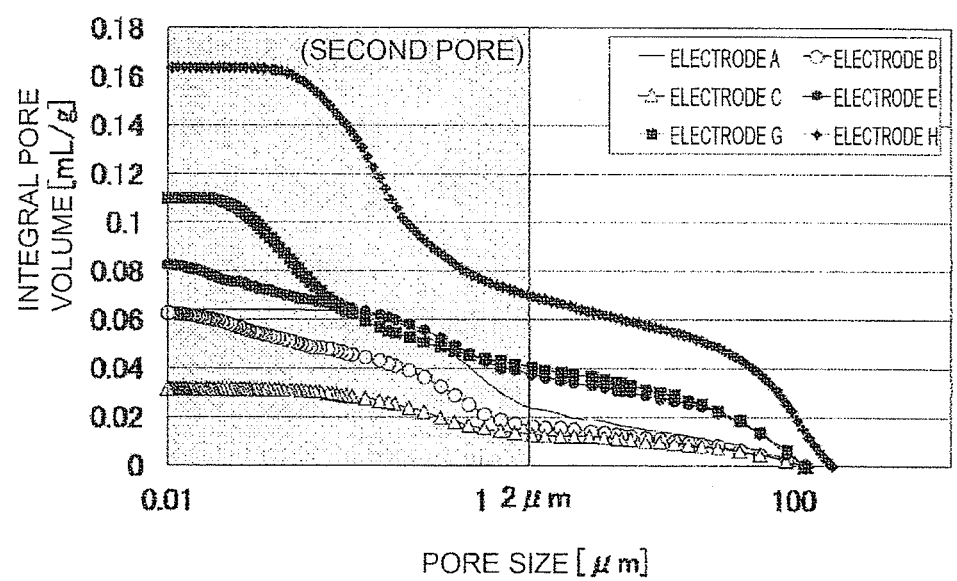
FIG. 23 is a graph depicting relations between the pore size of each pore in the catalytic layer in the alkaline water electrolysis anode and an integral pore volume.

The relations between the pore sizes of the each pore formed in the catalytic layer of each electrode and the pore volume for each pore size are illustrated in FIG. 4 and FIG. 23. FIG. 22 is based on measurement results for the pore volume in accordance with mercury intrusion described-above. The axis of ordinate in FIG. 22 represents a log differential pore volume that is defined by $\Delta V/\Delta(Log(d))$. $\Delta V/\Delta(Log(d))$ is a value resulting from division of the differential pore volume $\Delta V=V2-V1$ of an integral pore volume V determined by mercury intrusion by the log differential value $\Delta Log\ d=Log\ d2-Log\ d1$ of the pore size d. FIG. 22 depicts the distribution of the log differential pore volume of the second pore. The axis of ordinate in FIG. 23 represents the integral pore volume. The integral pore volume is a value resulting from integration of log differential pore volumes in accordance with dV/d(Log(d)).

The integral pore volume for a section [0.01 μm, 2.00 μm] depicted in FIG. 23 is represented as the difference between the integral pore volume for 0.01 μm and the integral pore volume for 2 μm, is the second pore volume in the catalytic layer, and corresponds to the "pore volume" of the second pore in Table 5.

Figure 24:
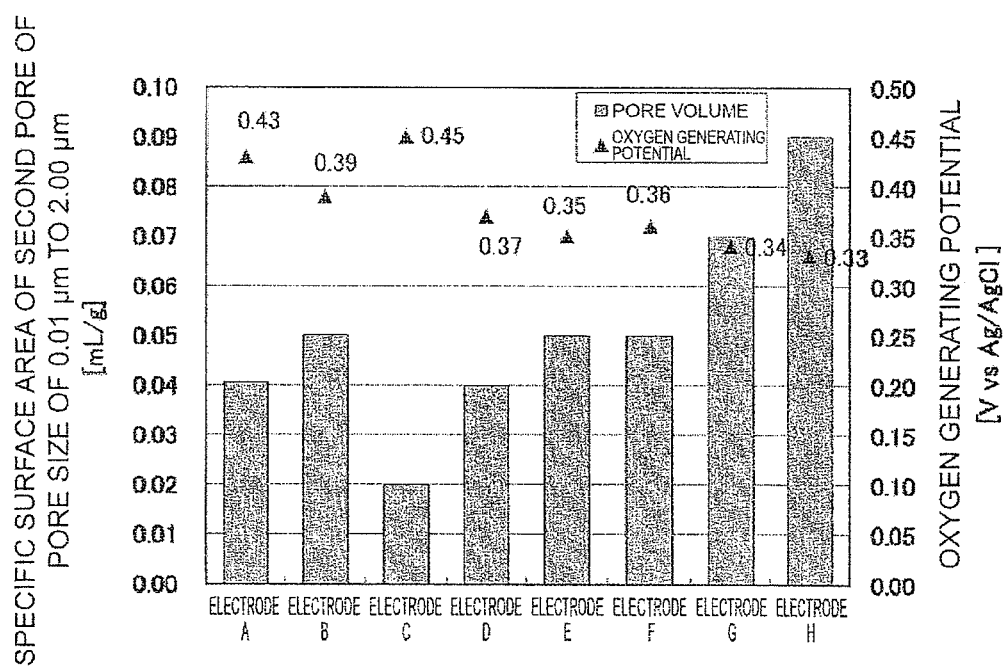
FIG. 24 is a graph depicting relations between the pore volume in the catalytic layer in the alkaline water electrolysis anode which have a pore size of 0.01 to 2.00 μm and the oxygen generating potential.

The relations between the "pore volume" of the second pore in Table 5 and the oxygen generating potential are illustrated in FIG. 24.

[Measurement of Integral Reduction Current Amount]

The electrode A of 2 cm in height×2 cm in width resulting from cutting processing was immersed in a water solution of KOH filling a fluorine resin beaker. The temperature of the water solution of KOH was maintained at 90° C. The concentration of the KOH in the water solution was 30 wt %. The electrode A was used as a working electrode and a platinum gauze was used as a counter electrode. The counter electrode was peripherally covered with a cylinder with a radius of 15 mm and with a large number of holes of 1 mmϕ. The electric conductivity was secured among the working electrode, the counter electrode, and the cylinder. Furthermore, a current-potential curve for the electrode A in the water solution of KOH was measured, with mixture of a generated gas prevented. Before the measurement of the current-potential curve, the current density was adjusted to 0.4 A/cm² and electrolysis was performed for 30 minutes as preliminary electrolysis to generate oxygen. A measurement starting potential (a high-potential-side potential) for the current-potential curve was set to the oxygen generating potential (unit: V v. s. Ag/AgCl) at a current density of 0.4 A/cm². A low-potential-side measurement potential was set to a potential (−1.1 V v. s. Ag/AgCl) lower than a potential at which the electrode surface (catalytic layer) was reduced to metal nickel. A potential sweep rate was set to 20 mV/sec. to allow the potential of the catalytic layer of the electrode A to be swept from the high-potential-side potential to the low-potential-side potential (−1.1 V v. s. Ag/AgCl). Measurement was repeated six times until a stable current-potential curve was obtained. Reduction peaks for the electrode A appearing within the range of 0 V to 0.3 V in the current-potential curve obtained in the sixth measurement were integrated to calculate the amount of integral reduction current within the range of 0 V to 0.3 V. In a manner similar to the manner for the electrode A, current-potential curves for the electrodes B, C, D, E, F, G, and H were measured, and reduction peaks appearing within the range of 0 V to 0.3 V were integrated to calculate the amount of integral reduction current within the range of 0 V to 0.3 V. The potential of each electrode was measured by a three electrode method using a Luggin capillary in order to eliminate the adverse effects of Ohmic losses resulting from solution resistance. The distance between the tip of the Luggin capillary and the anode was constantly fixed to 1 mm. As a measurement apparatus for the potential, "1470 BEC System" manufactured by Solartron was used. As a reference electrode for the three electrode method, silver-silver chloride (Ag/AgCl) was used. For the integration of reduction peaks, electrochemical measurement analysis software "CView (Version: 3.10) was used. Current-potential curves for the respective electrodes are depicted in FIG. 23.

Figure 25:
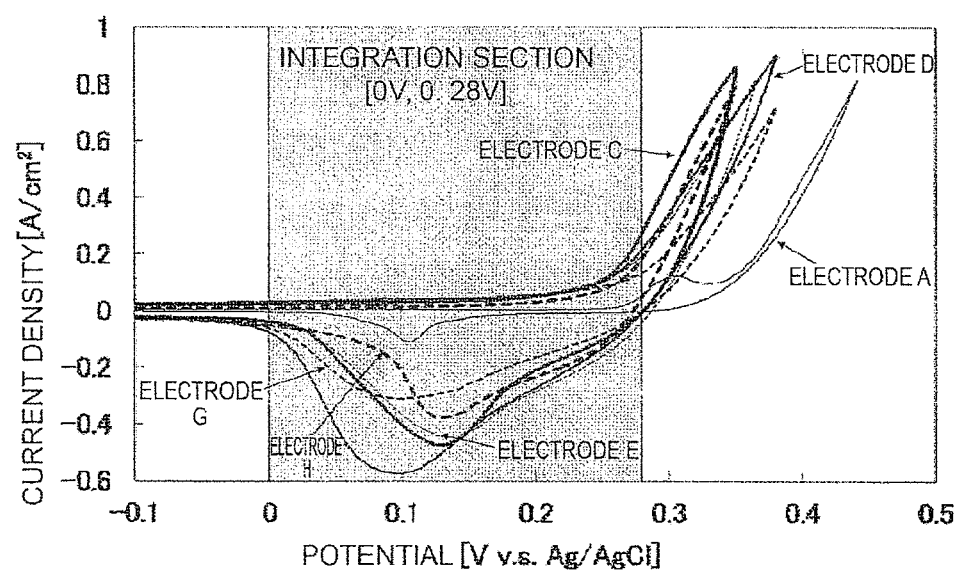
FIG. 25 is a graph depicting a current-potential curve for the alkaline water electrolysis anode.

The current-potential curve for the catalytic layer of each electrode is depicted in FIG. 25. The amount of integral reduction current (unit: Coulomb/g) depicted in Table 5 is the amount of integral reduction current appearing within the range of 0 V to 0.28 V in the current-potential curve in FIG. 25. The current-potential curves for the electrodes B, D, E, F, G, and H indicate that the amounts of integral reduction current through the electrodes B, D, E, G, and H are substantially larger than the amount of integral reduction current through the electrode A and that, even with a rapid decease in electrolytic voltage, the potential may be kept constant by the large amounts of integral reduction current, enabling a change in electrode surface to be prevented.

TABLE 5

|  | Manufacturing method | Metal Ni ratio [%] | Specific surface area [m²/g] First pore | Specific surface area [m²/g] Second pore | Pore volume [ml/g] First pore | Pore volume [ml/g] Second pore | Integral reduction current Range of 0 to 0.28 V Ag/AgCl (90° C.) [C/g] | Oxygen generating potential [V vs Ag/AgCl] |  |
|---|---|---|---|---|---|---|---|---|---|
| Electrode A | Ni spraying | 28 | 0.01 | 0.31 | 0.000073 | 0.04 | 2.0 | 0.43 | Comparative example |
| Electrode B | Ni spraying → hydrogen reduction at 300° C. | 99 | 0.46 | 2.35 | 0.000326 | 0.05 | 26.5 | 0.39 | Comparative example |
| Electrode C | Ni spraying → hydrogen reduction at 600° C. | 100 | 0 | 0.30 | 0.000000 | 0.02 | — | 0.45 | Comparative example |
| Electrode D | Ni spraying → hydrogen reduction at 180° C. | 90 | 0.65 | 2.50 | 0.000362 | 0.04 | 19.0 | 0.37 | Example |
| Electrode E | Ni spraying → hydrogen reduction at 200° C. | 96 | 0.62 | 2.73 | 0.000427 | 0.05 | 20.3 | 0.35 | Example |
| Electrode F | Ni spraying → hydrogen reduction at 250° C. | 98 | 0.62 | 2.50 | 0.000790 | 0.05 | — | 0.36 | Example |
| Electrode G | Ni spraying → electrolytic reduction for 90 days | 95 | 0.98 | 3.96 | 0.000708 | 0.07 | 15.3 | 0.34 | Example |
| Electrode H | Ni spraying → electrolytic reduction for 180 days | 99 | 0.8 | 4.20 | 0.000558 | 0.09 | 15.0 | 0.33 | Example |

The oxygen generating potentials of the electrodes B, D, E, F, G, and H were each lower than the oxygen generating potential of the electrode A. The oxygen generating potentials of the electrodes D, E, F, G, and H were each substantially lower than the oxygen generating potential of the electrode B. It has been found that the electrode B and the electrode E are approximately the same in the pore volume of the second pore with a pore size of 0.01 to 2.00 μm but that the electrode E provides a substantially lower oxygen generating potential than the electrode B because the specific surface area of the first pore in the electrode E is 0.6 to 2.0 m²/g.

The oxygen generating potential of the electrode H was slightly lower than the oxygen generating potential of the electrode G. The specific surface area of the first pore in the electrode G was larger than the specific surface area of the first pore in the electrode H. However, the pore volume of the second pore in the electrode H was larger than the pore volume of the second pore in the electrode G. This indicates that the likelihood that the oxygen generating potential decreases increases consistently with the pore volume of the second pore.

Comparisons between electrodes E, B, C indicate that the specific surface area of the first pore tends to decrease with increasing temperature during hydrogen reduction and that the oxygen generating potential tends to increase with decreasing specific surface area of the first pore. In particular, the specific surface area of the first pore in the electrode C for which hydrogen reduction was performed at 600° C. was 0. The oxygen generating potential of the electrode C was higher than the oxygen generating potential of the electrode A for which the catalytic layer was not reduced. This indicates that, to reduce the oxygen generating potential, it is appropriate to reduce nickel oxide with hydrogen at low temperature to increase the specific surface area of the first pore as much as possible.

INDUSTRIAL APPLICABILITY

The present invention can be utilized for an electrolytic cell for generating oxygen and hydrogen by means of alkaline water electrolysis.

REFERENCE SIGNS LIST

1 . . . Anode liquid inlet nozzle, 2 . . . Cathode liquid inlet nozzle, 3 . . . Gas outlet nozzle, 4 . . . Gas outlet nozzle, 5 . . . Press flange, 5a . . . Cover portion, 5b . . . Outer frame, 5c . . . Reinforcing rib, 6 . . . Press flange gasket, 6a . . . Channel hole, 6b . . . Channel hole, 6c . . . Channel hole, 6d . . . Channel hole, 6e . . . Hole portion, 7A . . . Anode feeding terminal, 7B . . . Cathode feeding terminal, 7C . . . Feeding terminal, 7C . . . Feeding terminal, 8 . . . Anode terminal unit, 8a . . . Anode, 9 . . . Anode gasket, 10 . . . Ion permeable diaphragm, 11 . . . Cathode gasket, 12, 12A, 12B, 120, 200 . . . Bipolar alkaline water electrolysis unit (electrolysis unit), 13 . . . Cathode terminal unit, 13a . . . Cathode, 14 . . . End press flange, 15 . . . Tie rod, 16 . . . Outer frame (outer frame), 16a . . . Upper bulging portion, 16b . . . Lower bulging portion, 18 . . . Anode, 19 . . . Cathode, 20 . . . Anode rib, 21 . . . Cathode rib, 22 . . . Partition wall (conductive partition wall), 22 . . . Conductive partition wall, 23 . . . Anode side flange pan, 23c . . . Anode side outer frame flange surface, 24 . . . Cathode side flange pan, 24c . . . Cathode side outer frame flange surface, 26 . . . Anode liquid conduit, 26b . . . Anode liquid passing hole, 27 . . . Cathode liquid conduit, 27b . . . Cathode liquid passing hole, 29 . . . Anode liquid introduction conduit, 30 . . . Cathode liquid introduction conduit, 31 . . . Anode liquid and gas conduit, 31b . . . Anode liquid and gas passing hole, 32 . . . Anode liquid and gas conduit, 32b . . . Cathode liquid and gas passing hole, 34 . . . Anode liquid and gas discharge conduit, 35 . . . Cathode liquid and gas discharge conduit, 36 . . . Current collector, 37 . . . Cushion mat, 38 . . . Cathode, 39 . . . Anode, 41 . . . Insulating plate, 100 . . . Electrolytic cell, 101 . . . Electrolytic cell, 103 . . . Anode chamber, 105 . . . Cathode chamber, 111A . . . Spring, 111B . . . Spring, Fa . . . Flange surface of anode side flange pan, Fb . . . Flange surface of cathode side flange pan, Fx . . . Anode side reference surface, Fy . . . Cathode side reference surface.

The invention claimed is:
1. A bipolar alkaline water electrolysis unit comprising:
an anode comprising a conductive base material and a catalytic layer disposed on the conductive base material, wherein the catalytic layer comprises a metal crystal of nickel, and has pores, of the pores in the catalytic layer, a first pore with a pore size of 2 to 5 nm has a specific surface area of 0.6 to 2.0 m²/g, the first pore has a pore volume of $3\times10^{-4}$ to $9\times10^{-4}$ ml/g, of the pores, a second pore with a pore size of 0.01 to 2.00 μm has a specific surface area of 2.0 to 5.0 m²/g, and the second pore has a pore volume of 0.04 to 0.2 ml/g.

2. The bipolar alkaline water electrolysis unit according to claim 1, wherein when an X ray diffracted by a (1 1 1) face of the metal crystal of the nickel in the catalytic layer has a peak intensity INi and an X ray diffracted by a (0 1 2) face of NiO in the catalytic layer has a peak intensity INiO, a value of [INi/(INi+INiO)]×100 is 75 to 100%.

3. The bipolar alkaline water electrolysis unit according to claim 1, wherein a thickness of the catalytic layer is 50 to 800 μm.

4. The bipolar alkaline water electrolysis unit according to claim 1, wherein the catalytic layer is formed by:

a first step of spraying nickel oxide onto a conductive base material by a spraying method; and a second step of reducing the nickel oxide sprayed on the conductive base material.

5. The bipolar alkaline water electrolysis unit according to claim 4, wherein, in the second step, the catalytic layer is formed by reducing the nickel oxide sprayed on the conductive base material by means water electrolysis using the nickel oxide sprayed on the conductive base materials as a cathode.

6. The bipolar alkaline water electrolysis unit according to claim 4, wherein, in the second step, catalytic layer is formed by reducing the nickel oxide sprayed on the conductive base material using hydrogen.

7. The bipolar alkaline water electrolysis unit according to claim 4, wherein, in the second step, the catalytic layer is formed by reducing the nickel oxide sprayed on the conductive base material, at 180 to 250° C. using hydrogen.

8. The bipolar alkaline water electrolysis unit according to claim 4, wherein the catalytic layer is formed through a step of granulating the nickel oxide before the first step, and a particle size of powder of the nickel oxide is 1.0 to 5.0 μm before granulation.

9. A bipolar alkaline water electrolysis unit comprising in an electrolytic cell in which an electrolytic solution of alkaline water is electrolyzed to obtain oxygen and hydrogen, the bipolar alkaline water electrolysis unit comprising:

an anode comprising an oxygen generating porous medium;

a hydrogen generating cathode;

a conductive partition wall that separates the anode and the cathode from each other;

an outer frame that surrounds the conductive partition wall, a gas and electrolytic solution passage provided between an upper portion of both the anode and the cathode and an upper portion of the outer frame, and an electrolytic solution passage provided between a lower portion of both the anode and the cathode and a lower portion of the outer frame, wherein the gas and electrolytic solution passage and the electrolytic solution passage extend along a direction that is substantially orthogonal to the conductive partition wall, wherein either (i) the anode or cathode is supported by the conductive partition wall via a conductive elastic medium or (ii) the anode or the cathode is supported by the conductive partition wall via a conductive support medium, and wherein the anode comprises a conductive base material and a catalytic layer disposed on the conductive base material, wherein the catalytic layer comprises a metal crystal of nickel, and has pores, of the pores in the catalytic layer, a first pore with a pore size of 2 to 5 nm has a specific surface area of 0.6 to 2.0 m²/g, the first pore has a pore volume of $3\times10^{-4}$ to $9\times10^{-4}$ ml/g, of the pores, a second pore with a pore size of 0.01 to 2.00 (μm has a specific surface area of 2.0 to 5.0 m²/g, and the second pore has a pore volume of 0.04 to 0.2 ml/g.

10. The bipolar alkaline water electrolysis unit according to claim 9, comprising a thin metal plate part extending from the conductive partition wall and covering at least a part of the outer frame, wherein the outer frame is fixed to the thin metal plate part to provide an integral structure.

11. The bipolar alkaline water electrolysis unit according to claim 10, wherein the thin metal plate part comprises an anode side flange pan overlapping the outer frame on the anode side and a cathode side flange pan overlapping the outer frame on the cathode side, the outer frame is sandwiched between a flange portion of the anode side flange pan and a flange portion of the cathode side flange pan, and a distance from an anode side reference surface including an anode side surface of the conductive partition wall to a flange surface of the anode side flange pan and a distance from a cathode side reference surface including a cathode side surface of the conductive partition wall to a flange surface of the cathode side flange pan are each 5 mm or more and 40 mm or less.

12. The bipolar alkaline water electrolysis unit according to claim 9, wherein a part or all of the outer frame is resin, and an outer frame is provided which surrounds the conductive partition wall and holds the conductive partition wall in a sandwiching manner.

13. The bipolar alkaline water electrolysis unit according to claim 9, wherein a distance from an anode side surface of the outer frame to an anode side surface of the partition wall and a distance from a cathode side surface of the outer frame to a cathode side surface of the partition wall are each 5 mm or more and 40 mm or less.

14. The bipolar alkaline water electrolysis unit according to claim 9, wherein the outer frame is divided into an anode side frame part disposed on the anode side of the conductive partition wall and a cathode side frame part disposed on the cathode side of the conductive partition wall, and a part of the conductive partition wall is sandwiched between the anode side frame part and the cathode side frame part.

15. The bipolar alkaline water electrolysis unit according to claim 14, wherein a thickness of the anode side frame part and a thickness of the cathode side frame part are each 5 mm or more and 40 mm or less.

16. The bipolar alkaline water electrolysis unit according to claim 9, wherein the conductive elastic medium is a spring.

17. The bipolar alkaline water electrolysis unit according to claim 16, wherein a rib for fixing the anode, the cathode, or the spring is attached to the conductive partition wall.

18. The bipolar alkaline water electrolysis unit according to claim 9, wherein the conductive elastic medium comprises a current collector and a cushion mat layer, and the cathode or the anode contacts with the cushion mat layer.

19. The bipolar alkaline water electrolysis unit according to claim 18, wherein a rib for fixing the anode, the cathode, or the current collector is attached to conductive partition wall.

20. The bipolar alkaline water electrolysis unit according to claim 18, wherein at least one of a surface of the partition wall, a surface of a part of the conductive elastic medium, or a surface of one of surfaces of the current collector is coated with a selected one of Raney nickel, porous nickel, and porous nickel oxide.

21. The bipolar alkaline water electrolysis unit according to claim 9, wherein the outer frame comprises a material selected from a vinyl chloride resin, a polyethylene resin, a polypropylene resin, a polyphenylene ether resin, a polyphenylene sulfide resin, a polysulphone resin, a polyether sulphone resin, a polyether ether ketone resin, an epoxy resin, nickel, a nickel alloy, stainless steel, or mild steel or stainless steel plated with nickel.

22. The bipolar alkaline water electrolysis unit according to claim 9, wherein the cathode comprises a mild steel, a stainless steel, a nickel alloy base material, or a base material comprising mild steel or a nickel alloy plated with nickel, the base material being coated with a metal selected from platinum group metals, nickel, cobalt, molybdenum, or manganese or an alloy or an oxide thereof.

23. The bipolar alkaline water electrolysis unit according to claim 9, wherein the gas and electrolytic solution passage provided at an upper portion of the conductive partition wall and/or the outer frame is an anode liquid and gas conduit and a cathode liquid and gas conduit, the electrolytic solution passage provided at a lower part of the conductive partition wall and/or the outer frame is an anode liquid conduit and a cathode liquid conduit, and an inner surface of each of the conduits is lined with rubber or resin.

24. An electrolytic cell for electrolyzing an electrolytic solution of alkaline water to obtain oxygen and hydrogen, the electrolytic cell comprising:
a plurality of the bipolar alkaline water electrolysis units according to claim 9;
an anode terminal unit provided with an anode feeding terminal and an anode;
a cathode terminal unit provided with a cathode feeding terminal and a cathode; and
a plurality of ion permeable diaphragms,
wherein the bipolar alkaline water electrolysis units are disposed between the anode terminal unit and the cathode terminal unit, and
the ion permeable diaphragms are disposed between the anode terminal unit and the bipolar alkaline water electrolysis unit, between the adjacently disposed bipolar alkaline water electrolysis units, and between the bipolar alkaline water electrolysis unit and the cathode terminal unit.

* * * * *